United States Patent
Matas et al.

(10) Patent No.: US 11,601,584 B2
(45) Date of Patent: Mar. 7, 2023

(54) PORTABLE ELECTRONIC DEVICE FOR PHOTO MANAGEMENT

(71) Applicant: Apple Inc., Cupertino, CA (US)

(72) Inventors: Michael J. Matas, Healdsburg, CA (US); Greg Christie, San Jose, CA (US); Paul D. Marcos, Los Altos, CA (US); Scott Forstall, Los Altos, CA (US); Marcel Van Os, San Francisco, CA (US); Bas Ording, San Francisco, CA (US); Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/153,703

(22) Filed: Jan. 20, 2021

(65) Prior Publication Data
US 2021/0243356 A1 Aug. 5, 2021

Related U.S. Application Data

(63) Continuation of application No. 16/450,531, filed on Jun. 24, 2019, now Pat. No. 10,904,426, which is a
(Continued)

(51) Int. Cl.
*H04N 5/232* (2006.01)
*G06F 3/0485* (2022.01)
(Continued)

(52) U.S. Cl.
CPC ....... *H04N 5/23216* (2013.01); *G06F 1/1686* (2013.01); *G06F 1/1694* (2013.01);
(Continued)

(58) Field of Classification Search
CPC ........... H04N 1/00458; H04N 1/00461; H04N 1/00411; H04N 1/00442; H04N 1/00453;
(Continued)

(56) References Cited

U.S. PATENT DOCUMENTS

| 5,416,895 A | 5/1995 | Anderson et al. |
| 5,463,725 A | 10/1995 | Henckel et al. |

(Continued)

FOREIGN PATENT DOCUMENTS

| CN | 1404233 A | 3/2003 |
| CN | 1590969 A | 3/2005 |

(Continued)

OTHER PUBLICATIONS

US 2002/0018582 A1, 02/2002, Hagiwara et al. (withdrawn)
(Continued)

*Primary Examiner* — Tadesse Hailu
(74) *Attorney, Agent, or Firm* — Dentons US LLP

(57) ABSTRACT

A portable electronic device with a touch screen display for photo management is disclosed. One aspect of the invention involves a computer-implemented method in which the portable electronic device displays an array of thumbnail images corresponding to a set of photographic images. The device replaces the displayed array of thumbnail images with a user-selected photographic image upon detecting a user contact with a corresponding thumbnail image in the array. The user-selected photographic image is displayed at a larger scale than the corresponding thumbnail image. The portable device displays a different photographic image in replacement of the user-selected photographic image in accordance with a scrolling gesture. The scrolling gesture comprises a substantially horizontal movement of user contact with the touch screen display.

12 Claims, 40 Drawing Sheets

Related U.S. Application Data continuation of application No. 15/281,524, filed on Sep. 30, 2016, now Pat. No. 10,356,309, which is a continuation of application No. 13/666,943, filed on Nov. 1, 2012, now Pat. No. 9,459,792, which is a continuation of application No. 13/361,912, filed on Jan. 30, 2012, now Pat. No. 8,305,355, which is a continuation of application No. 11/848,210, filed on Aug. 30, 2007, now Pat. No. 8,106,856.

(60) Provisional application No. 60/947,118, filed on Jun. 29, 2007, provisional application No. 60/937,993, filed on Jun. 29, 2007, provisional application No. 60/879,469, filed on Jan. 8, 2007, provisional application No. 60/879,253, filed on Jan. 7, 2007, provisional application No. 60/883,785, filed on Jan. 6, 2007, provisional application No. 60/824,769, filed on Sep. 6, 2006.

(51) Int. Cl.

| | |
|---|---|
| G06F 3/0488 | (2022.01) |
| G06F 3/04886 | (2022.01) |
| H04N 1/00 | (2006.01) |
| H04M 1/72439 | (2021.01) |
| G06F 3/04883 | (2022.01) |
| G06F 1/16 | (2006.01) |
| G06F 3/04817 | (2022.01) |
| G06F 3/04847 | (2022.01) |
| H04N 5/225 | (2006.01) |
| H04N 101/00 | (2006.01) |
| H04M 1/72427 | (2021.01) |

(52) U.S. Cl.
CPC .......... *G06F 3/0485* (2013.01); *G06F 3/0488* (2013.01); *G06F 3/04817* (2013.01); *G06F 3/04847* (2013.01); *G06F 3/04883* (2013.01); *G06F 3/04886* (2013.01); *H04M 1/72439* (2021.01); *H04N 1/00411* (2013.01); *H04N 1/00442* (2013.01); *H04N 1/00453* (2013.01); *H04N 1/00458* (2013.01); *H04N 1/00461* (2013.01); *H04N 5/2257* (2013.01); *H04N 5/232933* (2018.08); *G06F 2203/04808* (2013.01); *H04M 1/72427* (2021.01); *H04N 1/00347* (2013.01); *H04N 2101/00* (2013.01); *H04N 2201/0087* (2013.01); *H04N 2201/0089* (2013.01); *H04N 2201/325* (2013.01); *H04N 2201/3226* (2013.01); *H04N 2201/3273* (2013.01)

(58) Field of Classification Search
CPC .......... H04N 5/23216; H04N 5/232933; H04N 5/2257; G06F 2203/04808; G06F 3/0485; G06F 3/0488; G06F 3/04883; G06F 3/04886; G06F 3/04847; G06F 3/04817; H04M 1/72427; H04M 1/72439
See application file for complete search history.

(56) References Cited

U.S. PATENT DOCUMENTS

| | | | |
|---|---|---|---|
| 5,565,888 A | 10/1996 | Selker | |
| 5,583,542 A | 12/1996 | Capps | |
| 5,602,981 A | 2/1997 | Hargrove | |
| 5,604,861 A | 2/1997 | Douglas et al. | |
| 5,677,708 A | 10/1997 | Matthews et al. | |
| 5,685,723 A | 11/1997 | Ladin et al. | |
| 5,712,995 A | 1/1998 | Cohn | |
| 5,757,368 A | 5/1998 | Gerpheide et al. | |
| 5,767,835 A | 6/1998 | Obbink et al. | |
| 5,784,061 A | 7/1998 | Moran et al. | |
| 5,825,349 A | 10/1998 | Meier et al. | |
| 5,845,122 A | 12/1998 | Nielsen et al. | |
| 5,864,868 A | 1/1999 | Contois | |
| 5,886,697 A | 3/1999 | Naughton et al. | |
| 5,956,035 A | 9/1999 | Sciammarella et al. | |
| 5,969,283 A | 10/1999 | Looney et al. | |
| 5,973,694 A | 10/1999 | Steele et al. | |
| 6,055,543 A | 4/2000 | Christensen et al. | |
| 6,069,626 A | 5/2000 | Cline et al. | |
| 6,073,036 A | 6/2000 | Heikkinen et al. | |
| 6,088,649 A | 7/2000 | Kadaba et al. | |
| 6,118,450 A | 9/2000 | Proehl et al. | |
| 6,141,007 A | 10/2000 | Elterman et al. | |
| 6,154,210 A * | 11/2000 | Anderson .............. | G03B 17/02 345/173 |
| 6,160,551 A | 12/2000 | Naughton et al. | |
| 6,167,469 A | 12/2000 | Satai et al. | |
| 6,181,316 B1 | 1/2001 | Little et al. | |
| 6,237,010 B1 | 5/2001 | Hui et al. | |
| 6,244,988 B1 | 6/2001 | Delman | |
| 6,245,982 B1 | 6/2001 | Suzuki et al. | |
| 6,248,946 B1 | 6/2001 | Dwek | |
| 6,252,596 B1 | 6/2001 | Garland et al. | |
| 6,272,246 B1 | 8/2001 | Takai | |
| 6,292,273 B1 | 9/2001 | Dow et al. | |
| 6,301,586 B1 | 10/2001 | Yang et al. | |
| 6,317,784 B1 | 11/2001 | Mackintosh et al. | |
| 6,334,025 B1 | 12/2001 | Yamagami et al. | |
| 6,346,951 B1 | 2/2002 | Mastronardi | |
| 6,356,971 B1 | 3/2002 | Katz et al. | |
| 6,374,177 B1 | 4/2002 | Lee et al. | |
| 6,380,947 B1 | 4/2002 | Stead | |
| 6,462,760 B1 | 10/2002 | Cox et al. | |
| 6,564,213 B1 | 5/2003 | Ortega et al. | |
| 6,570,594 B1 | 5/2003 | Wagner | |
| 6,686,938 B1 | 2/2004 | Jobs et al. | |
| 6,713,312 B2 | 3/2004 | Blalock et al. | |
| 6,731,312 B2 | 5/2004 | Robbin | |
| 6,741,268 B1 | 5/2004 | Hayakawa et al. | |
| 6,784,925 B1 | 8/2004 | Tomat et al. | |
| 6,920,619 B1 | 7/2005 | Milekic | |
| 6,950,989 B2 | 9/2005 | Rosenzweig et al. | |
| 7,015,910 B2 | 3/2006 | Card et al. | |
| 7,139,982 B2 | 11/2006 | Card et al. | |
| 7,152,210 B1 | 12/2006 | Van Den Hoven et al. | |
| 7,164,410 B2 | 1/2007 | Kupka | |
| 7,178,111 B2 | 2/2007 | Glein et al. | |
| 7,380,212 B2 | 5/2008 | Cody et al. | |
| 7,434,177 B1 | 10/2008 | Ording et al. | |
| 7,444,390 B2 | 10/2008 | Tadayon et al. | |
| 7,453,444 B2 | 11/2008 | Geaghan | |
| 7,469,381 B2 | 12/2008 | Ording | |
| 7,559,034 B1 | 7/2009 | Paperny et al. | |
| 7,587,671 B2 | 9/2009 | Saft et al. | |
| 7,627,828 B1 | 12/2009 | Collison et al. | |
| 7,695,406 B2 | 4/2010 | Waters | |
| 7,779,358 B1 | 8/2010 | Gupta et al. | |
| 7,783,990 B2 | 8/2010 | Amadio et al. | |
| 7,786,975 B2 | 8/2010 | Ording et al. | |
| 7,791,755 B2 | 9/2010 | Mori | |
| 7,823,080 B2 | 10/2010 | Miyajima et al. | |
| 7,865,215 B2 | 1/2011 | Bells et al. | |
| 7,970,240 B1 | 6/2011 | Chao et al. | |
| 7,996,788 B2 | 8/2011 | Carmichael | |
| 8,024,658 B1 | 9/2011 | Fagans et al. | |
| 8,060,229 B2 | 11/2011 | Gupta et al. | |
| 8,106,856 B2 | 1/2012 | Matas et al. | |
| 8,132,116 B1 | 3/2012 | Schendel | |
| 8,152,640 B2 | 4/2012 | Shirakawa et al. | |
| 8,200,669 B1 | 6/2012 | Iampietro et al. | |
| 8,259,132 B2 | 9/2012 | Buchheit | |
| 8,305,355 B2 | 11/2012 | Forstall et al. | |
| 8,339,420 B2 | 12/2012 | Hiraoka et al. | |
| 8,456,431 B2 | 6/2013 | Victor | |
| 8,458,617 B2 | 6/2013 | Victor et al. | |
| 8,464,173 B2 | 6/2013 | Victor et al. | |
| 8,566,403 B2 | 10/2013 | Pascal et al. | |

(56) References Cited

U.S. PATENT DOCUMENTS

| | | | |
|---|---|---|---|
| 8,698,762 B2 | 4/2014 | Wagner et al. |
| 8,780,069 B2 | 7/2014 | Victor et al. |
| 8,863,016 B2 | 10/2014 | Victor et al. |
| 8,934,717 B2 | 1/2015 | Newell et al. |
| 8,957,865 B2 | 2/2015 | Cieplinski et al. |
| 8,966,399 B2 | 2/2015 | Chiang et al. |
| 9,021,034 B2 | 4/2015 | Narayanan et al. |
| 9,183,560 B2 | 11/2015 | Abelow |
| 9,286,546 B2 | 3/2016 | O'malley et al. |
| 9,310,907 B2 | 4/2016 | Victor et al. |
| 9,338,242 B1 | 5/2016 | Suchland et al. |
| 9,449,365 B2 | 9/2016 | Roberts |
| 9,459,792 B2 | 10/2016 | Matas et al. |
| 9,532,734 B2 | 1/2017 | Hoffman et al. |
| 9,870,554 B1 | 1/2018 | Leung et al. |
| 9,880,805 B1 | 1/2018 | Guralnick |
| 9,904,906 B2 | 2/2018 | Kim et al. |
| 9,916,538 B2 | 3/2018 | Zadeh et al. |
| 10,019,136 B1 | 7/2018 | Ozog |
| 10,051,103 B1 | 8/2018 | Gordon et al. |
| 10,204,338 B2 | 2/2019 | Lee |
| 10,220,258 B2 | 3/2019 | Gu et al. |
| 10,282,070 B2 | 5/2019 | Victor |
| 10,303,448 B2 | 5/2019 | Steven et al. |
| 10,304,347 B2 | 5/2019 | Wilson et al. |
| 10,417,588 B1 | 9/2019 | Kreisel et al. |
| 10,489,982 B2 | 11/2019 | Johnson et al. |
| 10,509,907 B2 | 12/2019 | Shear et al. |
| 10,540,400 B2 | 1/2020 | Dumant et al. |
| 10,776,965 B2 | 9/2020 | Stetson et al. |
| 10,777,314 B1 | 9/2020 | Williams et al. |
| 10,796,480 B2 | 10/2020 | Chen et al. |
| 11,103,161 B2 | 8/2021 | Williams et al. |
| 11,152,100 B2 | 10/2021 | Crowley et al. |
| 11,202,598 B2 | 12/2021 | Soli et al. |
| 11,209,957 B2 | 12/2021 | Dryer et al. |
| 11,317,833 B2 | 5/2022 | Williams et al. |
| 2001/0014184 A1 | 8/2001 | Bubie et al. |
| 2002/0008763 A1* | 1/2002 | Kawamura | H04N 5/772 |
| | | | 386/E5.072 |
| 2002/0021758 A1 | 2/2002 | Chui et al. |
| 2002/0045960 A1 | 4/2002 | Phillips et al. |
| 2002/0051018 A1 | 5/2002 | Yeh |
| 2002/0054233 A1 | 5/2002 | Juen |
| 2002/0057292 A1 | 5/2002 | Holtz |
| 2002/0057461 A1 | 5/2002 | Dow et al. |
| 2002/0070982 A1 | 6/2002 | Hill et al. |
| 2002/0086774 A1 | 7/2002 | Warner |
| 2002/0093531 A1 | 7/2002 | Barile |
| 2002/0106199 A1 | 8/2002 | Ikeda |
| 2002/0135621 A1 | 9/2002 | Angiulo et al. |
| 2003/0033296 A1 | 2/2003 | Rothmuller et al. |
| 2003/0048291 A1 | 3/2003 | Dieberger |
| 2003/0055905 A1 | 3/2003 | Nishiyama et al. |
| 2003/0064860 A1 | 4/2003 | Yamashita et al. |
| 2003/0081135 A1 | 5/2003 | Boll |
| 2003/0090504 A1 | 5/2003 | Brook et al. |
| 2003/0108241 A1 | 6/2003 | Colmenarez et al. |
| 2003/0122787 A1 | 7/2003 | Zimmerman et al. |
| 2003/0128192 A1 | 7/2003 | Van Os |
| 2003/0128241 A1 | 7/2003 | Watanabe et al. |
| 2003/0134714 A1 | 7/2003 | Oishi et al. |
| 2003/0149990 A1 | 8/2003 | Anttila et al. |
| 2003/0169288 A1 | 9/2003 | Misawa |
| 2003/0197687 A1 | 10/2003 | Shetter |
| 2004/0019640 A1 | 1/2004 | Bartram et al. |
| 2004/0021676 A1 | 2/2004 | Chen et al. |
| 2004/0046886 A1 | 3/2004 | Ambiru et al. |
| 2004/0119758 A1 | 6/2004 | Grossman et al. |
| 2004/0135797 A1 | 7/2004 | Meier et al. |
| 2004/0135904 A1 | 7/2004 | Shiota et al. |
| 2004/0143590 A1 | 7/2004 | Wong et al. |
| 2004/0158555 A1 | 8/2004 | Seedman et al. |
| 2004/0167898 A1 | 8/2004 | Margolus et al. |
| 2004/0183830 A1 | 9/2004 | Cody et al. |
| 2004/0205504 A1 | 10/2004 | Phillips |
| 2004/0207722 A1 | 10/2004 | Koyama et al. |
| 2004/0212617 A1 | 10/2004 | Fitzmaurice et al. |
| 2004/0239792 A1 | 12/2004 | Shibutani et al. |
| 2005/0020317 A1 | 1/2005 | Koyama |
| 2005/0041035 A1 | 2/2005 | Nagatomo et al. |
| 2005/0052427 A1 | 3/2005 | Wu et al. |
| 2005/0062130 A1 | 3/2005 | Ciancio et al. |
| 2005/0071736 A1 | 3/2005 | Schneider et al. |
| 2005/0071767 A1 | 3/2005 | Kirkland et al. |
| 2005/0073601 A1 | 4/2005 | Battles et al. |
| 2005/0076307 A1 | 4/2005 | Robbin |
| 2005/0083406 A1* | 4/2005 | Cozier | G06Q 10/107 |
| | | | 348/207.1 |
| 2005/0088418 A1 | 4/2005 | Nguyen |
| 2005/0102635 A1 | 5/2005 | Jiang et al. |
| 2005/0104848 A1 | 5/2005 | Yamaguchi et al. |
| 2005/0108253 A1 | 5/2005 | Metsatahti et al. |
| 2005/0134719 A1* | 6/2005 | Beck | H04N 5/232945 |
| | | | 348/240.2 |
| 2005/0160377 A1 | 7/2005 | Sciammarella et al. |
| 2005/0183026 A1 | 8/2005 | Amano et al. |
| 2005/0195221 A1 | 9/2005 | Berger et al. |
| 2005/0198024 A1 | 9/2005 | Sakata et al. |
| 2005/0259116 A1 | 11/2005 | Araoka |
| 2005/0272564 A1 | 12/2005 | Pyles et al. |
| 2005/0275636 A1 | 12/2005 | Dehlin et al. |
| 2006/0001652 A1 | 1/2006 | Chiu et al. |
| 2006/0004685 A1 | 1/2006 | Pyhalammi et al. |
| 2006/0017692 A1 | 1/2006 | Wehrenberg et al. |
| 2006/0025218 A1 | 2/2006 | Hotta |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0061663 A1* | 3/2006 | Park | H04N 5/232933 |
| | | | 348/E5.042 |
| 2006/0072028 A1* | 4/2006 | Hong | H04N 5/232933 |
| | | | 348/333.01 |
| 2006/0077266 A1 | 4/2006 | Nurmi et al. |
| 2006/0080386 A1 | 4/2006 | Roykkee et al. |
| 2006/0088228 A1 | 4/2006 | Marriott et al. |
| 2006/0112335 A1 | 5/2006 | Hofmeister et al. |
| 2006/0136246 A1 | 6/2006 | Tu |
| 2006/0136839 A1 | 6/2006 | Makela et al. |
| 2006/0164535 A1 | 7/2006 | Oyama |
| 2006/0170669 A1 | 8/2006 | Walker et al. |
| 2006/0184966 A1 | 8/2006 | Hunleth et al. |
| 2006/0240959 A1 | 10/2006 | Huang |
| 2006/0265643 A1 | 11/2006 | Saft et al. |
| 2006/0279532 A1 | 12/2006 | Olszewski et al. |
| 2007/0016868 A1 | 1/2007 | Nurmi |
| 2007/0031115 A1 | 2/2007 | Oshikiri et al. |
| 2007/0033069 A1 | 2/2007 | Rao et al. |
| 2007/0050726 A1 | 3/2007 | Wakai et al. |
| 2007/0055940 A1 | 3/2007 | Moore et al. |
| 2007/0061748 A1 | 3/2007 | Hirose |
| 2007/0071256 A1 | 3/2007 | Ito |
| 2007/0081740 A1 | 4/2007 | Ciudad et al. |
| 2007/0097421 A1 | 5/2007 | Sorensen et al. |
| 2007/0112754 A1 | 5/2007 | Haigh et al. |
| 2007/0113726 A1 | 5/2007 | Oliver et al. |
| 2007/0115373 A1 | 5/2007 | Gallagher et al. |
| 2007/0136778 A1 | 6/2007 | Birger et al. |
| 2007/0150839 A1 | 6/2007 | Danninger |
| 2007/0152984 A1 | 7/2007 | Ording et al. |
| 2007/0160345 A1 | 7/2007 | Sakai et al. |
| 2007/0169614 A1 | 7/2007 | Sasaki et al. |
| 2007/0179938 A1 | 8/2007 | Ikeda et al. |
| 2007/0186154 A1 | 8/2007 | Anthony et al. |
| 2007/0188518 A1 | 8/2007 | Vale et al. |
| 2007/0192741 A1 | 8/2007 | Yoritate et al. |
| 2007/0204225 A1 | 8/2007 | Berkowitz et al. |
| 2007/0209004 A1 | 9/2007 | Layard |
| 2007/0229678 A1 | 10/2007 | Barrus et al. |
| 2007/0236475 A1 | 10/2007 | Wherry |
| 2007/0245236 A1 | 10/2007 | Lee et al. |
| 2007/0245257 A1 | 10/2007 | Chan et al. |
| 2007/0253025 A1 | 11/2007 | Terayoko |
| 2007/0271340 A1 | 11/2007 | Goodman et al. |

(56) References Cited

U.S. PATENT DOCUMENTS

| | | |
|---|---|---|
| 2008/0019591 A1 | 1/2008 | Iwayama et al. |
| 2008/0030456 A1 | 2/2008 | Asadi et al. |
| 2008/0040668 A1 | 2/2008 | Ala-rantala |
| 2008/0051919 A1 | 2/2008 | Sakai et al. |
| 2008/0052945 A1 | 3/2008 | Matas et al. |
| 2008/0057941 A1 | 3/2008 | Scott et al. |
| 2008/0059888 A1 | 3/2008 | Dunko |
| 2008/0062141 A1 | 3/2008 | Chaudhri |
| 2008/0066010 A1 | 3/2008 | Brodersen et al. |
| 2008/0096726 A1 | 4/2008 | Riley et al. |
| 2008/0133697 A1 | 6/2008 | Stewart et al. |
| 2008/0134070 A1 | 6/2008 | Kobayashi et al. |
| 2008/0141135 A1 | 6/2008 | Mason et al. |
| 2008/0147664 A1 | 6/2008 | Fujiwara et al. |
| 2008/0152201 A1 | 6/2008 | Zhang et al. |
| 2008/0155474 A1 | 6/2008 | Duhig et al. |
| 2008/0155478 A1 | 6/2008 | Stress |
| 2008/0161161 A1 | 7/2008 | Pipinich et al. |
| 2008/0165141 A1 | 7/2008 | Christie |
| 2008/0168349 A1 | 7/2008 | Lamiraux et al. |
| 2008/0168402 A1 | 7/2008 | Blumenberg |
| 2008/0180404 A1 | 7/2008 | Han et al. |
| 2008/0216022 A1 | 9/2008 | Lorch et al. |
| 2008/0262946 A1 | 10/2008 | Wren |
| 2008/0282202 A1 | 11/2008 | Sunday |
| 2008/0297482 A1 | 12/2008 | Weiss |
| 2008/0309632 A1 | 12/2008 | Westerman et al. |
| 2008/0320419 A1 | 12/2008 | Matas et al. |
| 2009/0013350 A1 | 1/2009 | Ohlfs et al. |
| 2009/0021576 A1 | 1/2009 | Linder et al. |
| 2009/0051946 A1 | 2/2009 | Hibi |
| 2009/0055748 A1 | 2/2009 | Dieberger et al. |
| 2009/0063542 A1 | 3/2009 | Bull et al. |
| 2009/0075782 A1 | 3/2009 | Joubert et al. |
| 2009/0077460 A1 | 3/2009 | Li et al. |
| 2009/0113315 A1 | 4/2009 | Fisher et al. |
| 2009/0128516 A1 | 5/2009 | Rimon et al. |
| 2009/0132921 A1 | 5/2009 | Hwangbo et al. |
| 2009/0140997 A1 | 6/2009 | Jeong et al. |
| 2009/0158326 A1 | 6/2009 | Hunt et al. |
| 2009/0161962 A1 | 6/2009 | Gallagher et al. |
| 2009/0193351 A1 | 7/2009 | Lee et al. |
| 2009/0198359 A1 | 8/2009 | Chaudhri |
| 2009/0210793 A1 | 8/2009 | Yee et al. |
| 2009/0216806 A1 | 8/2009 | Feuerstein et al. |
| 2009/0259967 A1 | 10/2009 | Davidson et al. |
| 2009/0268949 A1 | 10/2009 | Ueshima et al. |
| 2009/0278806 A1 | 11/2009 | Duarte et al. |
| 2009/0282371 A1 | 11/2009 | Curl et al. |
| 2009/0284551 A1 | 11/2009 | Stanton |
| 2009/0307623 A1 | 12/2009 | Agarawala et al. |
| 2009/0319472 A1 | 12/2009 | Jain et al. |
| 2010/0046842 A1 | 2/2010 | Conwell |
| 2010/0058238 A1 | 3/2010 | Ben Moshe |
| 2010/0060586 A1 | 3/2010 | Pisula et al. |
| 2010/0062818 A1 | 3/2010 | Haughay et al. |
| 2010/0076976 A1 | 3/2010 | Sotirov et al. |
| 2010/0083173 A1 | 4/2010 | Germann et al. |
| 2010/0103321 A1 | 4/2010 | Ishikawa et al. |
| 2010/0110228 A1 | 5/2010 | Ozawa et al. |
| 2010/0124967 A1 | 5/2010 | Lutnick et al. |
| 2010/0125786 A1 | 5/2010 | Ozawa et al. |
| 2010/0149211 A1 | 6/2010 | Tossing et al. |
| 2010/0153833 A1 | 6/2010 | Siegel et al. |
| 2010/0169819 A1 | 7/2010 | Bestle et al. |
| 2010/0179874 A1 | 7/2010 | Higgins et al. |
| 2010/0184564 A1 | 7/2010 | Molyneux et al. |
| 2010/0191701 A1 | 7/2010 | Beyda et al. |
| 2010/0207892 A1 | 8/2010 | Lin et al. |
| 2010/0211575 A1 | 8/2010 | Collins et al. |
| 2010/0214442 A1 | 8/2010 | Uemura et al. |
| 2010/0241955 A1 | 9/2010 | Price et al. |
| 2010/0251167 A1 | 9/2010 | DeLuca et al. |
| 2010/0253807 A1 | 10/2010 | Matsumoto et al. |
| 2010/0262634 A1 | 10/2010 | Wang |
| 2010/0283754 A1 | 11/2010 | Nakao et al. |
| 2010/0287053 A1 | 11/2010 | Ganong et al. |
| 2010/0299601 A1 | 11/2010 | Kaplan et al. |
| 2010/0302179 A1 | 12/2010 | Ahn et al. |
| 2010/0331145 A1 | 12/2010 | Lakovic et al. |
| 2011/0016120 A1 | 1/2011 | Haughay et al. |
| 2011/0035700 A1 | 2/2011 | Meaney et al. |
| 2011/0050564 A1 | 3/2011 | Alberth et al. |
| 2011/0050640 A1 | 3/2011 | Lundback et al. |
| 2011/0069017 A1 | 3/2011 | Victor |
| 2011/0072394 A1 | 3/2011 | Victor et al. |
| 2011/0078717 A1 | 3/2011 | Drummond et al. |
| 2011/0099199 A1 | 4/2011 | Stalenhoef et al. |
| 2011/0099299 A1 | 4/2011 | Vasudevan et al. |
| 2011/0126148 A1 | 5/2011 | Krishnaraj et al. |
| 2011/0145275 A1 | 6/2011 | Stewart |
| 2011/0145327 A1 | 6/2011 | Stewart |
| 2011/0179097 A1 | 7/2011 | Ala-rantala |
| 2011/0246463 A1 | 10/2011 | Carson et al. |
| 2011/0246918 A1 | 10/2011 | Henderson |
| 2011/0267368 A1 | 11/2011 | Casillas et al. |
| 2011/0282867 A1 | 11/2011 | Palermiti et al. |
| 2011/0314422 A1 | 12/2011 | Cameron et al. |
| 2012/0015779 A1 | 1/2012 | Powch et al. |
| 2012/0036460 A1 | 2/2012 | Cieplinski et al. |
| 2012/0042272 A1 | 2/2012 | Hong et al. |
| 2012/0057081 A1 | 3/2012 | Petersson et al. |
| 2012/0058801 A1 | 3/2012 | Nurmi |
| 2012/0116550 A1 | 5/2012 | Hoffman et al. |
| 2012/0117506 A1 | 5/2012 | Koch et al. |
| 2012/0190386 A1 | 7/2012 | Anderson |
| 2012/0251079 A1 | 10/2012 | Meschter et al. |
| 2012/0253485 A1 | 10/2012 | Weast et al. |
| 2012/0311444 A1 | 12/2012 | Chaudhri |
| 2013/0013650 A1 | 1/2013 | Shum |
| 2013/0021368 A1 | 1/2013 | Lee et al. |
| 2013/0054634 A1 | 2/2013 | Chakraborty et al. |
| 2013/0061175 A1 | 3/2013 | Matas et al. |
| 2013/0117365 A1 | 5/2013 | Padmanabhan et al. |
| 2013/0145292 A1 | 6/2013 | Cohen et al. |
| 2013/0156275 A1 | 6/2013 | Amacker et al. |
| 2013/0179837 A1 | 7/2013 | Eriksson et al. |
| 2013/0198176 A1 | 8/2013 | Kim |
| 2013/0198661 A1 | 8/2013 | Matas |
| 2013/0205210 A1 | 8/2013 | Jeon et al. |
| 2013/0239049 A1 | 9/2013 | Perrodin et al. |
| 2013/0263055 A1 | 10/2013 | Victor |
| 2013/0263719 A1 | 10/2013 | Watterson et al. |
| 2013/0285948 A1 | 10/2013 | Zhang |
| 2013/0324210 A1 | 12/2013 | Doig et al. |
| 2014/0025737 A1 | 1/2014 | Kruglick |
| 2014/0038781 A1 | 2/2014 | Foley et al. |
| 2014/0064572 A1 | 3/2014 | Panzer et al. |
| 2014/0067096 A1 | 3/2014 | Aibara |
| 2014/0074825 A1 | 3/2014 | Wood et al. |
| 2014/0074893 A1 | 3/2014 | Griffin |
| 2014/0082533 A1 | 3/2014 | Kelley et al. |
| 2014/0089330 A1 | 3/2014 | Cui et al. |
| 2014/0092291 A1 | 4/2014 | Aoshima et al. |
| 2014/0165000 A1 | 6/2014 | Fleizach et al. |
| 2014/0181089 A1 | 6/2014 | Desmond et al. |
| 2014/0181205 A1 | 6/2014 | Sherrets et al. |
| 2014/0198234 A1 | 7/2014 | Kobayashi et al. |
| 2014/0225925 A1 | 8/2014 | Hayashi et al. |
| 2014/0282011 A1 | 9/2014 | Dellinger et al. |
| 2014/0282262 A1 | 9/2014 | Gregotski et al. |
| 2014/0289222 A1 | 9/2014 | Sharpe et al. |
| 2014/0337324 A1 | 11/2014 | Chao et al. |
| 2014/0341476 A1 | 11/2014 | Kulick et al. |
| 2014/0344693 A1 | 11/2014 | Reese et al. |
| 2014/0358473 A1 | 12/2014 | Goel et al. |
| 2014/0362274 A1 | 12/2014 | Christie et al. |
| 2014/0371887 A1 | 12/2014 | Hoffman et al. |
| 2014/0372436 A1 | 12/2014 | Makki et al. |
| 2014/0372889 A1 | 12/2014 | Lemay et al. |
| 2014/0372898 A1 | 12/2014 | Ayres et al. |
| 2015/0004578 A1 | 1/2015 | Gilley et al. |
| 2015/0039616 A1 | 2/2015 | Rolston et al. |
| 2015/0046814 A1 | 2/2015 | Haughay et al. |

(56) References Cited

U.S. PATENT DOCUMENTS

| | | |
|---|---|---|
| 2015/0078680 A1 | 3/2015 | Shakib et al. |
| 2015/0082250 A1 | 3/2015 | Wagner et al. |
| 2015/0112700 A1 | 4/2015 | Sublett et al. |
| 2015/0113553 A1 | 4/2015 | Pan |
| 2015/0118657 A1 | 4/2015 | Shrake et al. |
| 2015/0130719 A1 | 5/2015 | Wehrenberg et al. |
| 2015/0133748 A1 | 5/2015 | Edmonds et al. |
| 2015/0177979 A1 | 6/2015 | Johansson et al. |
| 2015/0180980 A1 | 6/2015 | Welinder et al. |
| 2015/0181314 A1 | 6/2015 | Swanson |
| 2015/0185967 A1 | 7/2015 | Ly et al. |
| 2015/0185995 A1 | 7/2015 | Shoemaker et al. |
| 2015/0196804 A1 | 7/2015 | Koduri et al. |
| 2015/0199494 A1 | 7/2015 | Koduri et al. |
| 2015/0213001 A1 | 7/2015 | Levy et al. |
| 2015/0227782 A1 | 8/2015 | Salvador et al. |
| 2015/0242689 A1 | 8/2015 | Mau |
| 2015/0244794 A1 | 8/2015 | Poletto et al. |
| 2015/0251053 A1 | 9/2015 | Hoffman et al. |
| 2015/0256491 A1 | 9/2015 | Eatough et al. |
| 2015/0262062 A1 | 9/2015 | Burger et al. |
| 2015/0287162 A1 | 10/2015 | Canan et al. |
| 2015/0309698 A1 | 10/2015 | Senderek et al. |
| 2015/0363409 A1 | 12/2015 | Wood et al. |
| 2016/0004820 A1 | 1/2016 | Moore |
| 2016/0019388 A1 | 1/2016 | Singla et al. |
| 2016/0044269 A1 | 2/2016 | Kang |
| 2016/0048263 A1 | 2/2016 | Hiraga et al. |
| 2016/0054845 A1 | 2/2016 | Takahashi et al. |
| 2016/0058336 A1 | 3/2016 | Blahnik et al. |
| 2016/0073034 A1 | 3/2016 | Mukherjee et al. |
| 2016/0107031 A1 | 4/2016 | Palatsi et al. |
| 2016/0110355 A1 | 4/2016 | Charania et al. |
| 2016/0140146 A1 | 5/2016 | Wexler et al. |
| 2016/0202889 A1 | 7/2016 | Shin et al. |
| 2016/0216868 A1 | 7/2016 | Victor et al. |
| 2016/0226804 A1 | 8/2016 | Hampson et al. |
| 2016/0234184 A1 | 8/2016 | Liu et al. |
| 2016/0239724 A1 | 8/2016 | Arfvidsson et al. |
| 2016/0255162 A1 | 9/2016 | Frieder et al. |
| 2016/0279475 A1 | 9/2016 | Aragones et al. |
| 2016/0283483 A1 | 9/2016 | Jiang et al. |
| 2016/0321831 A1 | 11/2016 | Nakamura et al. |
| 2017/0001073 A1 | 1/2017 | Krueger et al. |
| 2017/0019587 A1 | 1/2017 | Matas et al. |
| 2017/0026430 A1 | 1/2017 | Beckhardt et al. |
| 2017/0041549 A1 | 2/2017 | Kim et al. |
| 2017/0053542 A1 | 2/2017 | Wilson et al. |
| 2017/0063753 A1 | 3/2017 | Probasco et al. |
| 2017/0078621 A1 | 3/2017 | Sahay et al. |
| 2017/0093780 A1 | 3/2017 | Lieb et al. |
| 2017/0139554 A1 | 5/2017 | Nakabayashi et al. |
| 2017/0143262 A1 | 5/2017 | Kurunmaki et al. |
| 2017/0169295 A1 | 6/2017 | Park et al. |
| 2017/0192625 A1 | 7/2017 | Kim et al. |
| 2017/0209766 A1 | 7/2017 | Riley et al. |
| 2017/0244959 A1 | 8/2017 | Kumar et al. |
| 2017/0266494 A1 | 9/2017 | Crankson et al. |
| 2017/0329933 A1 | 11/2017 | Brust et al. |
| 2017/0337033 A1 | 11/2017 | Duyan et al. |
| 2017/0344257 A1 | 11/2017 | Gnedin et al. |
| 2017/0357382 A1 | 12/2017 | Miura et al. |
| 2017/0357409 A1 | 12/2017 | Wagner et al. |
| 2018/0034765 A1 | 2/2018 | Keszler et al. |
| 2018/0039406 A1 | 2/2018 | Kong et al. |
| 2018/0056132 A1 | 3/2018 | Foley et al. |
| 2018/0068019 A1 | 3/2018 | Novikoff et al. |
| 2018/0083901 A1 | 3/2018 | McGregor et al. |
| 2018/0126248 A1 | 5/2018 | Dion et al. |
| 2018/0140903 A1 | 5/2018 | Poure et al. |
| 2018/0143761 A1 | 5/2018 | Choi et al. |
| 2018/0181668 A1 | 6/2018 | Zhang et al. |
| 2018/0204111 A1 | 7/2018 | Zadeh et al. |
| 2018/0294053 A1 | 10/2018 | Runyon et al. |
| 2018/0318647 A1 | 11/2018 | Foley et al. |
| 2018/0321048 A1 | 11/2018 | Li et al. |
| 2018/0329584 A1 | 11/2018 | Williams et al. |
| 2018/0339195 A1 | 11/2018 | Bernotas |
| 2018/0345078 A1 | 12/2018 | Blahnik et al. |
| 2018/0364872 A1 | 12/2018 | Miura et al. |
| 2018/0367862 A1 | 12/2018 | Horii et al. |
| 2019/0073081 A1 | 3/2019 | Takahashi et al. |
| 2019/0143194 A1 | 5/2019 | Evancha et al. |
| 2019/0184234 A1 | 6/2019 | Packles et al. |
| 2019/0209777 A1 | 7/2019 | O'connell et al. |
| 2019/0258383 A1 | 8/2019 | Wagner et al. |
| 2019/0279520 A1 | 9/2019 | Wilson et al. |
| 2019/0313012 A1 | 10/2019 | Matas |
| 2019/0336827 A1 | 11/2019 | Intonato et al. |
| 2019/0339822 A1 | 11/2019 | Devine et al. |
| 2019/0339849 A1 | 11/2019 | Williams et al. |
| 2019/0339860 A1 | 11/2019 | Chen et al. |
| 2019/0342616 A1 | 11/2019 | Domm et al. |
| 2020/0004409 A1 | 1/2020 | Victor |
| 2020/0014967 A1 | 1/2020 | Putnam |
| 2020/0054931 A1 | 2/2020 | Martin et al. |
| 2020/0110814 A1 | 4/2020 | Abuelsaad et al. |
| 2020/0160961 A1 | 5/2020 | Wadhawan et al. |
| 2020/0257434 A1 | 8/2020 | Victor |
| 2020/0356222 A1 | 11/2020 | Clarke et al. |
| 2020/0356590 A1 | 11/2020 | Clarke et al. |
| 2020/0363932 A1 | 11/2020 | Wagner et al. |
| 2021/0093919 A1 | 4/2021 | Lyke et al. |
| 2021/0117072 A1 | 4/2021 | Victor |
| 2021/0191578 A1 | 6/2021 | Miura et al. |
| 2021/0252337 A1 | 8/2021 | Devine et al. |
| 2021/0252341 A1 | 8/2021 | Devine et al. |
| 2021/0252369 A1 | 8/2021 | Devine et al. |
| 2021/0255747 A1 | 8/2021 | Devine et al. |
| 2021/0255758 A1 | 8/2021 | Devine et al. |
| 2021/0255826 A1 | 8/2021 | Devine et al. |
| 2021/0379447 A1 | 12/2021 | Lee |
| 2022/0027039 A1 | 1/2022 | Wagner et al. |
| 2022/0062707 A1 | 3/2022 | Bedekar et al. |
| 2022/0206647 A1 | 6/2022 | Clarke et al. |
| 2022/0276750 A1 | 9/2022 | Miura et al. |
| 2022/0317846 A1 | 10/2022 | Victor |
| 2022/0382443 A1 | 12/2022 | Clarke et al. |

FOREIGN PATENT DOCUMENTS

| | | |
|---|---|---|
| CN | 1619541 A | 5/2005 |
| CN | 1685714 A | 10/2005 |
| CN | 1695105 A | 11/2005 |
| CN | 1702645 A | 11/2005 |
| CN | 1717918 A | 1/2006 |
| CN | 1735921 A | 2/2006 |
| CN | 1756273 A | 4/2006 |
| CN | 101854278 A | 10/2010 |
| CN | 102483758 A | 5/2012 |
| CN | 102681847 A | 9/2012 |
| CN | 102693311 A | 9/2012 |
| CN | 103081496 A | 5/2013 |
| CN | 104035666 A | 9/2014 |
| CN | 104815428 A | 8/2015 |
| CN | 105103154 A | 11/2015 |
| CN | 105264480 A | 1/2016 |
| CN | 105874447 A | 8/2016 |
| CN | 107430483 A | 12/2017 |
| CN | 107710197 A | 2/2018 |
| EP | 0871177 A2 | 10/1998 |
| EP | 1124175 A2 | 8/2001 |
| EP | 1148412 A2 | 10/2001 |
| EP | 1289210 A2 | 3/2003 |
| EP | 1577746 A2 | 9/2005 |
| EP | 1615114 A2 | 1/2006 |
| EP | 1840717 A1 | 10/2007 |
| EP | 2045703 A2 | 4/2009 |
| EP | 2060970 A1 | 5/2009 |
| EP | 2068237 A2 | 6/2009 |
| EP | 2509074 A2 | 10/2012 |
| EP | 3122038 A1 | 1/2017 |
| FR | 2830093 A3 | 3/2003 |
| GB | 2402105 A | 12/2004 |

(56) References Cited

FOREIGN PATENT DOCUMENTS

| | | |
|---|---|---|
| GB | 2420260 A | 5/2006 |
| GB | 2550639 A | 11/2017 |
| JP | 3-217976 A | 9/1991 |
| JP | 6-309138 A | 11/1994 |
| JP | 8-106469 A | 4/1996 |
| JP | 10-93848 A | 4/1998 |
| JP | 11-164175 A | 6/1999 |
| JP | 11-168694 A | 6/1999 |
| JP | 11-341425 A | 12/1999 |
| JP | 2000-138883 A | 5/2000 |
| JP | 2000-138888 A | 5/2000 |
| JP | 2000-148591 A | 5/2000 |
| JP | 2000-163031 A | 6/2000 |
| JP | 2000-221879 A | 8/2000 |
| JP | 2000-244637 A | 9/2000 |
| JP | 2000-244673 A | 9/2000 |
| JP | 2000-350134 A | 12/2000 |
| JP | 2001-136303 A | 5/2001 |
| JP | 2001-265481 A | 9/2001 |
| JP | 2001-309019 A | 11/2001 |
| JP | 2002-152559 A | 5/2002 |
| JP | 2003-102868 A | 4/2003 |
| JP | 2003-163820 A | 6/2003 |
| JP | 2003-338975 A | 11/2003 |
| JP | 2003-345491 A | 12/2003 |
| JP | 2003-348432 A | 12/2003 |
| JP | 2004-15586 A | 1/2004 |
| JP | 2004-32346 A | 1/2004 |
| JP | 2004-145291 A | 5/2004 |
| JP | 2004-153832 A | 5/2004 |
| JP | 2004-288208 A | 10/2004 |
| JP | 2004-336536 A | 11/2004 |
| JP | 2004-336711 A | 11/2004 |
| JP | 2005-38101 A | 2/2005 |
| JP | 2005-92386 A | 4/2005 |
| JP | 2005-100084 A | 4/2005 |
| JP | 2005-515530 A | 5/2005 |
| JP | 2005-150836 A | 6/2005 |
| JP | 2005-175991 A | 6/2005 |
| JP | 2005-202483 A | 7/2005 |
| JP | 2005-202651 A | 7/2005 |
| JP | 2005182320 A | 7/2005 |
| JP | 2005-303728 A | 10/2005 |
| JP | 2005-321516 A | 11/2005 |
| JP | 2005-339420 A | 12/2005 |
| JP | 2006-67344 A | 3/2006 |
| JP | 2006-139340 A | 6/2006 |
| JP | 2006-140865 A | 6/2006 |
| JP | 2006-195592 A | 7/2006 |
| JP | 2006-203809 A | 8/2006 |
| JP | 2006-236249 A | 9/2006 |
| JP | 2007-515775 A | 6/2007 |
| JP | 2007-525775 A | 9/2007 |
| JP | 2007-287014 A | 11/2007 |
| JP | 2008-106469 A | 5/2008 |
| JP | 2008-518330 A | 5/2008 |
| JP | 2009-59042 A | 3/2009 |
| JP | 2009-112731 A | 5/2009 |
| JP | 20105-3130 A | 1/2010 |
| JP | 2012-20134 A | 2/2012 |
| JP | 2013-83689 A | 5/2013 |
| JP | 2013-84282 A | 5/2013 |
| JP | 2013-140171 A | 7/2013 |
| JP | 2014-500740 A | 1/2014 |
| JP | 2014-93003 A | 5/2014 |
| JP | 2014-95979 A | 5/2014 |
| JP | 5771242 B2 | 8/2015 |
| JP | 2016-17331 A | 2/2016 |
| JP | 2016-35776 A | 3/2016 |
| JP | 2016-52512 A | 4/2016 |
| JP | 2016-517329 A | 6/2016 |
| JP | 2016-167299 A | 9/2016 |
| JP | 2016-201135 A | 12/2016 |
| JP | 2017-532069 A | 11/2017 |
| JP | 2018-202174 A | 12/2018 |
| JP | 2019-3670 A | 1/2019 |
| KR | 10-2005-0101162 A | 10/2005 |
| KR | 10-2006-0032793 A | 4/2006 |
| KR | 10-2012-0058539 A | 6/2012 |
| KR | 10-2012-0092644 A | 8/2012 |
| KR | 10-2013-0026541 A | 3/2013 |
| KR | 10-2014-0067965 A | 6/2014 |
| KR | 10-2015-0131257 A | 11/2015 |
| KR | 10-2015-0131262 A | 11/2015 |
| KR | 10-2016-0027943 A | 3/2016 |
| KR | 10-1611895 B1 | 4/2016 |
| KR | 10-2019-0022883 A | 3/2019 |
| KR | 10-2019-0141702 A | 12/2019 |
| WO | 1999/54807 A1 | 10/1999 |
| WO | 2001/029702 A2 | 4/2001 |
| WO | 2002/080176 A2 | 10/2002 |
| WO | 2003/023593 A1 | 3/2003 |
| WO | 2003/060622 A2 | 7/2003 |
| WO | 2003/081458 A1 | 10/2003 |
| WO | 2004/032053 A1 | 4/2004 |
| WO | 2005/060392 A2 | 7/2005 |
| WO | 2005/093550 A2 | 10/2005 |
| WO | 2005/103863 A2 | 11/2005 |
| WO | 2006/020305 A2 | 2/2006 |
| WO | 2006/045530 A2 | 5/2006 |
| WO | 2006/047697 A2 | 5/2006 |
| WO | 2008/030779 A2 | 3/2008 |
| WO | 2008/085737 A1 | 7/2008 |
| WO | 2009/082814 A1 | 7/2009 |
| WO | 2009/084141 A1 | 7/2009 |
| WO | 2009/129402 A1 | 10/2009 |
| WO | 2009/155991 A1 | 12/2009 |
| WO | 2011/017653 A1 | 2/2011 |
| WO | 2011/028424 A1 | 3/2011 |
| WO | 2011/051091 A1 | 5/2011 |
| WO | 2011/084856 A1 | 7/2011 |
| WO | 2012/061438 A2 | 5/2012 |
| WO | 2012/097385 A2 | 7/2012 |
| WO | 2014/149473 A1 | 9/2014 |
| WO | 2014/149488 A1 | 9/2014 |
| WO | 2014/162659 A1 | 10/2014 |
| WO | 2014/200734 A1 | 12/2014 |
| WO | 2015/179592 A1 | 11/2015 |
| WO | 2016/036582 A2 | 3/2016 |
| WO | 2016/077834 A1 | 5/2016 |
| WO | 2016/160632 A1 | 10/2016 |
| WO | 2018/048510 A1 | 3/2018 |
| WO | 2018/213066 A1 | 11/2018 |
| WO | 2019/183422 A1 | 9/2019 |
| WO | 2019/217249 A2 | 11/2019 |
| WO | 2019/231982 A1 | 12/2019 |

OTHER PUBLICATIONS

Corrected Notice of Allowance received for U.S. Appl. No. 17/030,318, dated Jan. 24, 2022, 2 pages.
Decision to Grant received for European Patent Application No. 19724963.4, dated Feb. 3, 2022, 2 pages.
Intention to Grant received for Danish Patent Application No. PA202070615, dated Jan. 27, 2022, 2 pages.
Notice of Acceptance received for Australian Patent Application No. 2020239743, dated Jan. 13, 2022, 3 pages.
Notice of Allowance received for U.S. Appl. No. 17/125,744, dated Feb. 7, 2022, 10 pages.
Office Action received for Danish Patent Application No. PA202070616, dated Jan. 27, 2022, 2 pages.
Office Action received for Japanese Patent Application No. 2020-160053, dated Jan. 31, 2022, 8 pages (4 pages of English Translation and 4 pages of Official Copy).
Office Action received for Japanese Patent Application No. 2020-160054, dated Jan. 21, 2022, 8 pages (4 pages of English Translation and 4 pages of Official Copy).
Advisory Action received for U.S. Appl. No. 16/145,033, dated Nov. 2, 2021, 5 pages.
Office Action received for Australian Patent Application No. 2020239752, dated Oct. 25, 2021, 5 pages.

(56) References Cited

OTHER PUBLICATIONS

Corrected Notice of Allowance received for U.S. Appl. No. 16/983,815, dated Mar. 31, 2021, 6 pages.
Notice of Allowance received for U.S. Appl. No. 16/983,815, dated Mar. 18, 2021, 11 pages.
Result of Consultation received for European Patent Application No. 19724963.4, dated Jul. 8, 2021, 3 pages.
Applicant Initiated Interview Summary received for U.S. Appl. No. 17/030,318, dated Jul. 30, 2021, 4 pages.
Applicant Initiated Interview Summary received for U.S. Appl. No. 17/030,321, dated Jul. 30, 2021, 2 pages.
Final Office Action received for U.S. Appl. No. 17/030,321, dated Apr. 2, 2021, 28 pages.
Invitation to Pay Additional Fees received for PCT Patent Application No. PCT/US2021/017736, dated Jun. 15, 2021, 14 pages.
Non-Final Office Action received for U.S. Appl. No. 17/030,318, dated Apr. 2, 2021, 28 pages.
Non-Final Office Action received for U.S. Appl. No. 17/030,318, dated Dec. 3, 2020, 22 pages.
Non-Final Office Action received for U.S. Appl. No. 17/030,321, dated Dec. 15, 2020, 25 pages.
Notice of Allowance received for Chinese Patent Application No. 201811136445.7, dated Aug. 11, 2021, 2 pages (1 page of English Translation and 1 page of Official Copy).
Office Action received for Australian Patent Application No. 2020239743, dated Mar. 25, 2021, 8 pages.
Office Action received for Australian Patent Application No. 2020239748, dated Apr. 21, 2021, 6 pages.
Office Action received for Australian Patent Application No. 2020239752, dated Jun. 4, 2021, 8 pages.
Office Action received for Japanese Patent Application No. 2018-138559, dated Jul. 26, 2021, 37 pages (5 pages of English Translation and 32 pages of Official Copy).
Office Action received for Japanese Patent Application No. 2020-079486, dated Jul. 16, 2021, 10 pages (5 pages of English Translation and 5 pages of Official Copy).
Search Report and Opinion received for Danish Patent Application No. PA202070612, dated Jun. 7, 2021, 9 pages.
Search Report and Opinion received for Danish Patent Application No. PA202070613, dated Jan. 22, 2021, 9 pages.
Search Report and Opinion received for Danish Patent Application No. PA202070615, dated Jan. 22, 2021, 9 pages.
Search Report and Opinion received for Danish Patent Application No. PA202070616, dated Feb. 3, 2021, 8 pages.
Summons to Attend Oral Proceedings received for European Patent Application No. 17813778.2, dated Aug. 13, 2021, 13 pages.
Decision to Refuse received for European Patent Application No. 17813778.2, dated Jan. 24, 2022, 17 pages.
Minutes of the Oral Proceedings received for European Patent Application No. 17813778.2, dated Jan. 21, 2022, 7 pages.
Office Action received for German Patent Application No. 112007000067.8, dated Apr. 23, 2009, 15 pages (7 pages of English Translation and 8 pages of Official Copy).
Office Action received for German Patent Application No. 112007000067.8, dated Sep. 14, 2010, 4 pages (2 pages of English Translation and 2 pages of Official Copy).
Summons to Oral Proceedings received for German Patent Application No. 112007000067.8, dated Dec. 8, 2021, 11 pages (5 pages of English Translation and 6 pages of Official Copy).
Office Action received for Australian Patent Application No. 2019266054, dated Aug. 23, 2021, 4 pages.
Office Action received for Australian Patent Application No. 2020239748, dated Sep. 1, 2021, 4 pages.
Corrected Notice of Allowance received for U.S. Appl. No. 17/125,744, dated Dec. 24, 2021, 2 pages.
Notice of Allowance received for U.S. Appl. No. 16/584,783, dated Dec. 20, 2021, 7 pages.
Notice of Allowance received for U.S. Appl. No. 17/030,318, dated Jan. 5, 2022, 8 pages.
Office Action received for Indian Patent Application No. 202014041563, dated Dec. 30, 2021, 6 pages.
Office Action received for Indian Patent Application No. 202014041571, dated Dec. 17, 2021, 5 pages.
Office Action received for Japanese Patent Application No. 2020-160052, dated Dec. 17, 2021, 10 pages (5 pages of English Translation and 5 pages of Official Copy).
Applicant-Initiated Interview Summary received for U.S. Appl. No. 16/145,033, dated Apr. 30, 2021, 4 pages.
Office Action received for Chinese Patent Application No. 201811136445.7, dated Apr. 14, 2021, 7 pages (4 pages of English Translation and 3 pages of Official Copy).
Notice of Allowance received for Korean Patent Application No. 10-2020-7018255, dated Feb. 24, 2021, 5 pages (2 pages of English Translation and 3 pages of Official Copy).
Minutes of the Oral Proceedings received for European Patent Application No. 19724963.4, dated Sep. 3, 2021, 6 pages.
Notice of Allowance received for Japanese Patent Application No. 2021-094529, dated Sep. 6, 2021, 4 pages (1 page of English Translation and 3 pages of Official Copy).
Office Action received for Australian Patent Application No. 2020239743, dated Sep. 3, 2021, 4 pages.
Corrected Notice of Allowance received for U.S. Appl. No. 17/125,744, dated Dec. 8, 2021, 2 pages.
Notice of Acceptance received for Australian Patent Application No. 2019266054, dated Nov. 25, 2021, 3 pages.
Notice of Acceptance received for Australian Patent Application No. 2020267396, dated Dec. 7, 2021, 3 pages.
Notice of Allowance received for Japanese Patent Application No. 2018-138559, dated Dec. 3, 2021, 3 pages (1 page of English Translation and 2 pages of Official Copy).
Result of Consultation received for European Patent Application No. 17813778.2, dated Dec. 6, 2021, 17 pages.
Brief Communication Regarding Oral Proceedings received for European Patent Application No. 19724963.4, dated Jun. 22, 2021, 2 pages.
Final Office Action received for U.S. Appl. No. 16/145,033, dated Jul. 6, 2021, 113 pages.
Office Action received for Australian Patent Application No. 2019266054, dated Jun. 29, 2021, 3 pages.
Notice of Allowance received for U.S. Appl. No. 17/125,744, dated Oct. 21, 2021, 11 pages.
Supplemental Notice of Allowance received for U.S. Appl. No. 17/035,367, dated Oct. 27, 2021, 3 pages.
Adeniyi, Samuel, "How to connect a second PS4 controller to a PlayStation 4 console", Online available on:—https://www.youtube.com/watch?v=mOZX_SrNISE, May 28, 2017, 2 pages.
Allison, Conor, "Working out with Fiit's wearable-powered boutique fitness classes", Online available at:—<https://www.wareable.com/wearable-tech/fiit-fitness-classes-review-3849>, May 14, 2018, 8 pages.
Applicant Initiated Interview Summary received for U.S. Appl. No. 16/584,783, dated May 4, 2020, 3 pages.
Applicant-Initiated Interview Summary received for U.S. Appl. No. 16/145,033, dated Nov. 24, 2020, 4 pages.
Applicant-Initiated Interview Summary received for U.S. Appl. No. 16/584,776, dated May 13, 2020, 9 pages.
Applicant-Initiated Interview Summary received for U.S. Appl. No. 16/584,776, dated Nov. 25, 2020, 5 pages.
CBS This Morning, "This smart mirror puts a personal trainer in your reflection", Available on: https://www.youtube.com/watch?v=nSmTTZcpVGg, Oct. 13, 2018, 4 pages.
Decision to Grant received for European Patent Application No. 17180535.1, dated Feb. 4, 2021, 2 pages.
Examiner's Answer to Appeal Brief received for U.S. Appl. No. 16/584,783, dated Feb. 17, 2021, 9 pages.
Final Office Action received for U.S. Appl. No. 16/145,033, dated Sep. 22, 2020, 49 pages.
Final Office Action received for U.S. Appl. No. 16/584,783, dated May 19, 2020, 19 pages.
Hamilton, Jim, "Peloton Tips", Online available on :—<https://www.youtube.com/watch?app=desktop&v=OneXtBOkaD4>, Oct. 23, 2015, 3 pages.

(56) References Cited

OTHER PUBLICATIONS

Intention to Grant received for European Patent Application No. 17180535.1, dated Sep. 24, 2020, 7 pages.
International Preliminary Report on Patentability received for PCT Patent Application No. PCT/US2019/024790, dated Nov. 19, 2020, 11 pages.
International Search Report and Written Opinion received for PCT Patent Application No. PCT/US2020/031442, dated Oct. 30, 2020, 28 pages.
Invitation to Pay Additional Fees received for PCT Patent Application No. PCT/US2020/031442, dated Aug. 25, 2020, 22 pages.
Non-Final Office Action received for U.S. Appl. No. 16/145,033, dated Feb. 9, 2021, 55 pages.
Non-Final Office Action received for U.S. Appl. No. 16/584,776, dated Aug. 18, 2020, 36 pages.
Non-Final Office Action received for U.S. Appl. No. 16/584,776, dated Feb. 13, 2020, 31 pages.
Non-Final Office Action received for U.S. Appl. No. 16/584,783, dated Jan. 30, 2020, 18 pages.
Notice of Acceptance received for Australian Patent Application No. 2019264623, dated Jan. 4, 2021, 3 pages.
Notice of Acceptance received for Australian Patent Application No. 2019271873, dated Nov. 30, 2020, 3 pages.
Notice of Allowance received for Japanese Patent Application No. 2019-123115, dated Nov. 30, 2020, 4 pages (1 page of English Translation and 3 pages of Official Copy).
Notice of Allowance received for U.S. Appl. No. 16/109,487, dated Nov. 23, 2020, 3 pages.
Notice of Allowance received for U.S. Appl. No. 16/584,776, dated Feb. 1, 2021, 9 pages.
Office Action received for Australian Patent Application No. 2019271873, dated Oct. 5, 2020, 3 pages.
Office Action received for Chinese Patent Application No. 201811136445.7, dated Oct. 28, 2020, 17 pages (10 pages of English Translation and 7 pages of Official Copy).
Office Action received for Danish Patent Application No. PA201970535, dated May 20, 2020, 3 pages.
Office Action received for Danish Patent Application No. PA201970535, dated Oct. 27, 2020, 6 pages.
Office Action received for European Patent Application No. 17813778.2, dated Nov. 26, 2020, 10 pages.
Office Action received for Japanese Patent Application No. 2019-123115, dated Aug. 31, 2020, 9 pages (4 pages of English Translation and 5 pages of Official Copy).
Office Action received for Korean Patent Application No. 10-2020-7018255, dated Sep. 10, 2020, 12 pages (5 pages of English Translation and 7 pages of Official Copy).
Summons to Attend Oral Proceedings received for European Patent Application No. 19724963.4, dated Dec. 23, 2020, 8 pages.
Supplemental Notice of Allowance received for U.S. Appl. No. 16/584,776, dated Feb. 18, 2021, 3 pages.
Vicky's Blog, "How to Log in to PS4 Automatically with Particular User?", Online available on:—https://www.youtube.com/watch?v=kqdlzXAvOkY, May 30, 2018, 3 pages.
YoYodavid, "How to Use Multiple Accounts on the Playstation 4", Online available at:—https://www.youtube.com/watch?v=5V21obRMeKE, Jan. 9, 2014, 3 pages.
Advisory Action received for U.S. Appl. No. 10/497,076, dated Aug. 2, 2011, 3 pages.
Advisory Action received for U.S. Appl. No. 10/497,076, dated Oct. 28, 2008, 3 pages.
Advisory Action received for U.S. Appl. No. 14/253,783, dated Feb. 15, 2017, 6 pages.
Applicant Initiated Interview Summary received for U.S. Appl. No. 16/109,487, dated Apr. 21, 2020, 5 pages.
Applicant-Initiated Interview Summary for U.S. Appl. No. 16/402,057, dated Mar. 16, 2020, 3 pages.
Applicant-Initiated Interview Summary received for U.S. Appl. No. 16/145,033, dated Jun. 29, 2020, 5 pages.
Applicant-Initiated Interview Summary received for U.S. Appl. No. 16/450,531, dated Aug. 11, 2020, 5 pages.
Board Opinion received for Chinese Reexamination Patent Application No. 200780001142.8, dated Oct. 21, 2014, 13 pages.
Certificate of Examination received for Australian Patent Application No. 2019100490, dated Oct. 16, 2019, 2 pages.
Certificate of Grant received for Hong-Kong Patent Application No. 12105228.9, dated Oct. 25, 2013, 2 pages.
Corrected Notice of Allowance received for U.S. Appl. No. 12/566,994, dated Jan. 22, 2015, 2 pages.
Corrected Notice of Allowance received for U.S. Appl. No. 13/666,943, dated Aug. 11, 2016, 2 pages.
Corrected Notice of Allowance received for U.S. Appl. No. 15/281,524, dated Jun. 3, 2019, 2 pages.
Corrected Notice of Allowance received for U.S. Appl. No. 16/402,057, dated Jul. 6, 2020, 2 pages.
Corrected Notice of Allowance received for U.S. Appl. No. 16/450,531, dated Nov. 12, 2020, 2 pages.
Corrected Notice of Allowance received for U.S. Appl. No. 16/450,531, dated Oct. 30, 2020, 2 pages.
Dailywireless.org,"GPS Blogging Phones", Available online at: <http://www.dailywireless.org/2005/08/25/gps-blogging-phones/>, retrieved on Aug. 25, 2005, 4 pages.
Decision of Grant received for Japanese Patent Application No. 2011-271621, dated Jun. 7, 2013, 3 pages.
Decision to Grant received for Chinese Patent Application No. 201010227633.8, dated Jun. 5, 2012, 2 pages.
Decision to Grant received for Danish Patent Application No. PA201870385, dated Mar. 26, 2020, 2 pages.
Decision to Grant received for European Patent Application No. 09756118.7, dated Jul. 13, 2017, 2 pages.
Decision to Grant received for European Patent Application No. 11178259.5, dated Apr. 4, 2019, 3 pages.
Decision to Grant received for Japanese Patent Application No. 2009-526943, dated Dec. 2, 2011, 3 pages.
Decision to Grant received for the European Patent Application No. 07814633.9, dated Sep. 2, 2010, 3 pages.
Decision to Grant received for the European Patent Application No. 10172417.7, dated Nov. 14, 2013, 3 pages.
Decision to Grant received for the European Patent Application No. 11178257.9, dated Jun. 20, 2013, 3 pages.
Ed Bott, "Chapter 14. Playing and Recording Digital Music", Special Edition Using Microsoft Windows Millennium Edition, Nov. 2000, pp. 329-353.
European Search Report received for the European Application No. 11178259.5, dated Oct. 31, 2011, 8 pages.
European Search Report received for the European Patent Application No. 10172417.7, dated Jan. 7, 2011, 4 pages.
Examiner's Pre-Review Report received for Japanese Patent Application No. 2018-138559, dated Jul. 29, 2020, 6 pages.
Ex-Parte Quayle Action received for U.S. Appl. No. 12/567,570, dated Oct. 3, 2012, 6 pages.
Extended European Search Report received for European Patent Application No. 11178257.9, dated Oct. 31, 2011, 5 pages.
Extended European Search Report received for European Patent Application No. 17813778.2, dated Jan. 10, 2020, 12 pages.
Extended European Search Report received for European Patent Application No. 18197554.1, dated Jun. 3, 2019, 11 pages.
Extended European Search Report received for European Patent Application No. 17180535.1, dated Oct. 30, 2017, 9 pages.
Final Office Action received for U.S. Appl. No. 10/497,076 dated Feb. 10, 2012, 25 pages.
Final Office Action received for U.S. Appl. No. 10/497,076, dated Apr. 26, 2013, 30 pages.
Final Office Action received for U.S. Appl. No. 10/497,076, dated Feb. 2, 2011, 22 pages.
Final Office Action received for U.S. Appl. No. 10/497,076, dated Jun. 12, 2008, 31 pages.
Final Office Action received for U.S. Appl. No. 10/497,076, dated Oct. 6, 2009, 29 pages.
Final Office Action received for U.S. Appl. No. 12/567,405, dated Dec. 17, 2012, 19 pages.

(56) References Cited

OTHER PUBLICATIONS

Final Office Action received for U.S. Appl. No. 12/567,553, dated Mar. 12, 2012, 15 pages.
Final Office Action received for U.S. Appl. No. 15/281,524, dated Dec. 27, 2018, 6 pages.
Final Office Action received for U.S. Appl. No. 16/402,057, dated Oct. 17, 2019, 23 pages.
Final Office Action received for U.S. Appl. No. 14/253,783, dated Sep. 30, 2016, 18 pages.
Gears Leigh, "Orange SPV 0600 Review", Available at <http://www.coolsmartphone.com/article569.html>, retrieved on Apr. 14, 2006, 57 pages.
Google Earth Blog, "New Improved Panoramio—Geo Photo Sharing", Available online at: <http://www.gearthblog.com/blog/archives/2006/06/new_improved_pa.html>, 2008, 1 page.
Han Jefly., "Multi-Touch Interaction Research", available at <http://mrl.nyu.edu/~jhan/ftirtouch/>, retrieved on Apr. 13, 2006, 4 pages.
Helm Josh, "Microsoft® Windows Media™ Player Version 7—New features and Walk-through", Jul. 2000, 20 pages.
Hinckley et al., "Sensing Techniques for Mobile Interaction", Symposium on User Interface Software and Technology, CHI Letters, vol. 2, No. 2, Nov. 2000, pp. 91-100.
Hughes Neil, "Apple Explores Merging Cloud Content with Locally Stored Media Library", Available at <http://appleinsider.com/articles/11/02/10/apple_explores_merging_cloud_content_with_locally_stored_media_library.html>, XP55040717, Feb. 10, 2011, 2 pages.
Intention to Grant received for Danish Patent Application No. PA201870385, dated Jan. 24, 2020, 2 pages.
Intention to Grant received for European Patent Application No. 09756118.7, dated Mar. 2, 2017, 8 pages.
Intention to Grant received for European Patent Application No. 10172417.7, dated Jul. 9, 2013, 10 pages.
Intention to Grant received for European Patent Application No. 11178257.9, dated Jan. 30, 2013, 9 pages.
Intention to Grant received for European Patent Application No. 11178259.5, dated Nov. 8, 2018, 16 pages.
Intention to Grant received for the European Patent Application No. 07814633.9, dated Mar. 19, 2010, 4 pages.
International Preliminary Examination Report on Patentability received for PCT Patent Application No. PCT/US2002/000484, dated Aug. 4, 2003, 7 pages.
International Preliminary Report on Patentability received for PCT Patent Application No. PCT/US2007/077441, dated Mar. 10, 2009, 9 pages.
International Preliminary Report on Patentability received for PCT Patent Application No. PCT/US2009/057899, dated Apr. 5, 2012, 14 pages.
International Preliminary Report on Patentability received for PCT Patent Application No. PCT/US2011/020403, dated Jul. 19, 2012, 10 pages.
International Preliminary Report on Patentability received for PCT Patent Application No. PCT/US2017/035322, dated Dec. 27, 2018, 13 pages.
International Search Report and Written Opinion received for PCT Patent Application No. PCT/US2002/000484, dated Jul. 11, 2002, 1 page.
International Search Report and Written Opinion received for PCT Patent Application No. PCT/US2009/057899, dated Jun. 14, 2010, 19 pages.
International Search Report and Written Opinion received for PCT Patent Application No. PCT/US2011/020403, dated May 26, 2011, 14 pages.
International Search Report and Written Opinion Received for PCT Patent Application No. PCT/US2017/035322, dated Oct. 5, 2017, 18 pages.
International Search Report and Written Opinion received for PCT Patent Application No. PCT/US2019/024790, dated Sep. 11, 2019, 18 pages.
International Search Report and Written Opinion, received for PCT Patent Application No. PCT/US2007/077441, dated May 8, 2008, 13 pages.
Invitation to Pay Additional Fee received for PCT Patent Application No. PCT/US2019/024790, dated Jul. 18, 2019, 10 pages.
Invitation to Pay Additional Fees received for PCT Patent Application No. PCT/US2007/077441, dated Jan. 28, 2008, 5 pages.
Invitation to Pay Additional Fees received for PCT Patent Application No. PCT/US2017/035322, dated Aug. 7, 2017, 4 pages.
Jobs Steve, "iPhone Introduction in 2007 (Complete)", available at <https://www.youtube.com/watch?v=9hUlxyE2Ns8>, Jan. 10, 2013, 3 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Microsoft Support Webcasts, Windows Media Player 7: New features and Walk-through Transcript, Jul. 13, 2000, 7 pages.
Microsoft Windows, "Microsoft Windows (Copyright 2009)", 2 pages.
Minutes of Oral Proceedings received for European Patent Application No. 11178259.5, dated Nov. 2, 2018, 9 pages.
Mozilla Developer Network, "Mouse Gesture Events", Available online at <https://developer.mozilla.org/en-US/docs/Web/Guide/Events/Mouse_gesture_events>, May 14, 2009, 3 pages.
MS mobiles.com—Simply Mobile, "New Program for Mobile Blogging for Pocket PC Release: My Blog", Available online at <http://msmobiles.com/news.php/4067.html>, 2005, 1 page.
Non-Final Office Action received for U.S. Appl. No. 12/789,441, dated Jan. 17, 2013, 24 pages.
Non-Final Office Action received for U.S. Appl. No. 14/253,783, dated Feb. 23, 2016, 18 pages.
Non-Final Office Action received for U.S. Appl. No. 09/757,000, dated Jan. 30, 2003, 11 pages.
Non-Final Office Action received for U.S. Appl. No. 09/757,000, dated Jun. 19, 2003, 11 pages.
Non-Final Office Action received for U.S. Appl. No. 10/497,076, dated Jan. 8, 2009, 29 pages.
Non-Final Office Action received for U.S. Appl. No. 10/497,076, dated May 13, 2010, 24 pages.
Non-Final Office Action received for U.S. Appl. No. 10/497,076, dated Oct. 3, 2012, 24 pages.
Non-Final Office Action received for U.S. Appl. No. 10/497,076, dated Oct. 13, 2011, 24 pages.
Non-Final Office Action received for U.S. Appl. No. 10/497,076, dated Sep. 13, 2007, 19 pages.
Non-Final Office Action received for U.S. Appl. No. 11/848,210, dated Jun. 30, 2011, 8 pages.
Non-Final Office Action received for U.S. Appl. No. 12/566,994, dated Dec. 13, 2013, 10 pages.
Non-Final Office Action received for U.S. Appl. No. 12/566,994, dated Jan. 9, 2013, 15 pages.
Non-Final Office Action received for U.S. Appl. No. 12/566,994, dated Jun. 13, 2014, 12 pages.
Non-Final Office Action received for U.S. Appl. No. 12/567,405, dated Jan. 16, 2014, 19 pages.
Non-Final Office Action received for U.S. Appl. No. 12/567,405, dated May 17, 2012, 14 pages.
Non-Final Office Action received for U.S. Appl. No. 12/567,460, dated Aug. 4, 2011, 13 pages.
Non-Final Office Action received for U.S. Appl. No. 12/567,553, dated Sep. 16, 2011, 11 pages.
Non-Final Office Action received for U.S. Appl. No. 12/849,767, dated Jul. 9, 2012, 16 pages.
Non-Final Office Action received for U.S. Appl. No. 13/361,912, dated Mar. 22, 2012, 8 pages.
Non-Final Office Action received for U.S. Appl. No. 13/909,001, dated Sep. 26, 2013, 7 pages.
Non-Final Office Action received for U.S. Appl. No. 13/909,002, dated Jun. 23, 2015, 6 pages.
Non-Final Office Action received for U.S. Appl. No. 15/088,450, dated Jul. 23, 2018, 12 pages.
Non-Final Office Action received for U.S. Appl. No. 15/275,294, dated Dec. 23, 2016, 18 pages.

(56) References Cited

OTHER PUBLICATIONS

Non-Final Office Action received for U.S. Appl. No. 15/275,294, dated Nov. 3, 2017, 29 pages.
Non-Final Office Action received for U.S. Appl. No. 15/281,524, dated Jun. 19, 2018, 23 pages.
Non-Final Office Action received for U.S. Appl. No. 15/391,269, dated Aug. 22, 2019, 44 pages.
Non-Final Office Action received for U.S. Appl. No. 15/687,384, dated Jul. 6, 2018, 19 pages.
Non-Final Office Action received for U.S. Appl. No. 16/109,487, dated Feb. 5, 2020, 19 pages.
Non-Final Office Action received for U.S. Appl. No. 16/145,033, dated Mar. 4, 2020, 50 pages.
Non-Final Office Action received for U.S. Appl. No. 16/402,057, dated May 23, 2019, 16 pages.
Non-Final Office Action received for U.S. Appl. No. 16/450,531, dated Jun. 10, 2020, 10 pages.
Non-Final Office Action received for U.S. Appl. No. 13/666,943, dated Oct. 26, 2015, 12 pages.
Notice of Acceptance received for Australian Patent Application No. 2009212904, dated Sep. 13, 2011, 1 page.
Notice of Acceptance received for Australian Patent Application No. 2011265412, dated Nov. 12, 2014, 2 pages.
Notice of Acceptance received for Australian Patent Application No. 2015201028, dated Mar. 21, 2017, 3 pages.
Notice of Acceptance received for Australian Patent Application No. 2017201548, dated Sep. 3, 2018, 3 pages.
Notice of Acceptance received for Australian Patent Application No. 2018214074, dated Aug. 6, 2019, 3 pages.
Notice of Acceptance received for Australian Patent Application No. 2017284958, dated Sep. 3, 2019, 3 pages.
Notice of Allowance received for Canadian Patent Application No. 2,935,875, dated May 3, 2017, 1 page.
Notice of Allowance received for Canadian Patent Application No. 2,984,527, dated Apr. 30, 2020, 1 page.
Notice of Allowance received for Chinese Patent Application No. 201811616429.8, dated Aug. 5, 2020, 3 pages.
Notice of Allowance received for Japanese Patent Application No. 2013-140171, dated May 29, 2015, 4 pages.
Notice of Allowance received for Japanese Patent Application No. 2014-259225, dated Feb. 27, 2017, 3 pages.
Notice of Allowance received for Japanese Patent Application No. 2015-129152, dated May 8, 2017, 3 pages.
Notice of Allowance received for Japanese Patent Application No. 2017-057997, dated Apr. 23, 2018, 4 pages.
Notice of Allowance received for Japanese Patent Application No. 2017-132229, dated Jun. 25, 2018, 4 pages.
Notice of Allowance received for Korean Patent Application No. 10-2009-7007065, dated Feb. 6, 2012, 2 pages.
Notice of Allowance received for Korean Patent Application No. 10-2009-7009549, dated Jun. 11, 2012, 2 pages.
Notice of Allowance received for Korean Patent Application No. 10-2018-7034875, dated Dec. 12, 2018, 4 pages.
Notice of Allowance received for Korean Patent Application No. 10-2019-7007053, dated Dec. 19, 2019, 6 pages.
Notice of Allowance received for Korean Patent Application No. 10-2019-7007053, dated Mar. 12, 2020, 6 pages.
Notice of Allowance received for Korean Patent Application No. 10-2020-7005314, dated Mar. 23, 2020, 6 pages.
Notice of Allowance received for the Canadian Patent Application No. 2,853,273, dated Jan. 12, 2016, 1 page.
Notice of Allowance received for U.S. Appl. No. 13/909,002, dated Dec. 4, 2015, 7 pages.
Notice of Allowance received for U.S. Appl. No. 09/757,000, dated Dec. 15, 2003, 4 pages.
Notice of Allowance received for U.S. Appl. No. 11/848,210, dated Dec. 20, 2011, 5 pages.
Notice of Allowance received for U.S. Appl. No. 12/566,994, dated May 22, 2013, 9 pages.
Notice of Allowance received for U.S. Appl. No. 12/566,994, dated Oct. 6, 2014, 8 pages.
Notice of Allowance received for U.S. Appl. No. 12/567,405, dated Jun. 11, 2014, 9 pages.
Notice of Allowance received for U.S. Appl. No. 12/567,460, dated Apr. 10, 2013, 9 pages.
Notice of Allowance received for U.S. Appl. No. 12/567,460, dated Aug. 10, 2012, 8 pages.
Notice of Allowance received for U.S. Appl. No. 12/567,460, dated Dec. 24, 2012, 8 pages.
Notice of Allowance received for U.S. Appl. No. 12/567,460, dated Jan. 18, 2012, 8 pages.
Notice of Allowance received for U.S. Appl. No. 12/567,553, dated Apr. 2, 2013, 9 pages.
Notice of Allowance received for U.S. Appl. No. 12/567,553, dated Aug. 10, 2012, 8 pages.
Notice of Allowance received for U.S. Appl. No. 12/567,553, dated Dec. 24, 2012, 8 pages.
Notice of Allowance received for U.S. Appl. No. 12/567,553, dated Jun. 12, 2012, 8 pages.
Notice of Allowance received for U.S. Appl. No. 12/567,570, dated Dec. 19, 2012, 7 pages.
Notice of Allowance received for U.S. Appl. No. 12/567,570, dated Mar. 27, 2013, 8 pages.
Notice of Allowance received for U.S. Appl. No. 12/789,441, dated Dec. 6, 2013, 11 pages.
Notice of Allowance received for U.S. Appl. No. 12/849,767, dated Jan. 8, 2013, 9 pages.
Notice of Allowance received for U.S. Appl. No. 13/361,912, dated Jul. 2, 2012, 7 pages.
Notice of Allowance received for U.S. Appl. No. 13/666,943, dated Jun. 2, 2016, 9 pages.
Notice of Allowance received for U.S. Appl. No. 13/666,943, dated Jun. 17, 2015, 7 pages.
Notice of Allowance received for U.S. Appl. No. 13/909,001, dated Mar. 3, 2014, 7 pages.
Notice of Allowance received for U.S. Appl. No. 14/253,783, dated Apr. 14, 2017, 12 pages.
Notice of Allowance received for U.S. Appl. No. 14/253,783, dated Jul. 12, 2017, 5 pages.
Notice of Allowance received for U.S. Appl. No. 14/253,783, dated Sep. 5, 2017, 8 pages.
Notice of Allowance received for U.S. Appl. No. 15/088,450, dated Dec. 13, 2018, 7 pages.
Notice of Allowance received for U.S. Appl. No. 15/275,294, dated Jun. 6, 2018, 8 pages.
Notice of Allowance received for U.S. Appl. No. 15/275,294, dated Jun. 30, 2017, 8 pages.
Notice of Allowance received for U.S. Appl. No. 15/281,524, dated Apr. 11, 2019, 7 pages.
Notice of Allowance received for U.S. Appl. No. 15/687,384, dated Jan. 8, 2019, 8 pages.
Notice of Allowance received for U.S. Appl. No. 16/109,487, dated Aug. 18, 2020, 8 pages.
Notice of Allowance received for U.S. Appl. No. 16/109,487, dated May 12, 2020, 8 pages.
Notice of Allowance received for U.S. Appl. No. 16/402,057, dated Mar. 25, 2020, 8 pages.
Notice of Allowance received for U.S. Appl. No. 16/403,184, dated Oct. 11, 2019, 9 pages.
Notice of Allowance received for U.S. Appl. No. 16/450,531 dated Sep. 25, 2020, 7 pages.
Notice of Allowance received for U.S. Appl. No. 16/791,257, dated Jun. 12, 2020, 11 pages.
Notice of Allowance received for U.S. Appl. No. 12/789,441, dated Aug. 20, 2013, 9 pages.
Notice of Allowance received for U.S. Appl. No. 12/849,767, dated Apr. 25, 2014, 5 pages.
Notice of Allowance received in Canadian Application No. 2,627,118, dated Jun. 14, 2011, 1 page.
Office Action received for Australian Patent Application No. 2015201028, dated Mar. 15, 2016, 2 pages.

(56) References Cited

OTHER PUBLICATIONS

Office Action received for Australian Patent Application No. 2017201548, dated Feb. 26, 2018, 2 pages.
Office Action received for Australian Patent Application No. 2018214074, dated May 9, 2019, 2 pages.
Office Action received for Australian Patent Application No. 2019100490, dated Jul. 26, 2019, 4 pages.
Office Action received for Australian Patent Application No. 2019264623, dated Sep. 14, 2020, 3 pages.
Office Action received for Australian Patent Application No. 2017284958, dated Dec. 13, 2018, 3 pages.
Office Action Received for Canadian Patent Application No. 2,627,118, dated Mar. 15, 2010, 4 pages.
Office Action received for Canadian Patent Application No. 2,853,273, dated Feb. 23, 2015, 5 pages.
Office Action received for Canadian Patent Application No. 2,984,527 dated Sep. 11, 2018, 5 pages.
Office Action received for Canadian Patent Application No. 2,984,527, dated Jul. 25, 2019, 4 pages.
Office Action received for Chinese Patent Application No. 200780001142.8, dated Jan. 14, 2013, 20 pages.
Office Action received for Chinese Patent Application No. 200780001142.8, dated Jul. 2, 2013, 38 pages.
Office Action Received for Chinese Patent Application No. 200780001142.8, dated Jan. 8, 2010, 9 pages.
Office Action received for Chinese Patent Application No. 200780001142.8, dated Jun. 17, 2011, 17 pages.
Office Action received for Chinese Patent Application No. 200780001142.8, dated May 3, 2012, 16 pages.
Office Action received for Chinese Patent Application No. 201010227633.8, dated Jan. 11, 2012, 6 pages.
Office Action received for Chinese Patent Application No. 201811616429.8, dated May 7, 2020, 8 pages.
Office Action received for Chinese Patent Application No. 201811616429.8, dated Sep. 4, 2019, 26 pages.
Office Action received for Danish Patent Application No. PA201670608, dated Jan. 14, 2019, 7 pages.
Office Action received for Danish Patent Application No. PA201670608, dated Jan. 23, 2018, 10 pages.
Office Action received for Danish Patent Application No. PA201670609, dated Jan. 26, 2018, 8 pages.
Office Action received for Danish Patent Application No. PA201670609, dated Mar. 1, 2019, 9 pages.
Office Action received for Danish Patent Application No. PA201670609, dated May 4, 2020, 7 pages.
Office Action received for Danish Patent Application No. PA201670609, dated May 7, 2018, 4 pages.
Office Action received for Danish Patent Application No. PA201870385, dated Aug. 23, 2019, 3 pages.
Office Action received for European Patent Application No. 02713375.0, dated Feb. 27, 2009, 5 pages.
Office Action received for European Patent Application No. 07814633.9, dated Aug. 10, 2009, 3 pages.
Office Action received for European Patent Application No. 09756118.7, dated Feb. 13, 2013, 5 pages.
Office Action received for European Patent Application No. 09756118.7, dated Mar. 7, 2014, 7 pages.
Office Action Received for European Patent Application No. 09756118.7, dated Oct. 8, 2015, 6 pages.
Office Action received for European Patent Application No. 10172417.7, dated Oct. 31, 2011, 6 pages.
Office Action received for European Patent Application No. 11178259.5, dated Jan. 4, 2013, 8 pages.
Office Action received for European Patent Application No. 11178259.5, dated Nov. 10, 2015, 4 pages.
Office Action received for European Patent Application No. 17180535.1, dated Oct. 8, 2018, 6 pages.
Office Action received for European Patent Application No. 17180535.1, dated Oct. 14, 2019, 8 pages.
Office Action received for European Patent Application No. 18197554.1, dated Jun. 15, 2020, 4 pages.
Office Action received for European Patent Application No. 19724963.4, dated Jul. 28, 2020, 6 pages.
Office Action received for European Patent Application No. 02713375.0, dated Feb. 24, 2010, 4 pages.
Office Action received for German Patent Application No. 112007000067.8, dated Sep. 14, 2010, 4 pages.
Office Action received for Indian Patent Application No. 9044/CHENP/2014, dated Jan. 24, 2020, 6 pages.
Office action received for Indian Patent Application No. 2797CHENP2008, dated Jan. 29, 2014, 3 pages.
Office Action received for Japanese Patent Application No. 2009-526943, dated Aug. 15, 2011, 3 pages.
Office Action received for Japanese Patent Application No. 2013-140171, dated Jul. 22, 2014, 4 pages.
Office Action received for Japanese Patent Application No. 2014-259225, dated May 27, 2016, 4 pages.
Office Action Received for Japanese Patent Application No. 2014-259225, dated Nov. 20, 2015, 2 pages.
Office Action received for Japanese Patent Application No. 2015-129152, dated Sep. 23, 2016, 3 pages.
Office Action received for Japanese Patent Application No. 2017-057997, dated Jan. 9, 2018, 6 pages.
Office Action received for Japanese Patent Application No. 2017-132229, dated Mar. 16, 2018, 7 pages.
Office Action received for Japanese Patent Application No. 2018-138559, dated Jan. 27, 2020, 7 pages.
Office Action received for Japanese Patent Application No. 2018-138559, dated May 13, 2019, 10 pages.
Office Action received for Korean Patent Application No. 10-2009-7007065, dated Jan. 19, 2011, 3 pages.
Office Action received for Korean Patent Application No. 10-2009-7007065, dated Sep. 30, 2011, 1 page.
Office Action received for Korean Patent Application No. 10-2019-7007053, dated Mar. 18, 2019, 12 pages.
Office Action received for Korean Patent Application No. 10-2019-7007053, dated Sep. 26, 2019, 9 pages.
Office Action received for European Patent Application No. 02713375.0, dated Feb. 24, 2014, 5 pages.
Partial European Search Report received for European Patent Application No. 18197554.1, dated Jan. 22, 2019, 8 pages.
Person et al., "Special Edition Using Windows 95", Published by Que Corporation, 2nd Edition, 1997, pp. 335-337.
Redmond Wash, "Microsoft Unveils Windows Media Player 7", Microsoft Press Pass, Mar. 27, 2000, 4 pages.
Redmond Wash, "Worldwide Popularity of Microsoft Windows Media Player 7", Microsoft PressPass, Aug. 2, 2000, 1 page.
Search Report and opinion received for Danish Patent Application No. PA201670608, dated Jan. 3, 2017, 15 pages.
Search Report and Opinion received for Danish Patent Application No. PA201670609, dated Feb. 1, 2017, 11 pages.
Search Report and Opinion received for Danish Patent Application No. PA201870385, dated Nov. 16, 2018, 10 pages.
Search Report and Opinion received for Danish Patent Application No. PA201970535, dated Nov. 5, 2019, 10 pages.
Skiljan Irfan, "IrfanView Help", Irfan View Screen Dumps, 1996-1999, 3 pages.
Steve Jobs—2007 iPhone Presentation (Part 1 of 2), available at <http//www.youtube.com/watch?v=6uW-E496FXg>, 2007, 1 page.
Summons to Attend Oral Proceeding received for European Patent Application No. 10172417.7, dated Jan. 28, 2013, 6 pages.
Summons to Attend Oral Proceedings received for European Patent Application No. 08705751.9, dated Oct. 28, 2011, 9 pages.
Summons to Attend Oral Proceedings received for European Patent Application No. 09756118.7, dated Sep. 23, 2016, 8 pages.
Summons to Attend Oral Proceedings received for European Patent Application No. 11178259.5, dated Feb. 11, 2015, 9 pages.
Summons to Attend Oral Proceedings received for European Patent Application No. 11178259.5, dated Feb. 19, 2018, 12 pages.
Supplemental Notice of Allowance received for U.S. Appl. No. 16/403,184, dated Nov. 21, 2019, 3 pages.

(56) References Cited

OTHER PUBLICATIONS

Supplemental Notice of Allowance received for U.S. Appl. No. 16/791,257, dated Aug. 31, 2020, 3 pages.
Supplementary European Search Report received for European Patent Application No. 02713375.0, dated Oct. 2, 2009, 3 pages.
Supplementary Search Report received for European Patent Application No. 02713375.0, dated Aug. 5, 2005, 3 pages.
Support WebCast: Windows Media Player 7: New features and Walk-through, Microsoft Knowledge Base Article-324594, Jul. 13, 2000, 2 pages.
Team 2: Portable Digital Photo Album, Available online at: <http://courses.ece.ubc.ca/418/previous/W04/team2/index.html#Section1>, May 8, 2008, 16 pages.
VERSIONTRACKER, "Photogather—7.2.6. Hi-res Image Viewer & Editor for Palm", Available online at <http://www.versiontracker.com/dyn/moreinfo/palm/4624>, retrieved on Jun. 12, 2006, 5 pages.
Way to Use a Camera, JP, Nov. 18, 2005, pp. 206-212.
Willcom, "Operation Manual for WS003SH", JP, Dec. 2005, pp. 4-1 to 4-7.
WINAMP from Nullsoft, screendumps of the media player having visual effect, version 2.62, 1997-2000, 2 pages.
Windows Media Player Visualization, to view a visualization, 2000-2001, 2 pages.
Notice of Allowance received for U.S. Appl. No. 16/983,815, dated Jul. 26, 2021, 3 pages.
Notice of Allowance received for Japanese Patent Application No. 2021-000224, dated May 7, 2021, 4 pages (1 page of English Translation and 3 pages of Official Copy).
Office Action received for Japanese Patent Application No. 2018-138559, dated Apr. 9, 2021, 30 pages (6 pages of English Translation and 24 pages of Official Copy).
Supplemental Notice of Allowance received for U.S. Appl. No. 16/584,776, dated May 13, 2021, 4 pages.
International Preliminary Report on Patentability received for PCT Patent Application No. PCT/US2020/031442, dated Nov. 18, 2021, 21 pages.
Office Action received for Australian Patent Application No. 2020267310, dated Nov. 4, 2021, 2 pages.
Office Action received for Danish Patent Application No. PA202070615, dated Nov. 16, 2021, 4 pages.
Notice of Acceptance received for Australian Patent Application No. 2020239752, dated Jan. 31, 2022, 3 pages.
Office Action received for Australian Patent Application No. 2020239748, dated Feb. 11, 2022, 2 pages.
Supplemental Notice of Allowance received for U.S. Appl. No. 17/030,318, dated Feb. 22, 2022, 2 pages.
Non-Final Office Action received for U.S. Appl. No. 17/035,367, dated Jun. 11, 2021, 11 pages.
Result of Consultation received for European Patent Application No. 19724963.4, dated May 31, 2021, 3 pages.
Applicant-Initiated Interview Summary received for U.S. Appl. No. 16/145,033, dated Oct. 7, 2021, 4 pages.
Decision on Appeal received for U.S. Appl. No. 16/584,783, dated Oct. 14, 2021, 12 pages.
Non-Final Office Action received for U.S. Appl. No. 17/030,321, dated Oct. 18, 2021, 28 pages.
Office Action received for Danish Patent Application No. PA202070613, dated Sep. 30, 2021, 4 pages.
Extended European Search Report received for European Patent Application No. 21159939.4, dated Sep. 28, 2021, 13 pages.
Final Office Action received for U.S. Appl. No. 17/030,318, dated Sep. 30, 2021, 28 pages.
Intention to Grant received for European Patent Application No. 19724963.4, dated Sep. 20, 2021, 7 pages.
International Search Report and Written Opinion received for PCT Patent Application No. PCT/US2021/017736, dated Sep. 2, 2021, 25 pages.
Notice of Allowance received for U.S. Appl. No. 17/035,367, dated Sep. 23, 2021, 7 pages.

Notice of acceptance received for Australian Patent Application No. 2021202225, dated Jun. 20, 2022, 3 pages.
Corrected Notice of Allowance received for U.S. Appl. No. 17/125,744, dated Mar. 30, 2022, 2 pages.
Notice of Allowance received for Australian Patent Application No. 2020239748, dated Mar. 7, 2022, 3 pages.
Office Action received for Japanese Patent Application No. 2020-079486, dated Mar. 11, 2022, 8 pages (4 pages of English Translation and 4 pages of Official Copy).
Summons to Attend Oral Proceedings received for European Patent Application No. 18197554.1, dated Mar. 23, 2022, 7 pages.
Supplemental Notice of Allowance received for U.S. Appl. No. 17/030,318, dated Mar. 16, 2022, 2 pages.
T&GG Channel, "Canon IXUS 700 / Screenshots of deleting an image", Online available at: https://www.youtube.com/watch?v=8BL_L5hKZUM, May 2015, 2 pages.
Applicant-Initiated Interview Summary received for U.S. Appl. No. 17/031,543, dated Apr. 21, 2022, 2 pages.
Non-Final Office Action received for U.S. Appl. No. 17/031,543, dated Apr. 1, 2022, 9 pages.
Notice of Allowance received for Japanese Patent Application No. 2020-160054, dated Apr. 4, 2022, 4 pages (1 page of English Translation and 3 pages of Official Copy).
Notice of Allowance received for U.S. Appl. No. 17/030,321, dated Apr. 1, 2022, 8 pages.
Office Action received for Australian Patent Application No. 2021202225, dated Apr. 7, 2022, 3 pages.
Supplemental Notice of Allowance received for U.S. Appl. No. 17/030,318, dated Apr. 4, 2022, 2 pages.
Supplemental Notice of Allowance received for U.S. Appl. No. 17/030,321, dated Apr. 15, 2022, 2 pages.
Corrected Notice of Allowance received for U.S. Appl. No. 17/125,744, dated Mar. 10, 2022, 2 pages.
Notice of Acceptance received for Australian Patent Application No. 2020267310, dated Feb. 23, 2022, 3 pages.
Office Action received for Danish Patent Application No. PA 2020 70612, dated Mar. 1, 2022, 2 pages.
Office Action received for Korean Patent Application No. 10-2021-7036310, dated Feb. 23, 2022, 6 pages (2 pages of English Translation and 4 pages of Official Copy).
Corrected Notice of Allowance received for U.S. Appl. No. 17/031,543, dated Jun. 8, 2022, 3 pages.
Non-Final Office Action received for U.S. Appl. No. 17/030,337, dated Jun. 14, 2022, 13 pages.
Non-Final Office Action received for U.S. Appl. No. 17/030,340, dated Jun. 14, 2022, 15 pages.
Non-Final Office Action received for U.S. Appl. No. 17/030,318, dated Jun. 14, 2022, 9 pages.
Notice of Allowance received for Japanese Patent Application No. 2020-160052, dated Jun. 3, 2022, 4 pages (1 page of English Translation and 3 pages of Official Copy).
Office Action received for Japanese Patent Application No. 2021-566100, dated May 27, 2022, 7 pages (3 pages of English Translation and 4 pages of Official Copy).
Office Action received for Korean Patent Application No. 10-2020-0123815, dated May 31, 2022, 10 pages (5 pages of English Translation and 5 pages of Official Copy).
Supplemental Notice of Allowance received for U.S. Appl. No. 17/030,321, dated Jun. 10, 2022, 2 pages.
Supplemental Notice of Allowance received for U.S. Appl. No. 17/030,321, dated May 27, 2022, 2 pages.
10-2013-0026541, KR, A, Cited by Korean Patent Office in an Office Action for related Patent Application No. 10-2021-7036310 dated Apr. 26, 2022.
Extended European Search Report received for European Patent Application No. 22152524.9, dated May 2, 2022, 10 pages.
Notice of Allowance received for Korean Patent Application No. 10-2021-7036310, dated Apr. 26, 2022, 5 pages (2 pages of English Translation and 3 pages of Official Copy).
Notice of Allowance received for U.S. Appl. No. 17/031,543, dated May 11, 2022, 6 pages.
Office Action received for Australian Patent Application No. 2022201561, dated May 2, 2022, 3 pages.

(56) References Cited

OTHER PUBLICATIONS

Office Action received for Danish Patent Application No. PA202070612, dated May 10, 2022, 2 pages.
Office Action received for Danish Patent Application No. PA202070613, dated May 10, 2022, 2 pages.
Office Action received for Danish Patent Application No. PA202070616, dated May 5, 2022, 3 pages.
Applicant-Initiated Interview Summary received for U.S. Appl. No. 17/030,337, dated Jul. 27, 2022, 2 pages.
Corrected Notice of Allowance received for U.S. Appl. No. 17/031,543, dated Jul. 18, 2022, 2 pages.
Non-Final Office Action received for U.S. Appl. No. 17/408,220, dated Aug. 3, 2022, 15 pages.
Notice of Acceptance received for Australian Patent Application No. 2022201561, dated Jul. 22, 2022, 3 pages.
Supplemental Notice of Allowance received for U.S. Appl. No. 17/030,321, dated Jul. 27, 2022, 2 pages.
Office Action received for Indian Patent Application No. 202048019639, dated Sep. 27, 2022, 5 pages.
Applicant-Initiated Interview Summary received for U.S. Appl. No. 17/408,220, dated Oct. 18, 2022, 4 pages.
Corrected Notice of Allowance received for U.S. Appl. No. 17/030,321, dated Aug. 15, 2022, 3 pages.
Corrected Notice of Allowance received for U.S. Appl. No. 17/030,337, dated Aug. 31, 2022, 2 pages.
Corrected Notice of Allowance received for U.S. Appl. No. 17/030,337, dated Nov. 3, 2022, 2 pages.
Corrected Notice of Allowance received for U.S. Appl. No. 17/030,337, dated Oct. 18, 2022, 2 pages.
Corrected Notice of Allowance received for U.S. Appl. No. 17/030,337, dated Sep. 21, 2022, 2 pages.
Corrected Notice of Allowance received for U.S. Appl. No. 17/031,543, dated Aug. 22, 2022, 2 pages.
Decision to Grant received for Danish Patent Application No. PA202070615, dated Jul. 29, 2022, 2 pages.
Examiner's Answer to Appeal Brief received for U.S. Appl. No. 16/145,033, dated Aug. 4, 2022, 10 pages.
Extended European Search Report received for European Patent Application No. 22164099.8, dated Aug. 25, 2022, 9 pages.
International Preliminary Report on Patentability received for PCT Patent Application No. PCT/US2021/017736, dated Aug. 25, 2022, 19 pages.
Notice of Allowance received for Japanese Patent Application No. 2020-079486, dated Oct. 21, 2022, 4 pages (1 page of English Translation and 3 pages of Official Copy).
Notice of Allowance received for Japanese Patent Application No. 2022-107902, dated Aug. 26, 2022, 4 pages (1 page of English Translation and 3 pages of Official Copy).
Notice of Allowance received for Korean Patent Application No. 10-2020-0123815, dated Aug. 26, 2022, 7 pages (2 pages of English Translation and 5 pages of Official Copy).
Notice of Allowance received for U.S. Appl. No. 17/030,337, dated Aug. 22, 2022, 10 pages.
Notice of Allowance received for U.S. Appl. No. 17/030,340, dated Sep. 28, 2022, 7 pages.
Notice of Allowance received for U.S. Appl. No. 17/030,343, dated Sep. 16, 2022, 11 pages.
Office Action received for Chinese Patent Application No. 202011127969.7, dated Jul. 28, 2022, 25 pages (14 pages of English Translation and 11 pages of Official Copy).
Office Action received for Chinese Patent Application No. 202111487316.4, dated Aug. 8, 2022, 25 pages (13 pages of English Translation and 12 pages of Official Copy).
Office Action received for Danish Patent Application No. PA202070612, dated Sep. 12, 2022, 3 pages.
Office Action received for Danish Patent Application No. PA202070613, dated Oct. 13, 2022, 7 pages.
Office Action received for European Patent Application No. 21159939.4, dated Sep. 2, 2022, 6 pages.
Office Action received for Japanese Patent Application No. 2020-160053, dated Aug. 1, 2022, 8 pages (4 pages of English Translation and 4 pages of Official Copy).
Office Action received for Korean Patent Application No. 10-2020-0123821, dated Sep. 20, 2022, 11 pages (5 pages of English Translation and 6 pages of Official Copy).
Office Action received for Korean Patent Application No. 10-2022-0061486, dated Aug. 29, 2022, 5 pages (2 pages of English Translation and 3 pages of Official Copy).
Supplemental Notice of Allowance received for U.S. Appl. No. 17/030,343, dated Nov. 9, 2022, 2 pages.
Supplemental Notice of Allowance received for U.S. Appl. No. 17/030,343, dated Oct. 5, 2022, 2 pages.
Updated Notice of Allowance received for U.S. Appl. No. 17/030,340, dated Nov. 2, 2022, 2 pages.
Updated Notice of Allowance received for U.S. Appl. No. 17/030,340, dated Nov. 10, 2022, 2 pages.
Hourunranta et al., "Video and Audio Editing for Mobile Applications", Proceedings/2006 IEEE international Conference on multimedia and expo, ICME 2006, Jul. 9, 2006, pp. 1305-1308.
Hurwitz Jon, "Interface for Small-Screen Media Playback Control", Technical Disclosure Commons, Online available at: https://www.tdcommons.org/cgi/viewcontent.cgi?article=4231&context=dpubs_series, Apr. 17, 2020, pp. 1-9.
Jin-Chang et al., "Multi-modal Interface Techniques and Its Application for Multimedia Retrieval", China Academic Journal Electronic Publishing House, 2002, pp. 115-117 (Official Copy only). {(See Communication under 37 CFR § 1.98(a) (3))}.
Corrected Notice of Allowance received for U.S. Appl. No. 17/030,337, dated Nov. 15, 2022, 2 pages.
Notice of Allowance received for U.S. Appl. No. 17/408,220, dated Nov. 15, 2022, 11 pages.
Final Office Action received for U.S. Appl. No. 17/030,318, dated Nov. 28, 2022, 13 pages.
International Search Report and Written Opinion received for PCT Patent Application No. PCT/US2022/030589, dated Sep. 5, 2022, 26 pages.
Non-Final Office Action received for U.S. Appl. No. 17/744,499, dated Dec. 7, 2022, 14 pages.
Notice of Allowance received for Korean Patent Application No. 10-2022-0061486, dated Nov. 22, 2022, 7 pages (2 pages of English Translation and 5 pages of Official Copy).
Notice of Allowance received for U.S. Appl. No. 17/697,539, dated Nov. 29, 2022, 10 pages.
Office Action received for Korean Patent Application No. 10-2020-0123840, dated Nov. 21, 2022, 18 pages (8 pages of English Translation and 10 pages of Official Copy).
Updated Notice of Allowance received for U.S. Appl. No. 17/030,340, dated Dec. 2, 2022, 2 pages.

\* cited by examiner

2400

Detect a first movement of a physical object on or near the touch screen display
2402

While detecting the first movement, translate a first digital object displayed on the touch screen display in a first direction, wherein the first digital object is associated with a set of digital objects
2404

In response to display of a previously hidden edge of the first digital object and continued detection of the first movement, display an area beyond the edge of the first digital object
2406

After the first movement is no longer detected, translate the first digital object in a second direction until the area beyond the edge of the first digital object is no longer displayed
2408

Detect a second movement of the physical object on or near the touch screen display
2410

In response to detecting the second movement while the previously hidden edge of the first digital object is displayed, translate the first digital object in the first direction and display a second digital object in the set of digital objects
2412

Figure 24

PORTABLE ELECTRONIC DEVICE FOR PHOTO MANAGEMENT

RELATED APPLICATIONS

This application is a continuation of U.S. application Ser. No. 16/450,531, filed Jun. 24, 2019, now U.S. Pat. No. 10,904,426, which is a continuation of U.S. application Ser. No. 15/281,524, filed Sep. 30, 2016, now U.S. Pat. No. 10,356,309, which is a continuation of U.S. application Ser. No. 13/666,943, filed Nov. 1, 2012, now U.S. Pat. No. 9,459,792, which is a continuation of U.S. application Ser. No. 13/361,912, filed Jan. 30, 2012, now U.S. Pat. No. 8,305,355, which is a continuation of U.S. application Ser. No. 11/848,210, filed Aug. 30, 2007, entitled "Portable Electronic Device for Photo Management," now U.S. Pat. No. 8,106,856, and which claims priority to: (A) U.S. Provisional Patent Application No. 60/937,993 filed Jun. 29, 2007, entitled "Portable Multifunction Device"; (B) U.S. Provisional Patent Application No. 60/947,118, filed Jun. 29, 2007, entitled "Portable Electronic Device for Photo Management"; (C) U.S. Provisional Patent Application No. 60/879,469, filed Jan. 8, 2007, entitled "Portable Multifunction Device"; (D) U.S. Provisional Patent Application No. 60/879,253, filed Jan. 7, 2007, entitled "Portable Multifunction Device"; (E) U.S. Provisional Patent Application No. 60/883,785, filed Jan. 6, 2007, entitled "Portable Electronic Device for Photo Management"; and (F) U.S. Provisional Patent Application No. 60/824,769, filed Sep. 6, 2006, entitled "Portable Multifunction Device." All of these applications are incorporated by referenced herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to portable devices for photo management, such as digital photographing, photo editing, and emailing photos.

BACKGROUND

As portable electronic devices become more compact and capable of performing functions, it has become a significant challenge to design a user interface that allows users to easily interact with such a multifunction device. This challenge is more significant for handheld portable electronic devices, which have much smaller screens than desktop or laptop computers. This situation is unfortunate because a user interface is the gateway through which a user receives information and a device receives user actions or behaviors, including user attempts to access the portable electronic device's features, tools, and functions.

Some portable devices (e.g., mobile telephones, sometimes called mobile phones, cell phones, cellular telephones, and the like) have resorted to adding more push buttons, increasing the density of push buttons, overloading the functions of push buttons, or using complex menu systems to allow a user to access, store, and manipulate data. These approaches often result in complicated key sequences and menu hierarchies that must be memorized by the user.

Many conventional user interfaces, such as those that include physical push buttons, are also inflexible because a physical push button may prevent a user interface from being configured and/or adapted by either an application running on the portable electronic device or by users. When coupled with the time consuming requirement to memorize multiple key sequences and menu hierarchies, and the difficulty in activating a desired push button, such inflexibility is frustrating to most users.

For example, cell phones with a built-in digital camera have been on the market for some time. But existing cell phones are difficult to use for even basic photo-related operations such as displaying, deleting and sending a photo because of limitations with the cell phones' user interface.

Accordingly, there is a need for portable multifunction devices with more transparent and intuitive user interfaces for photo management.

SUMMARY

The above deficiencies and other problems associated with user interfaces for portable devices are reduced or eliminated by the disclosed portable multifunction device. In some embodiments, the portable electronic device has a touch-sensitive display (also known as a "touch screen" or "touch screen display") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. Instructions for performing photo management may be included in a computer program product configured for execution by one or more processors.

One aspect of the invention involves a computer-implemented method in which a portable electronic device with a touch screen: displays an array of thumbnail images corresponding to a set of photographic images; replaces the displayed array of thumbnail images with a user-selected photographic image upon detecting a user contact with a corresponding thumbnail image in the array, wherein the user-selected photographic image is displayed at a larger scale than the corresponding thumbnail image; and displays a different photographic image in replacement of the user-selected photographic image, wherein the different photographic image is selected in accordance with a scrolling gesture comprising a substantially horizontal movement of user contact with the touch screen display.

Another aspect of the invention involves a computer-implemented method in which a portable electronic device with a touch screen: displays an array of thumbnail images corresponding to a set of photographic images; detects a scrolling gesture comprising a substantially vertical movement of user contact with the touch screen display; and responds to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a portable electronic device. The device includes a touch screen display, one or more processors, memory, and one or more programs. The one or more program are stored in the memory and configured to be executed by the one or more processors. The one or more programs include: instructions for displaying an array of thumbnail images corresponding to a set of photographic images; instructions for replacing the displayed array of thumbnail images with a user-selected photographic image upon detecting a user contact with a corresponding thumbnail image in the array, wherein the user-selected photographic image is displayed at a larger scale than the corresponding thumbnail image; and instructions for displaying a different photographic image in replacement of the user-selected photographic image, wherein the different photographic image is selected in accordance with a scrolling gesture comprising a substantially horizontal movement of user contact with the touch screen display.

Another aspect of the invention involves a portable electronic device. The device includes a touch screen display, one or more processors, memory, and one or more programs. The one or more program are stored in the memory and configured to be executed by the one or more processors. The one or more programs include: instructions for displaying an array of thumbnail images corresponding to a set of photographic images; instructions for detecting a scrolling gesture comprising a substantially vertical movement of user contact with the touch screen display; and instructions for responding to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a computer-program product that includes a computer readable storage medium and a computer program mechanism embedded therein. The computer program mechanism includes instructions, which when executed by a portable electronic device with a touch screen display, cause the device to: display an array of thumbnail images corresponding to a set of photographic images; replace the displayed array of thumbnail images with a user-selected photographic image upon detecting a user contact with a corresponding thumbnail image in the array, wherein the user-selected photographic image is displayed at a larger scale than the corresponding thumbnail image; and display a different photographic image in replacement of the user-selected photographic image, wherein the different photographic image is selected in accordance with a scrolling gesture comprising a substantially horizontal movement of user contact with the touch screen display.

Another aspect of the invention involves a computer-program product that includes a computer readable storage medium and a computer program mechanism embedded therein. The computer program mechanism includes instructions, which when executed by a portable electronic device with a touch screen display, cause the device to: display an array of thumbnail images corresponding to a set of photographic images; detect a scrolling gesture comprising a substantially vertical movement of user contact with the touch screen display; and respond to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a portable electronic device with a touch screen display, comprising: means for displaying an array of thumbnail images corresponding to a set of photographic images; means for replacing the displayed array of thumbnail images with a user-selected photographic image upon detecting a user contact with a corresponding thumbnail image in the array, wherein the user-selected photographic image is displayed at a larger scale than the corresponding thumbnail image; and means for displaying a different photographic image in replacement of the user-selected photographic image, wherein the different photographic image is selected in accordance with a scrolling gesture comprising a substantially horizontal movement of user contact with the touch screen display.

Another aspect of the invention involves a portable electronic device with a touch screen display, comprising: means for displaying an array of thumbnail images corresponding to a set of photographic images; means for detecting a scrolling gesture comprising a substantially vertical movement of user contact with the touch screen display; and means for responding to the scrolling gesture by scrolling the display of thumbnail images in accordance with a direction of the scrolling gesture; wherein the scrolling gesture is substantially independent of a horizontal position of the user contact with the touch screen display.

Another aspect of the invention involves a computer-implemented method in which an electronic device with a touch screen: detects a first movement of a physical object on or near the touch screen display; while detecting the first movement, translates a first digital object displayed on the touch screen display in a first direction, wherein the first digital object is associated with a set of digital objects; in response to display of a previously hidden edge of the first digital object and continued detection of the first movement, displays an area beyond the edge of the first digital object; after the first movement is no longer detected, translates the first digital object in a second direction until the area beyond the edge of the first digital object is no longer displayed; detects a second movement of the physical object on or near the touch screen display; and, in response to detecting the second movement while the previously hidden edge of the first digital object is displayed, translates the first digital object in the first direction and displays a second digital object in the set of digital objects.

Another aspect of the invention involves an electronic device. The device includes a touch screen display, one or more processors, memory, and one or more programs. The one or more program are stored in the memory and configured to be executed by the one or more processors. The one or more programs include: instructions for detecting a first movement of a physical object on or near the touch screen display; instructions for, while detecting the first movement, translating a first digital object displayed on the touch screen display in a first direction, wherein the first digital object is associated with a set of digital objects; instructions for, in response to display of a previously hidden edge of the first digital object and continued detection of the first movement, displaying an area beyond the edge of the first digital object; instructions for, after the first movement is no longer detected, translating the first digital object in a second direction until the area beyond the edge of the first digital object is no longer displayed; instructions for detecting a second movement of the physical object on or near the touch screen display; and instructions for, in response to detecting the second movement while the previously hidden edge of the first digital object is displayed, translating the first digital object in the first direction and displaying a second digital object in the set of digital objects.

Another aspect of the invention involves a computer-program product that includes a computer readable storage medium and a computer program mechanism embedded therein. The computer program mechanism includes instructions, which when executed by an electronic device with a touch screen display, cause the device to: detect a first movement of a physical object on or near the touch screen display; while detecting the first movement, translate a first digital object displayed on the touch screen display in a first direction, wherein the first digital object is associated with a set of digital objects; in response to display of a previously hidden edge of the first digital object and continued detection of the first movement, display an area beyond the edge of the first digital object; after the first movement is no longer detected, translate the first digital object in a second direction until the area beyond the edge of the first digital object is no longer displayed; detect a second movement of the physical object on or near the touch screen display; and, in response to detecting the second movement while the previously hidden edge of the first digital object is displayed, translate the first digital object in the first direction and display a second digital object in the set of digital objects.

Another aspect of the invention involves an electronic device with a touch screen display, comprising: means for detecting a first movement of a physical object on or near the touch screen display; means for, while detecting the first movement, translating a first digital object displayed on the touch screen display in a first direction, wherein the first digital object is associated with a set of digital objects; means for, in response to display of a previously hidden edge of the first digital object and continued detection of the first movement, displaying an area beyond the edge of the first digital object; means for, after the first movement is no longer detected, translating the first digital object in a second direction until the area beyond the edge of the first digital object is no longer displayed; means for detecting a second movement of the physical object on or near the touch screen display; and means for, in response to detecting the second movement while the previously hidden edge of the first digital object is displayed, translating the first digital object in the first direction and displaying a second digital object in the set of digital objects.

Thus, the invention provides a transparent and intuitive user interface for managing photos on a portable electronic device with a touch screen display

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIG. 24 is a flowchart illustrating a process for viewing digital objects in a set of digital objects in accordance with some embodiments.

DESCRIPTION OF EMBODIMENTS

Figure 1:
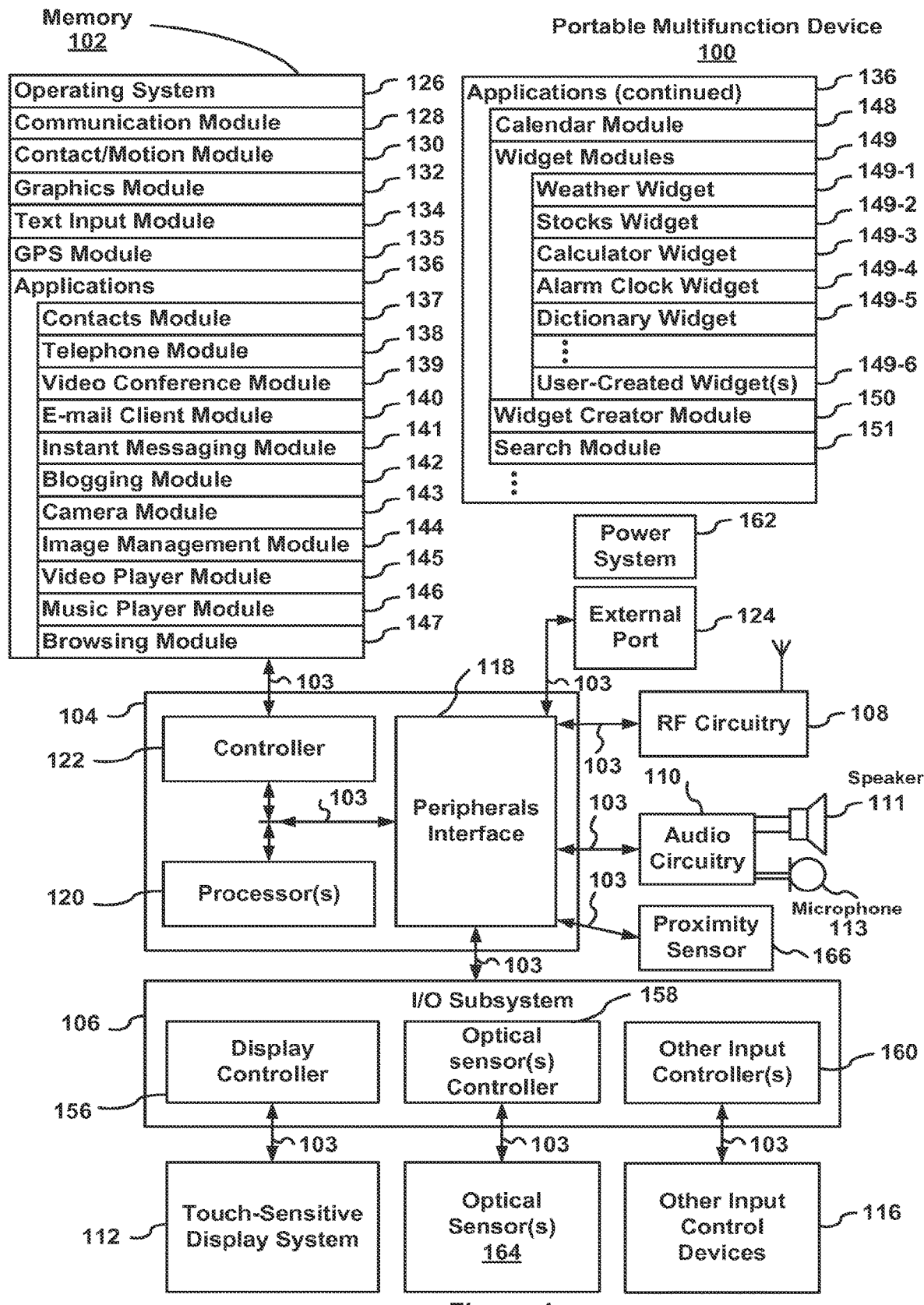
FIG. 1 is a block diagram illustrating a portable electronic device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the invention. However, it will be apparent to one skilled in the art that the invention may be practiced without these specific details. In other instances, well-known methods, procedures, components, circuits, and networks have not been described in detail so as not to unnecessarily obscure aspects of the embodiments.

Embodiments of a portable electronic device, user interfaces for such devices, and associated processes for using such devices are described. In some embodiments, the portable electronic device is a portable communications device such as a mobile telephone that also contains other functions, such as PDA and/or music player functions.

The user interface may include a physical click wheel in addition to a touch screen or a virtual click wheel displayed on the touch screen. A click wheel is a physical user-interface device that may provide navigation commands based on an angular displacement of the wheel or a point of contact with the wheel by a user of the portable electronic device. A click wheel may also be used to provide a user command corresponding to selection of one or more items, for example, when the user of the portable electronic device presses down on at least a portion of the wheel or the center of the wheel. Alternatively, breaking contact with a click wheel image on a touch screen surface may indicate a user command corresponding to selection. For simplicity, in the discussion that follows, a portable electronic device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

In addition to photo management, the device may support a variety of other applications, such as a telephone application, a video conferencing application, an e-mail application, an instant messaging application, a blogging application, a web browsing application, a digital music player application, and/or a digital video player application.

The various applications that may be executed on the portable electronic device may use at least one common physical user-interface device, such as the touch screen. One or more functions of the touch screen as well as corresponding information displayed on the portable electronic device may be adjusted and/or varied from one application to the next and/or within a respective application. In this way, a common physical architecture (such as the touch screen) of the portable electronic device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and U.S. patent application Ser. No. 11/459,615, "Touch Screen Keyboards For Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable electronic device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the portable electronic device. FIG. 1 is a block diagram illustrating a portable electronic device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the portable electronic device 100 is only one example of a portable electronic device 100, and that the portable electronic device 100 may have more or fewer components than shown, may combine two or more components, or a may have a different configuration or arrangement of the components. The various components shown in FIG. 1 may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the portable electronic device 100, such as the CPU 120 and the peripherals interface 118, may be controlled by the memory controller 122.

The peripherals interface 118 couples the input and output peripherals of the portable electronic device to the CPU 120 and memory 102. The one or more processors 120 run or execute various software programs and/or sets of instructions stored in memory 102 to perform various functions for the portable electronic device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging (IM), and/or Short Message Service (SMS)), or any other suitable communication protocol, including communication protocols not yet developed as of the filing date of this document.

The audio circuitry 110, the speaker 111, and the microphone 113 provide an audio interface between a user and the portable electronic device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the portable electronic device 100, such as the display system 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the portable electronic device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the portable electronic device 100 on or off. The user may be able to customize a functionality of one or more of the buttons. The touch screen 112 is used to implement virtual or soft buttons and one or more soft keyboards.

The touch-sensitive display system 112 provides an input interface and an output interface between the portable electronic device and a user. The display controller 156 receives and/or sends electrical signals from/to the display system 112. The display system 112 displays visual output to the user. The visual output may include graphics, text, icons, video, and any combination thereof (collectively termed "graphics"). In some embodiments, some or all of the visual output may correspond to user-interface objects, further details of which are described below.

A touch screen in display system 112 is a touch-sensitive surface that accepts input from the user based on haptic and/or tactile contact. The display system 112 and the display controller 156 (along with any associated modules and/or sets of instructions in memory 102) detect contact (and any movement or breaking of the contact) on the display system 112 and converts the detected contact into interaction with user-interface objects (e.g., one or more soft keys, icons, web pages or images) that are displayed on the touch screen. In an exemplary embodiment, a point of contact between a touch screen in the display system 112 and the user corresponds to a finger of the user.

The touch screen in the display system 112 may use LCD (liquid crystal display) technology, or LPD (light emitting polymer display) technology, although other display technologies may be used in other embodiments. The touch screen in the display system 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen in the display system 112 displays visual output from the portable electronic device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the portable electronic device translates the rough finger-based input into a precise pointer/cursor position or command for performing the actions desired by the user.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S.

patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the portable electronic device 100 may include a touchpad (not shown) for activating or deactivating particular functions. In some embodiments, the touchpad is a touch-sensitive area of the portable electronic device that, unlike the touch screen, does not display visual output. The touchpad may be a touch-sensitive surface that is separate from the touch screen in the display system 112 or an extension of the touch-sensitive surface formed by the touch screen.

In some embodiments, the portable electronic device 100 may include a physical or virtual click wheel as an input control device 116. A user may navigate among and interact with one or more graphical objects (henceforth referred to as icons) displayed in the display system 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the display system 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable electronic devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143, the optical sensor 164 may capture still images or video. In some embodiments, an optical sensor is located on the back of the portable electronic device 100, opposite the touch screen display 112 on the front of the portable electronic device, so that the touch screen display may be used as a viewfinder for either still and/or video image acquisition. In some embodiments, an optical sensor is located on the front of the portable electronic device so that the user's image may be obtained for videoconferencing while the user views the other video conference participants on the touch screen display. In some embodiments, the position of the optical sensor 164 can be changed by the user (e.g., by rotating the lens and the sensor in the portable electronic device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector In Handheld Device," filed Sep. 30, 2005, and U.S patent application Ser. No. 11/240,788, "Proximity Detector In Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the portable electronic device is in the user's pocket, purse, or other dark area to prevent unnecessary battery drainage when the portable electronic device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as Vx Works) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen in the display system 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen in the display system 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the display system 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, email 140, IM 141, blogging 142, browser 147, and any other application that needs text input).

The GPS module 135 determines the location of the portable electronic device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
  a contacts module 137 (sometimes called an address book or contact list);
  a telephone module 138;
  a video conferencing module 139;
  an e-mail client module 140;
  an instant messaging (IM) module 141;
  a blogging module 142;
  a camera module 143 for still and/or video images;
  an image management module 144;
  a video player module 145;
  a music player module 146;
  a browser module 147;
  a calendar module 148;
  widget modules 149, which may include weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6; and/or
  search module 151.

Examples of other applications 136 that may be stored in memory 102 include memo pad and other word processing applications, JAVA-enabled applications, encryption, digital rights management, voice recognition, and voice replication.

In conjunction with display system 112, display controller 156, optical sensor(s) 164, optical sensor controller 158, contact module 130, graphics module 132, and image management module 144, the camera module 143 may be used to capture still images or video (including a video stream) and store them into memory 102, browse the still images or videos, modify characteristics of a still image or video, or delete a still image or video from memory 102. Embodiments of user interfaces and associated processes using camera module 143 are described further below.

In conjunction with display system 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

Note that the above identified modules and applications (including the camera module 143 and the image management module 144) correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the portable electronic device 100 is a device where operation of a predefined set of functions on the portable electronic device is performed exclusively through a touch screen in the display system 112 and/or a touchpad. By using a touch screen and/or a touchpad as the primary input/control device for operation of the portable electronic device 100, the number of physical input/control devices (such as push buttons, dials, and the like) on the portable electronic device 100 may be reduced.

The predefined set of functions that may be performed exclusively through a touch screen and/or a touchpad include navigation between user interfaces. In some embodiments, the touchpad, when touched by the user, navigates the portable electronic device 100 to a main, home, or root menu from any user interface that may be displayed on the portable electronic device 100. In such embodiments, the touchpad may be referred to as a "menu button." in some other embodiments, the menu button may be a physical push button or other physical input/control device instead of a touchpad.

Figure 2:
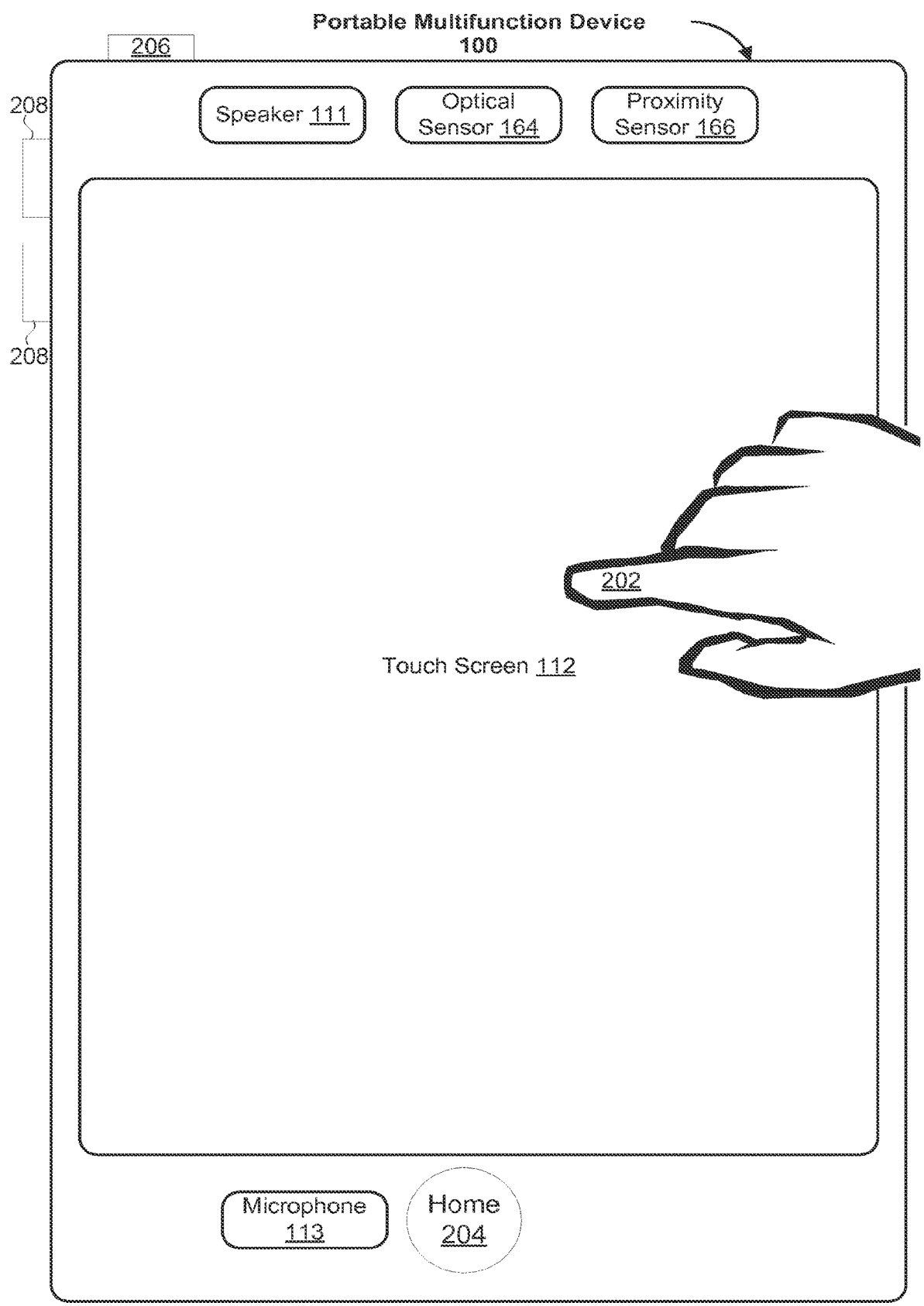
FIG. 2 illustrates a portable electronic device having a touch screen in accordance with some embodiments.

FIG. 2 illustrates a portable electronic device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure) or a stylus (not shown in the figure). In some embodiments, selection of one or more graphics occurs when the user breaks contact with the one or more graphics. In some embodiments, the contact may include a gesture, such as one or more taps, one or more swipes (from left to right, right to left, upward and/or downward and/or a rolling of a finger (from right to left, left to right, upward and/or downward) that has made contact with the portable electronic device 100. In some embodiments, inadvertent contact with a graphic may not select the graphic. For example, a swipe gesture with that sweeps over an application icon may not select the corresponding application when the gesture corresponding to selection is a tap. In other words, the portable electronic device 100 interprets the meaning of a gesture and acts accordingly after considering which application or module is in use at the moment.

The device 100 may also include one or more physical buttons, such as "home" or menu button 204. As described previously, the menu button 204 may be used to navigate to any application 136 in a set of applications that may be executed on the portable electronic device 100. Alternatively, in some embodiments, the menu button is implemented as a soft key in a GUI in touch screen 112.

In one embodiment, the portable electronic device 100 includes a touch screen 112, a menu button 204, a push button 206 for powering the portable electronic device on/off and locking the portable electronic device, and volume adjustment button(s) 208. The push button 206 may be used to turn the power on/off on the portable electronic device by depressing the button and holding the button in the depressed state for a predefined time interval; to lock the portable electronic device by depressing the button and releasing the button before the predefined time interval has elapsed; and/or to unlock the portable electronic device or initiate an unlock process. In an alternative embodiment, the portable electronic device 100 also may accept verbal input for activation or deactivation of some functions through the microphone 113.

Attention is now directed towards embodiments of user interfaces ("UI") and associated processes that may be implemented on a portable electronic device 100.

Figure 3:
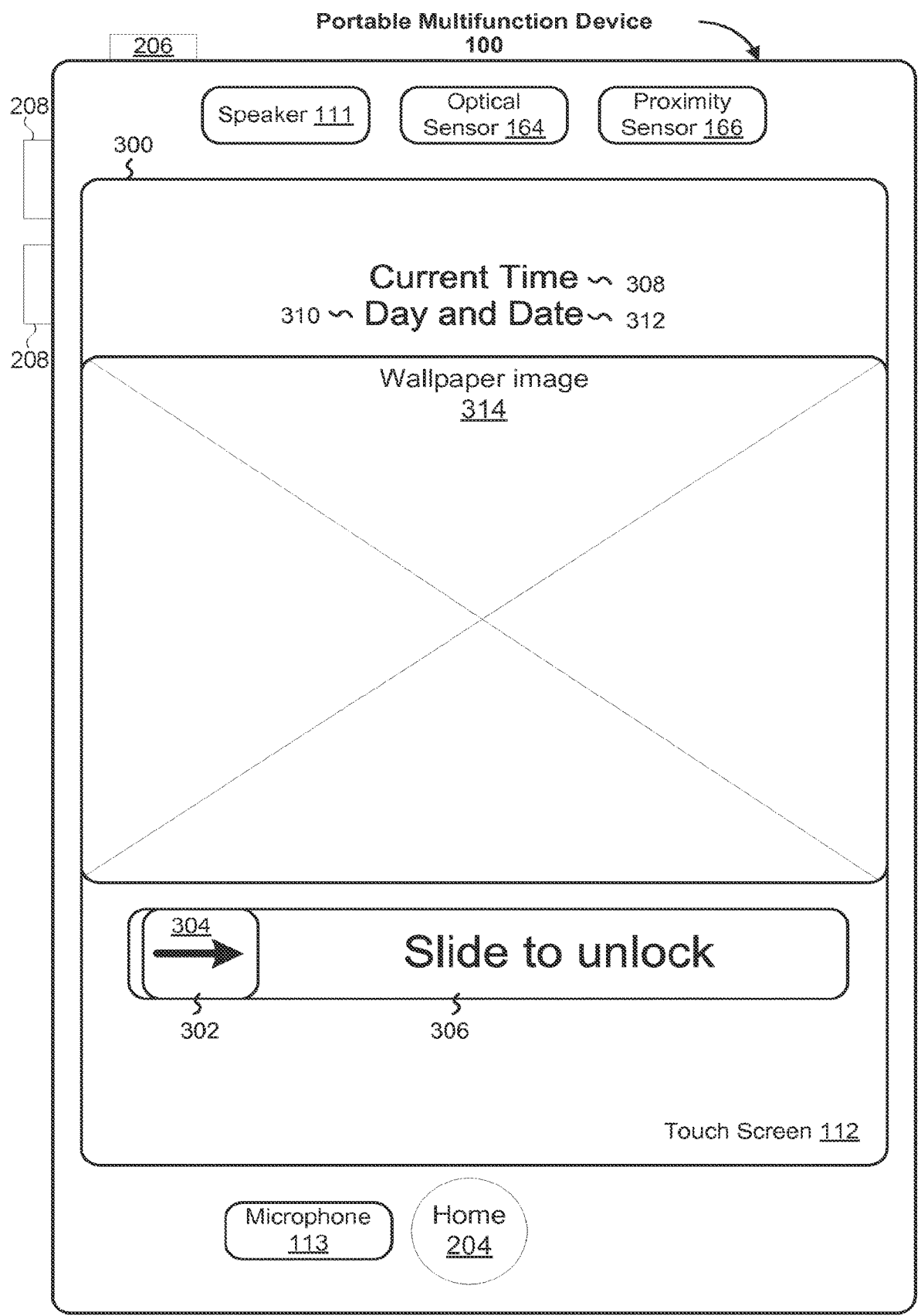
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
  Unlock image 302 that is moved with a finger gesture to unlock the portable electronic device;
  Arrow 304 that provides a visual cue to the unlock gesture;
  Channel 306 that provides additional cues to the unlock gesture;
  Time 308;
  Day 310;
  Date 312; and
  Wallpaper image 314.

In some embodiments, the portable electronic device detects contact with the touch-sensitive display (e.g., a user's finger making contact on or near the unlock image 302) while the portable electronic device is in a user-interface lock state. The device moves the unlock image 302 in accordance with the contact. The device transitions to a user-interface unlock state if the detected contact corresponds to a predefined gesture, such as moving the unlock image across channel 306. Conversely, the portable electronic device maintains the user-interface lock state if the detected contact does not correspond to the predefined gesture. As noted above, processes that use gestures on the touch screen to unlock the portable electronic device are described in U.S. patent application Ser. No. 11/322,549, "Unlocking a Device by Performing Gestures on an Unlock Image," filed Dec. 23, 2005, which is hereby incorporated by reference.

Figure 4:
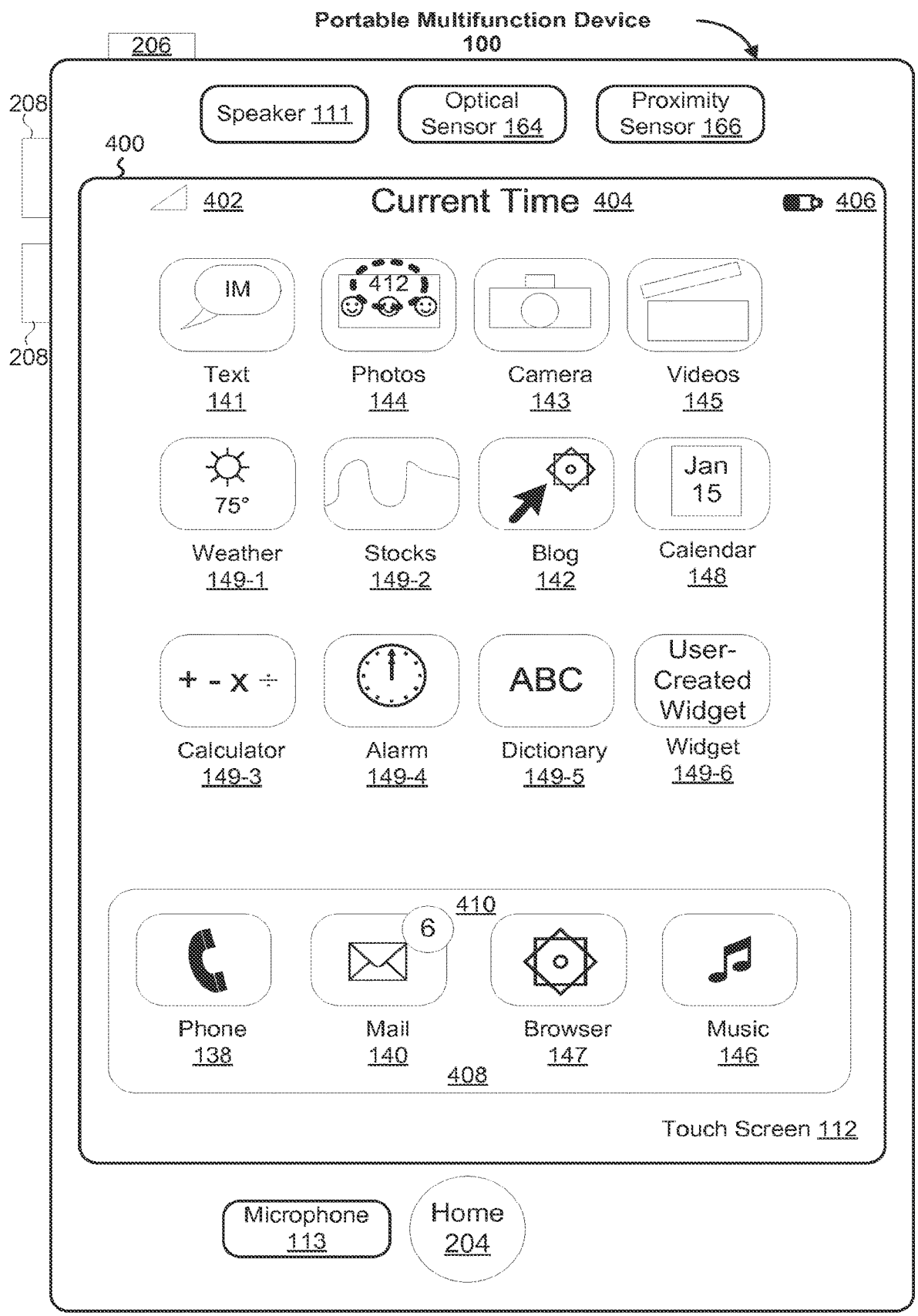
FIG. 4 illustrates an exemplary user interface for a menu of applications on a portable electronic device in accordance with some embodiments.

FIG. 4 illustrates an exemplary user interface for a menu of applications on a portable electronic device in accordance with some embodiments. In some embodiments, user interface 400 includes the following elements, or a subset or superset thereof:
  Signal strength indicator 402 for wireless communication;
  Time 404;
  Battery status indicator 406;
  Tray 408 with icons for frequently used applications, such as one or more of the following:
    Phone 138;
    E-mail client 140, which may include an indicator 410 of the number of unread e-mails;
    Browser 147; and
    Music player 146; and
  Icons for other applications, such as one or more of the following:
    IM 141;
    Image management 144;
    Camera 143;
    Video player 145;
    Weather 149-1;
    Stocks 149-2;
    Blog 142;
    Calendar 148;
    Calculator 149-3;
    Alarm clock 149-4;
    Dictionary 149-5; and
    User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With interface Reconfiguration Mode," filed Jul. 24, 2006, which is hereby incorporated by reference. For example, a user may move application icons in and out of tray 408 using finger gestures on or near corresponding icons displayed on the touch screen 112.

Figure 5:
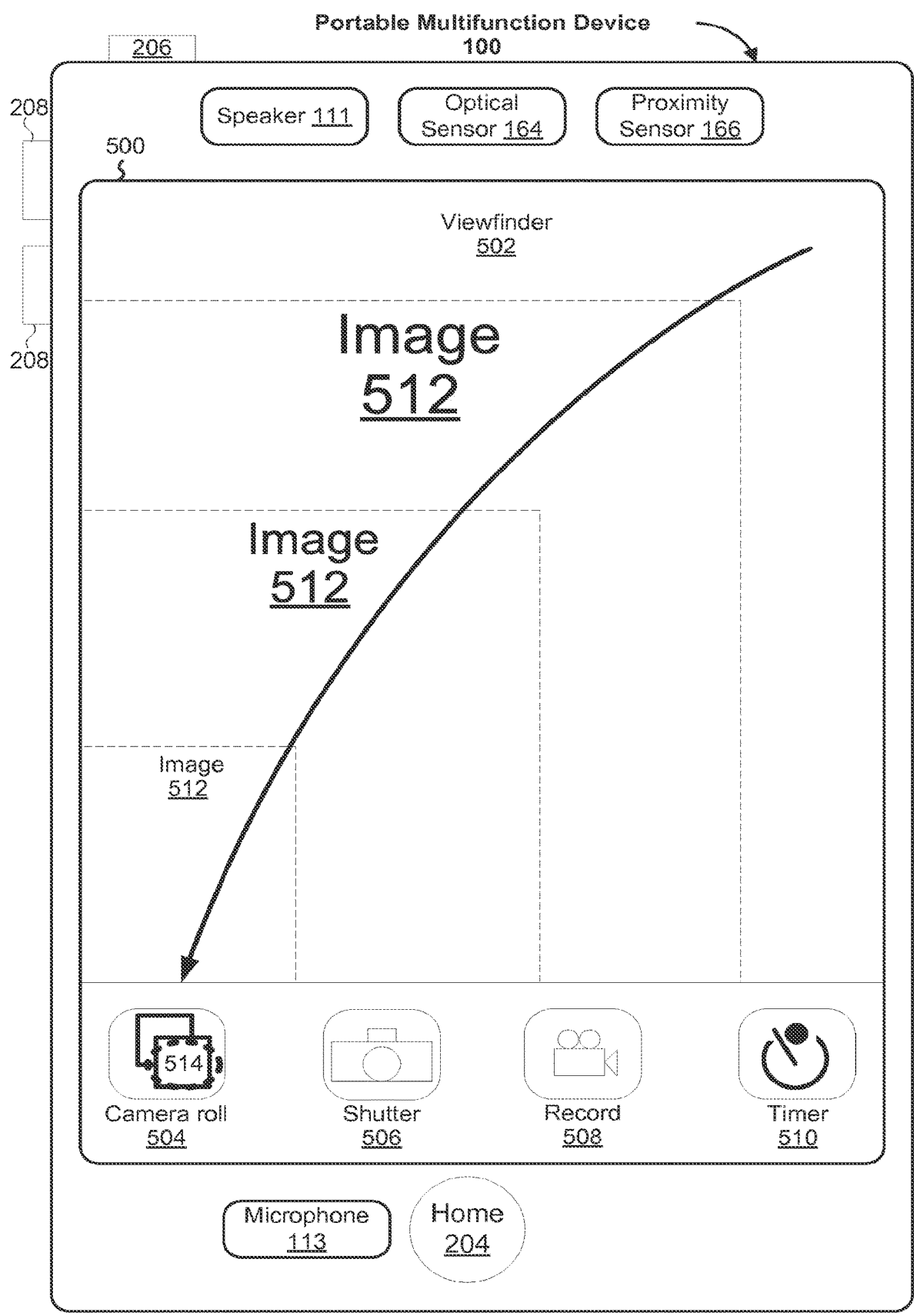
FIG. 5 illustrates an exemplary user interface for a camera in accordance with some embodiments.

FIG. 5 illustrates an exemplary user interface for a camera in accordance with some embodiments. In some embodiments, user interface 500 includes the following elements, or a subset or superset thereof:
  Viewfinder 502;
  Camera roll 504 that manages images and/or videos taken with the camera;
  Shutter 506 for taking still images;
  Record button 508 for starting and stopping video recording;
  Timer 510 for taking an image or recording a video after a predefined time delay; and
  Image 512 that appears (e.g., via the animation illustrated schematically in FIG. 5) to be added to camera roll 504 when it is obtained.

Figure 6:
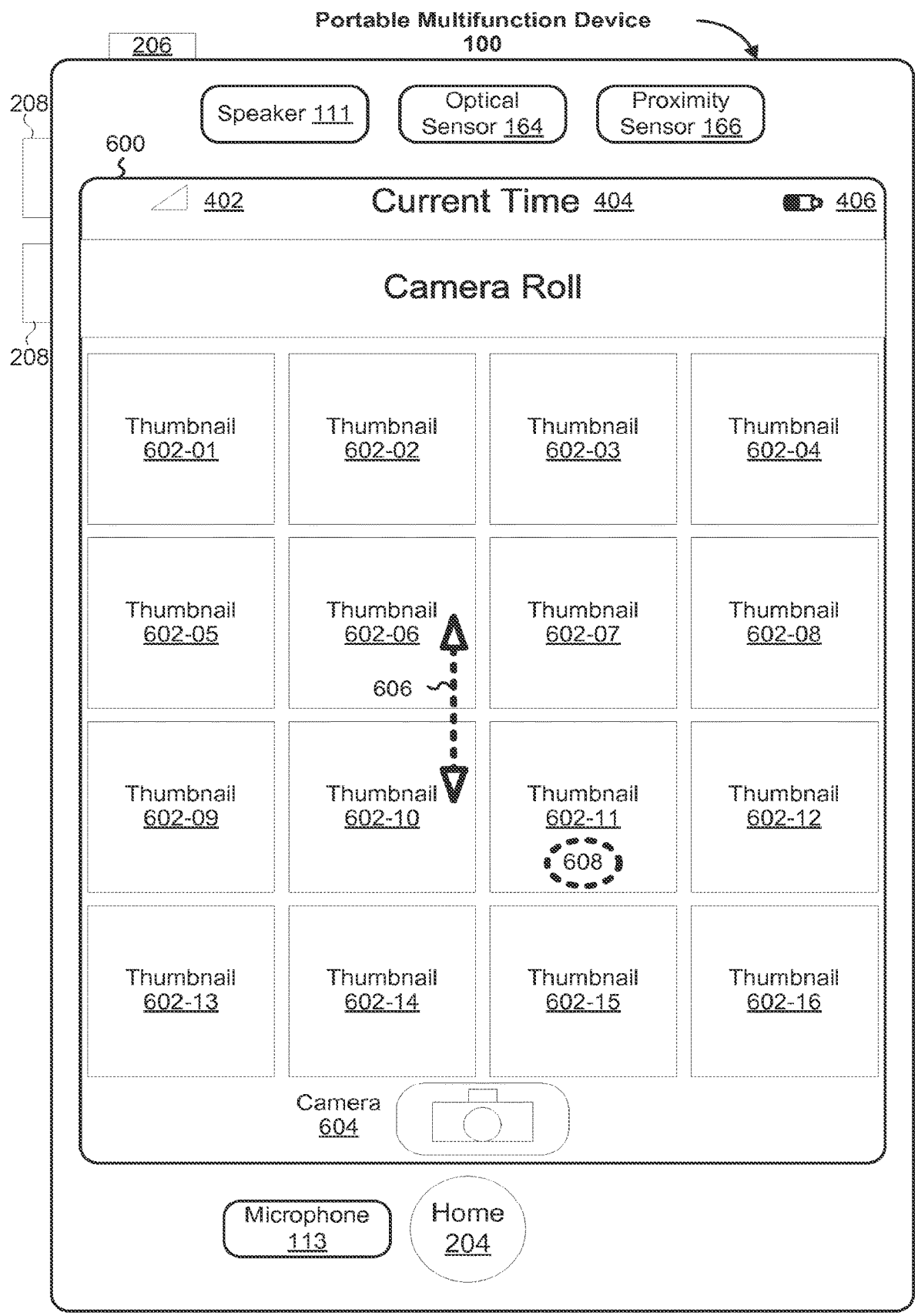
FIG. 6 illustrates an exemplary user interface for a camera roll in accordance with some embodiments.
Figure 16:
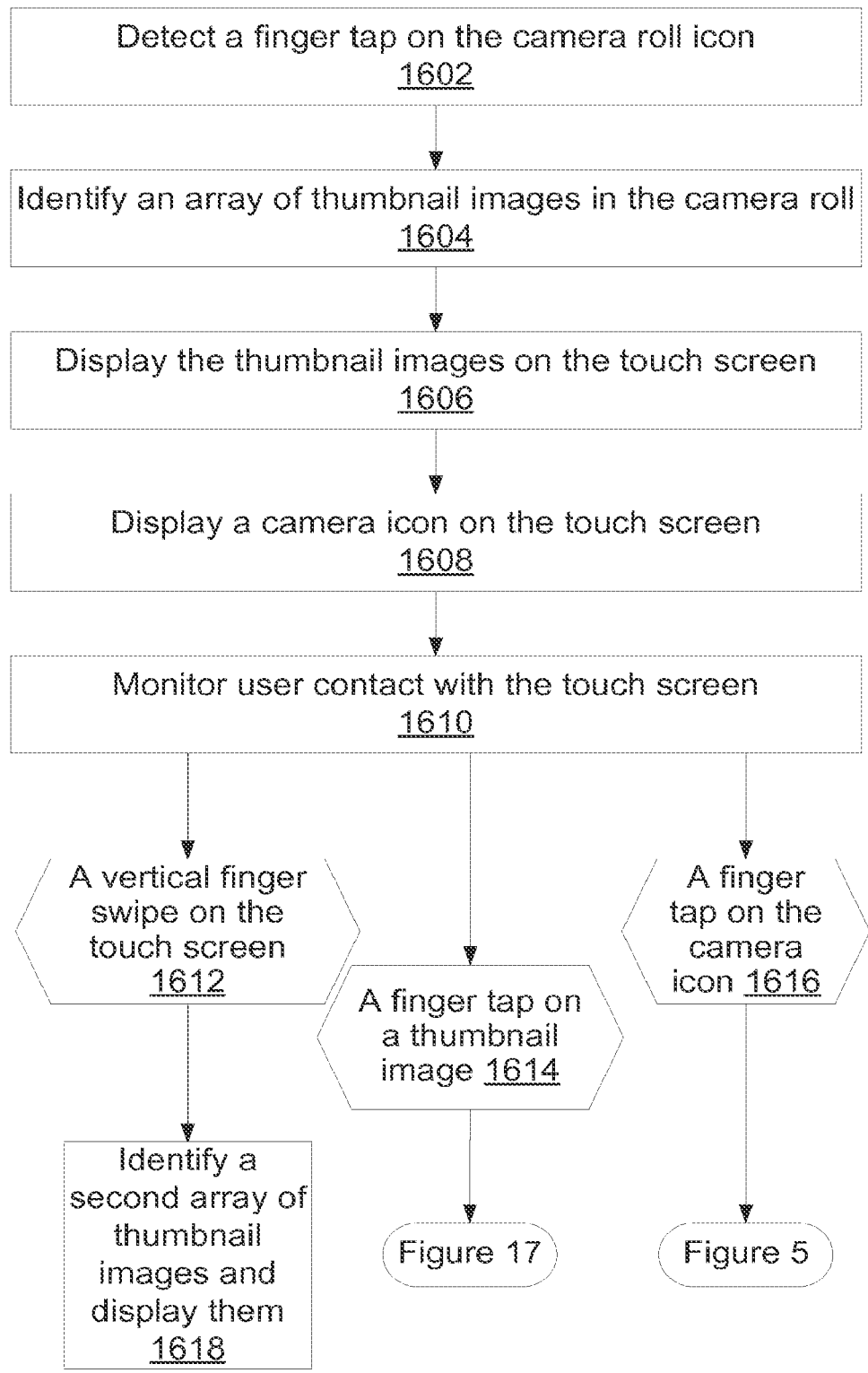
FIG. 16 is a flowchart illustrating a process for displaying thumbnail images on a touch screen in accordance with some embodiments.

FIG. 6 illustrates an exemplary user interface for a virtual camera roll in accordance with some embodiments. The portable electronic device displays the user interface after a user finger gesture 514 on the camera roll icon 504 in FIG. 5. In some embodiments, the finger gesture is a momentary, substantially single-position contact with the touch screen, while in other embodiments other finger gestures may be used. In some embodiments, user interface 600 includes the following elements, or a subset or superset thereof:

- 402, 404, and 406, as described above;
- Thumbnail images 602 of images and/or videos obtained by camera 143;
- Camera icon 604 that when activated (e.g., by a finger gesture on the icon) initiates transfer to the camera UI (e.g., UI 500);

FIG. 16 is a flowchart illustrating a process for displaying thumbnail images on a touch screen in accordance with some embodiments. Upon detecting the finger gesture 514 (1602), the portable electronic device identifies a set of thumbnail images in the virtual camera roll (1604) and displays the thumbnail images on the touch screen (1606). In some embodiments, the thumbnail images are displayed in a 2-D array (FIG. 6). In some other embodiments, the thumbnail images are displayed in a vertical column or a horizontal row. In some embodiments, a thumbnail image may have a description including a name, a file size, and a timestamp indicating when the image was created. In some embodiments, the thumbnail images of videos have a unique appearance that is visually distinguishable from the other still images. The portable electronic device displays the camera icon 604 at the bottom of the touch screen (1608) and starts monitoring next user contact with the touch screen (1610).

In some embodiments, the user may scroll through the thumbnail images 602 using vertically upward/downward finger gestures 606 on the touch screen (1612). Upon detecting such a finger gesture (e.g., a vertical finger swipe), the portable electronic device scrolls the set of thumbnail images accordingly (1618). In some embodiments, the scrolling gesture is independent of a horizontal position of the user contact with the touch screen display. In some embodiments, the scrolling gesture is substantially independent of a horizontal position of the user contact with the touch screen display (e.g., one or more side regions of the touch screen display may be reserved for other functions, such as functions corresponding to icons, soft keys or application navigation functions, and not available for the scroll gesture). In some embodiments, in response to a stationary gesture on a particular thumbnail image (1614), e.g., a finger tap 608 on the thumbnail image 602-11, the portable electronic device initiates a process of generating an enlarged display of the corresponding image (e.g., UI 700A) on the touch screen. A more detailed description of this process is provided below in connection with FIGS. 7 and 17. In some embodiments, upon detecting a user's finger gesture on the camera icon 604 (1616), the portable electronic device brings back the camera UI 500 as shown in FIG. 5.

Figure 7A:
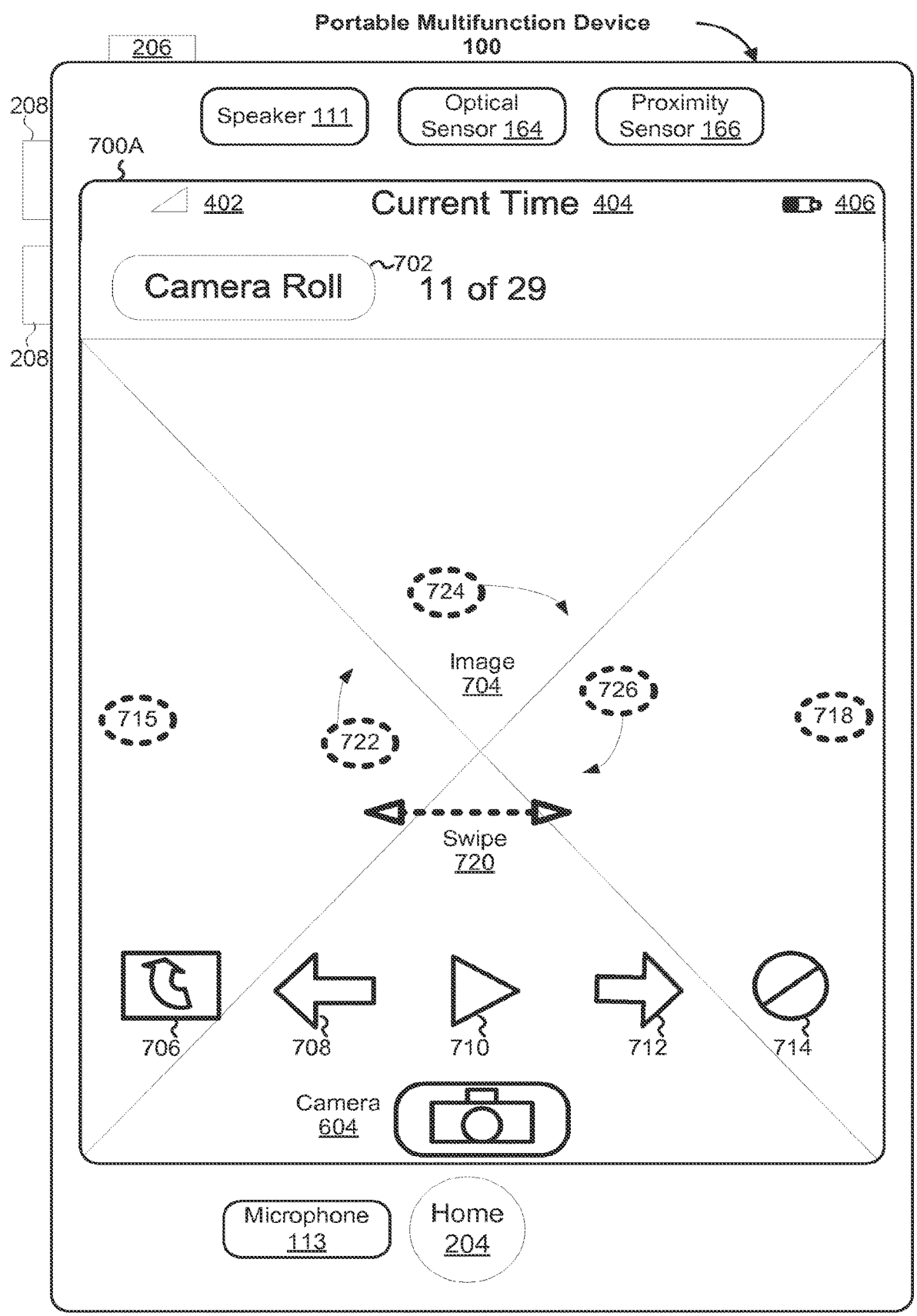
FIGS. 7A through 7C illustrate an exemplary user interface for viewing and manipulating images in accordance with some embodiments.
Figure 7B:
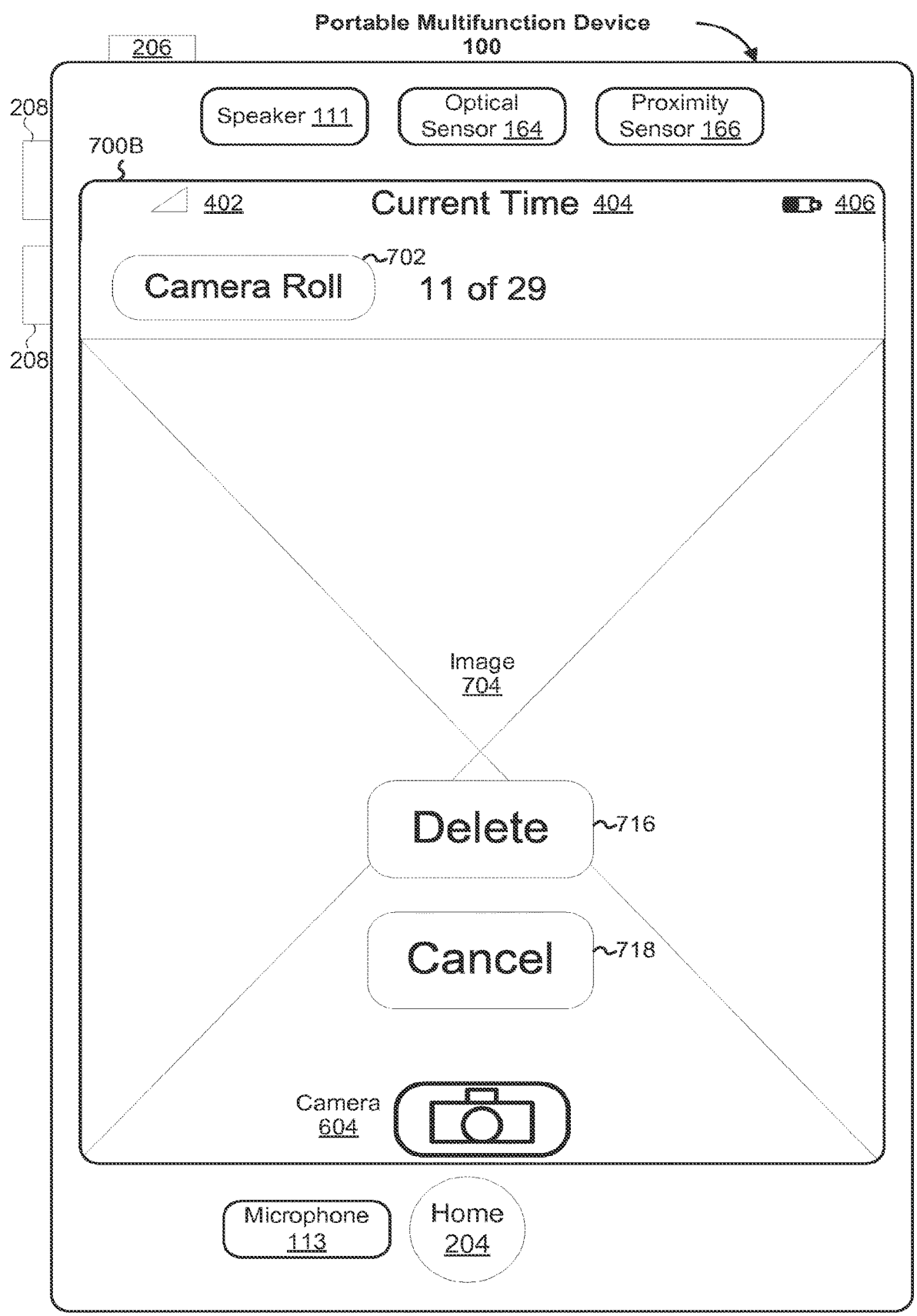
Figure 7C:
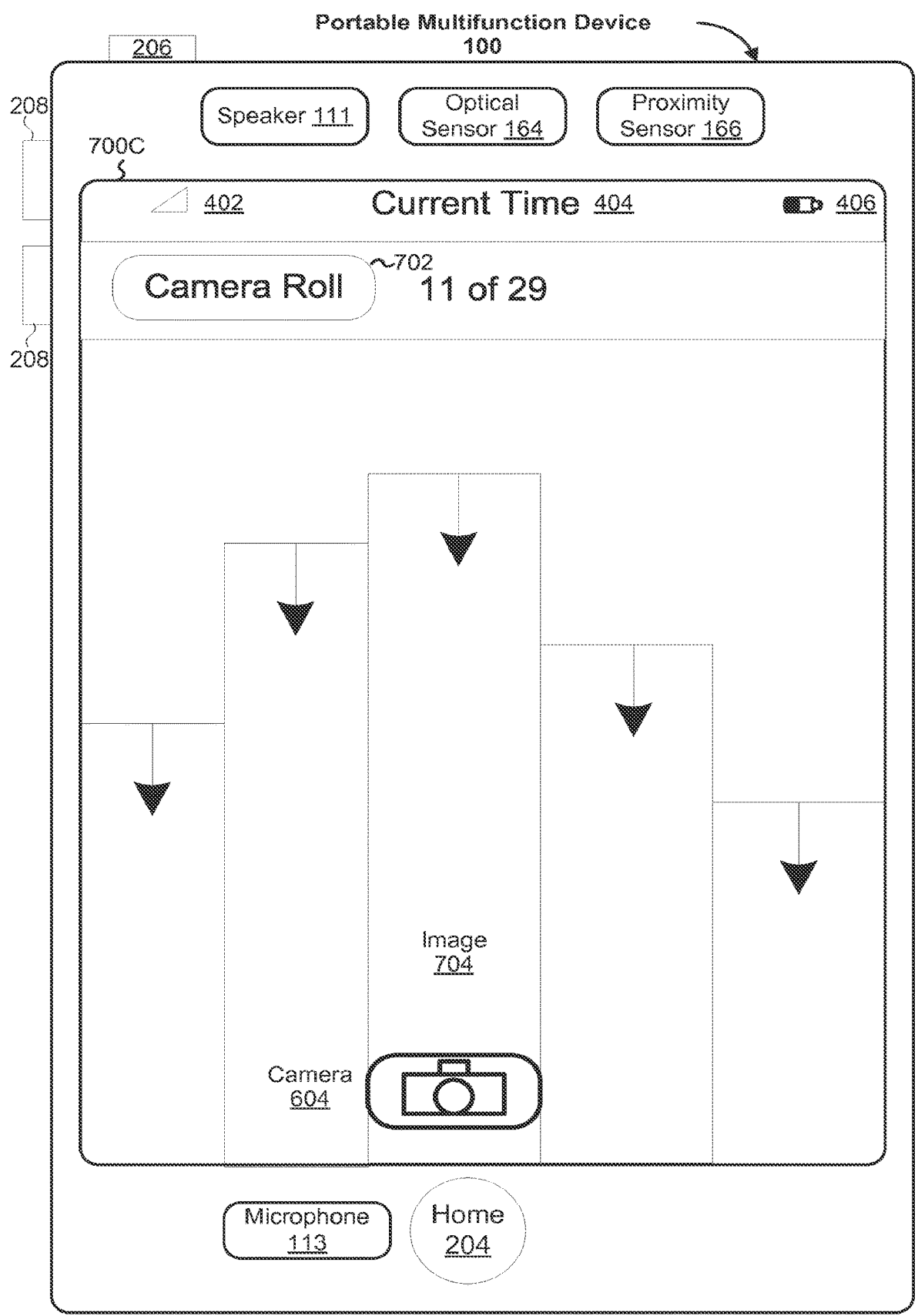

FIGS. 7A through 7C illustrate an exemplary user interface for viewing and manipulating images in accordance with some embodiments. Note that one skilled in the art would understand that the term "image" in the present application covers both still images and video streams.

In some embodiments, user interface 700A includes the following elements, or a subset or superset thereof:

- 402, 404, 406, and 604, as described above;
- Camera roll icon 702 that when activated (e.g., by a finger gesture on the icon) initiates transfer to the camera roll UI (e.g., UI 600);
- Image 704;
- Additional options icon 706 that when activated (e.g., by a finger gesture on the icon) initiates transfer to a UI with additional options for use of image 704 (e.g., UI 1200, FIG. 12));
- Previous image icon 708 that when activated (e.g., by a finger gesture on the icon) initiates display of the previous image in the virtual camera roll (e.g., 602-10);
- Play icon 710 that when activated (e.g., by a finger gesture on the icon) initiates a slide show of the images in the virtual camera roll;
- Next image icon 712 that when activated (e.g., by a finger gesture on the icon) initiates display of the next image in the virtual camera roll (e.g., 602-12); and
- Delete symbol icon 714 that when activated (e.g., by a finger gesture on the icon) initiates display of a UI to confirm that the user wants to delete image 704 (e.g. UI 700B, FIG. 7B).

Figure 17:
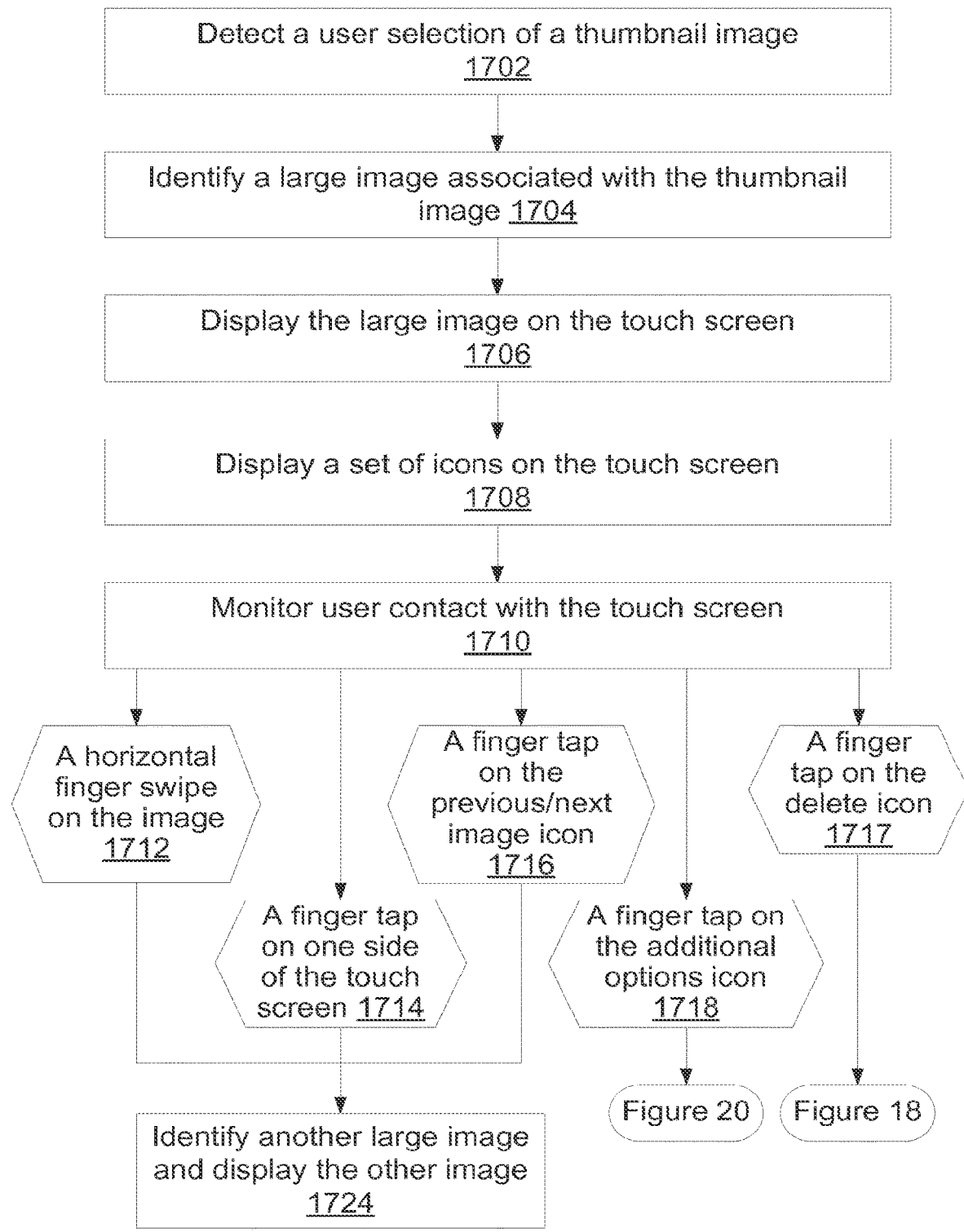
FIG. 17 is a flowchart illustrating a process for performing operations in response to user contact with the touch screen in accordance with some embodiments.

FIG. 17 is a flowchart illustrating a process for performing operations in response to user contact with the touch screen in accordance with some embodiments. After detecting a user selection of a thumbnail image (1702), the portable electronic device identifies an image associated with the thumbnail image (1704). Generally, this identified image is larger than the thumbnail image. In some embodiments, the thumbnail image is a sub-sampled version of the larger image. As shown in FIG. 7A, the large image is displayed on the touch screen in replacement of all the thumbnail images (1706). The portable electronic device displays various icons at predefined locations on the touch screen (1708) and waits for next user contact with the touch screen (1710).

In some embodiments, as shown in FIG. 7A, the portable electronic device performs the same operation(s) in response to different user contacts. In some embodiments, a user can browse images in the virtual camera roll through three different gestures: (i) a finger gesture on the previous/next image icon 708/712 (1716), (ii) a user image navigation gesture by a finger tap 715/718 adjacent to the left/right edge of the touch screen (1714), or (iii) a leftward/rightward horizontal finger swipe gesture 720 on the touch screen (1712). Upon detecting any of these user gestures, the portable electronic device replaces the image on the touch screen with the previous/next one in the virtual camera roll (1724). In some embodiments, this replacement is an animated process of moving the current image out of the touch screen to the right/left side and moving the previous/next image into the touch screen from the left/right side. With multiple means to perform the same task, the portable electronic device allows a user to choose whichever the user prefers, thereby making the photo management simpler and more intuitive. In some embodiments, the tap gestures 715 and 718 are used to magnify (e.g., by zooming in) an image by a predetermined amount, rather than to view a previous or next image. For this case, the user is still provided with two different types of gestures for browsing images: (i) a finger gesture on the previous/next image icon 708/712 (1716) and (ii) a leftward/rightward horizontal finger swipe gesture 720 on the touch screen (1712).

In some embodiments, the portable electronic device rotates the image 704 by an angle in response to a user image rotation gesture. For example, the user image rotation gesture may include three simultaneous finger contacts 722, 724 and 726 with the image 704. When the three finger contacts move in the directions indicated by the respective arrows for at least a predefined distance, the portable electronic device rotates the image 704 from a portrait orientation to a landscape orientation or from a landscape orientation to a portrait orientation. In some embodiments, the rotation gesture is a two-finger multitouch gesture (e.g., simultaneous finger contacts 722 and 726). In some embodiments, the image rotates in response to detection of a change in the orientation of the device (e.g., using accelerometers to detect the orientation of the device). For example, the image may rotate to maintain proper viewing orientation as the touch screen 112 is physically rotated from a portrait orientation to a landscape orientation.

In some embodiments, a user finger gesture on the additional options icon 706 (1718) triggers the portable electronic device to render additional operations on the image 704. A more detailed description of some exemplary operations associated with the icon 706 is provided below in connection with FIGS. 12 and 20.

In some embodiments, a user finger gesture on the delete symbol icon 714 (1717) causes the portable electronic device to provide a user interface 7008 as shown in FIG. 7B. Through the user interface 7008, the user can delete the current image 704 from the camera roll. The user interface 7008 includes the following elements, or a subset or superset thereof:

402, 404, 406, 604, 702, and 704, as described above;

Delete icon 716 that when activated (e.g., by a finger gesture on the icon) deletes the image 704; and Cancel icon 718 that when activated (e.g., by a finger gesture on the icon) returns the portable electronic device to the previous user interface (e.g. UI 700A)

Figure 18:
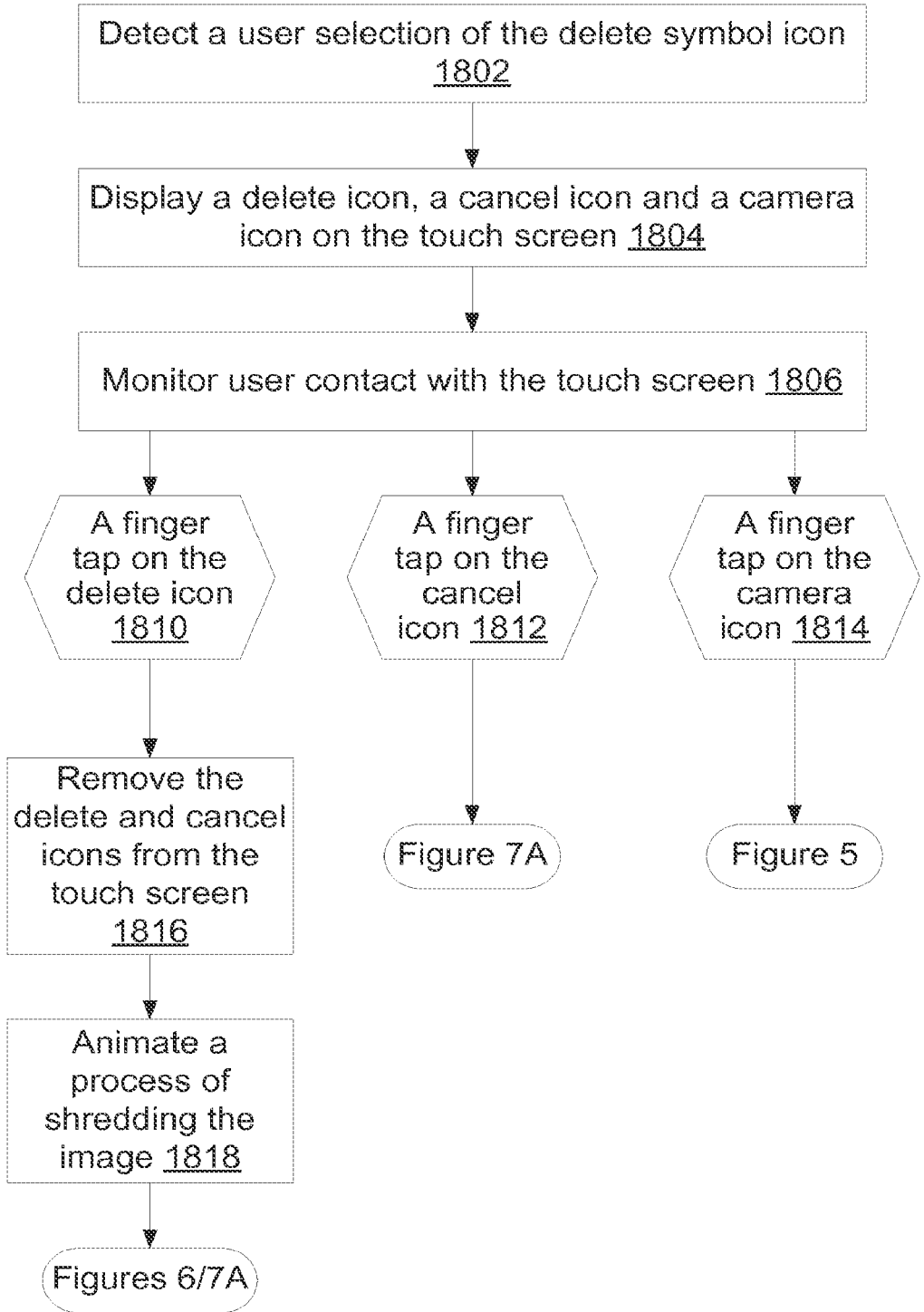
FIG. 18 is a flowchart illustrating a process for deleting an image in response to a user contact with the touch screen in accordance with some embodiments.

FIG. 18 is a flowchart illustrating a process for deleting an image in response to a user contact with the touch screen in accordance with some embodiments. Upon detecting a user contact with the delete symbol icon 714 (1802), the portable electronic device displays the delete icon 716, the cancel icon 718, and the camera icon 604 on top of the image 704 (1804) and then monitors next user contact with the touch screen (1806).

In some embodiments, in response to a finger gesture on the delete icon 716 (1810), the portable electronic device eliminates the icons 716, 718 from the touch screen (1816) and initiates an animated process of "shredding" the image 704 (1818). In some embodiments, the shredding process includes breaking the image 704 into vertical stripes and dropping the vertical stripes from the touch screen at different paces. Other shredding animations, such as placing the image in a trash icon, may be used in other embodiments.

In some embodiments, the portable electronic device brings back the camera roll user interface 600 as shown in FIG. 6 after deleting the image 704. The user can then repeat any aforementioned processes shown in FIG. 16. In some other embodiments, the portable electronic device displays the next image in the virtual camera roll on the touch screen. The user may repeat any aforementioned processes shown in FIG. 17.

If the portable electronic device detects a finger gesture on the cancel icon 718 (1812), it the device brings back the user interface 700A as shown in FIG. 7A. If the next user action is a finger gesture on the camera icon 604 (1814), the portable electronic device switches back to the camera mode user interface 500, which allows the user to take new photos.

This deletion process, which requires user finger gestures on two different user interfaces (e.g., 700A and 700B), reduces the chance of a user accidentally deleting an image or other similar item.

In some embodiments, the portable electronic device stores images within different photo albums. The images may come from different sources. They may be downloaded from locations such as the user's desktop or laptop computer and a website on the Internet, etc. For example, one album may include images downloaded from a website through the web browser 147, images attached to email messages received by the user of the portable electronic device, and photos taken by the portable electronic device using the camera module 143.

Figure 8:
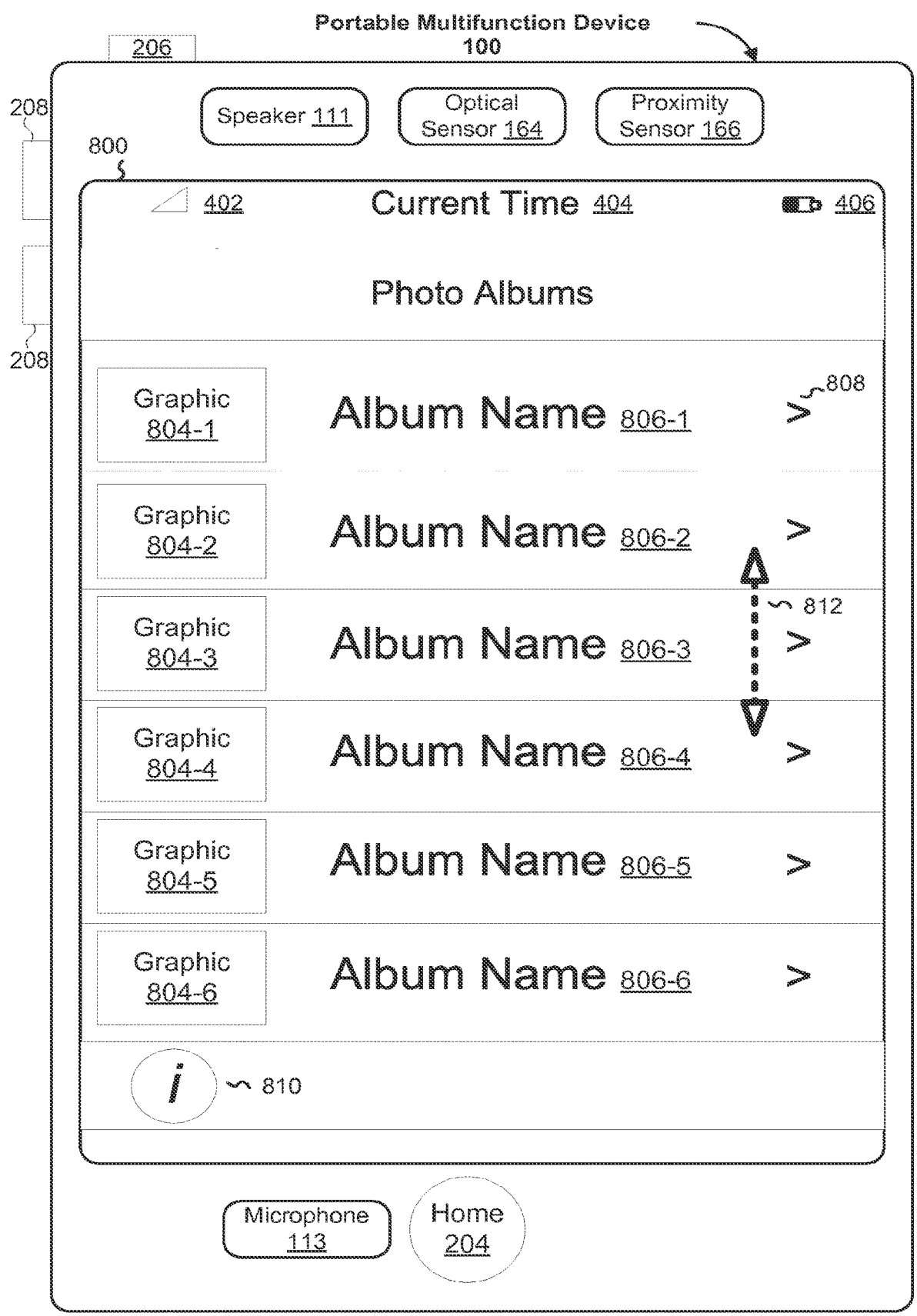
FIG. 8 illustrates an exemplary user interface for viewing photo albums in accordance with some embodiments.

FIG. 8 illustrates an exemplary user interface for viewing photo albums in accordance with some embodiments. In some embodiments, user interface 800 includes the following elements, or a subset or superset thereof:

402, 404, and 406, as described above;

Graphics 804, e.g., thumbnail images of the first picture or a user-selected picture in the corresponding albums;

Album names 806;

Selection icons 808 that when activated (e.g., by a finger gesture on the icon) initiates display of the corresponding album (e.g., UI 1000, FIG. 10); and Settings icon 810, that brings up a settings menu (e.g., FIG. 9) when activated by a user gesture (e.g., a tap gesture).

Figure 19:
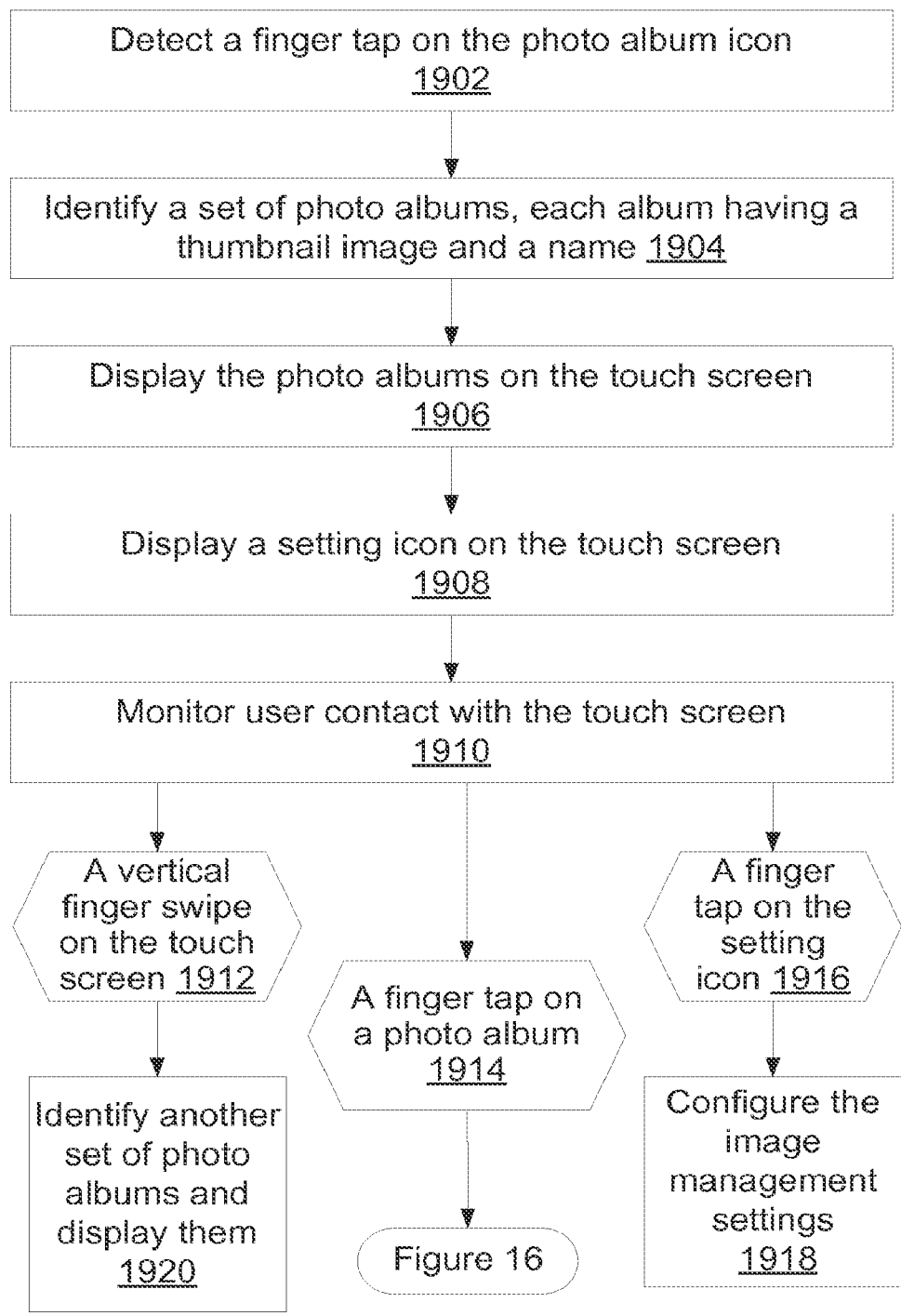
FIG. 19 is a flowchart illustrating a process for displaying multiple photo albums on the touch screen in accordance with some embodiments.

FIG. 19 is a flowchart illustrating a process for displaying multiple photo albums on the touch screen in accordance with some embodiments. After detecting a finger gesture 412 (FIG. 4) on the icon for the image management module 144 (1902), the portable electronic device identifies a set of photo albums (1904) and displays them on the touch screen (1906). FIG. 8 depicts a vertically list of photo albums 804 list, each album having a thumbnail image 804, a name 806, and a selection icon 808. In some embodiments, the photo albums are ordered alphabetically by their names. In some other embodiments, the photo albums are ordered by their creation timestamps, e.g., with the most recent one at the top of the list.

The portable electronic device displays a setting icon 810 at the bottom of the touch screen (1908) and monitors user contact with the touch screen (1910). As will be described below in connection with FIG. 9, a user can configure the image management module 144 to operate in a user-chosen manner through the setting icon 810.

If there is a long photo album list, the user may scroll through the list using vertically upward/downward finger gestures 812 such as a vertical finger swipe on the touch screen (1912, 1920). When the user selects a particular album by a finger gesture (1914), the portable electronic device opens the album by executing the process described above in connection with FIG. 16. The virtual camera roll shown in FIG. 6 is one of many photo albums. User operations associated with the virtual camera roll also applies to images in a user-chosen album. A more detailed description of exemplary user operations is provided below in connection with FIGS. 10-12. In some embodiments, a user may initiate display of an album by contacting any region on the touch screen corresponding to the album (e.g., a finger tap on the graphic 804, album name 806, or selection icon 808).

Figure 9:
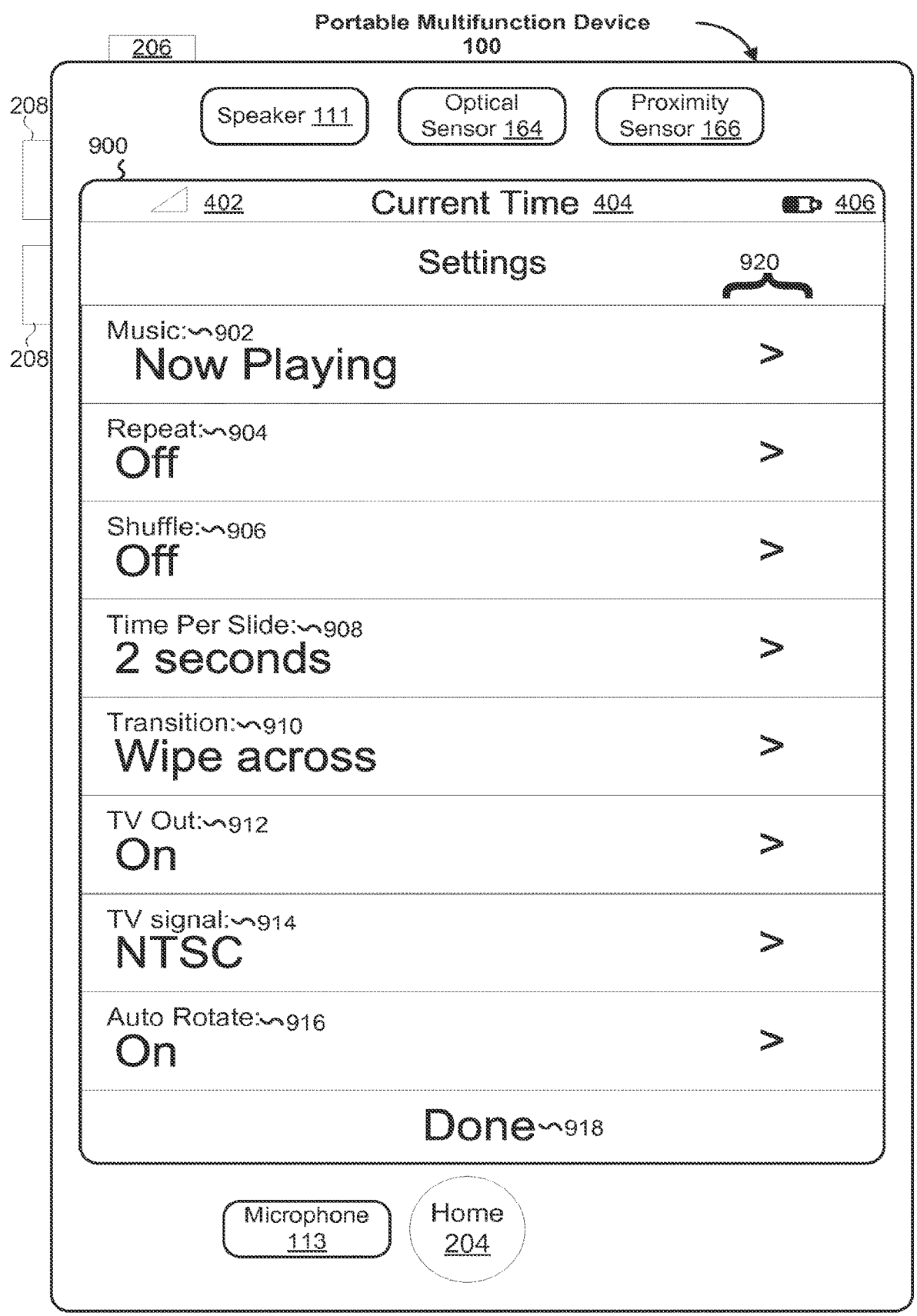
FIG. 9 illustrates an exemplary user interface for setting user preferences in accordance with some embodiments.

Upon detecting a finger gesture on the setting icon 810 (1916), the portable electronic device renders a Settings user interface that enables the user to configure the image management service (1918). FIG. 9 illustrates an exemplary Settings user interface 900 for setting user preferences in accordance with some embodiments. In some embodiments, user interface 900 includes the following elements, or a subset or superset thereof:

402, 404, and 406, as described above;

Music setting 902 for selecting the music during a slide show (e.g., Now Playing, 90s Music, Recently Added, or Off);

Repeat setting 904 for selecting whether the slide show repeats (e.g., On or Off);

Shuffle setting 906 for selecting whether the images in the slide show are displayed in a random or pseudo-random order (e.g., On or Off);

Time per slide setting 908 (e.g., 2, 3, 5, 10, 20 seconds or manual);

Transition setting 910 (e.g., random, wipe across, wipe down, or off);

TV out setting 912 for external display (e.g., on, off, or ask user);

TV signal setting 914 (e.g., NTSC or PAL);

Auto Rotate setting 916 (e.g. on or off);

Done icon 918 that when activated (e.g., by a finger gesture on the icon) returns the portable electronic device to the previous UI (e.g., UI 800); and Selection icons 920 that when activated (e.g., by a finger gesture on the icon) show choices for the corresponding settings.

In some embodiments, a user may touch anywhere in a row for a particular setting to initiate display of the corresponding setting choices. For example, upon detecting a finger tap on TV Signal setting 914, the portable electronic device brings up a dropdown menu adjacent to the corresponding row. The dropdown menu lists configuration options associated with the setting. The user can select one option over another by applying a finger gesture on the selected option.

Figure 10:
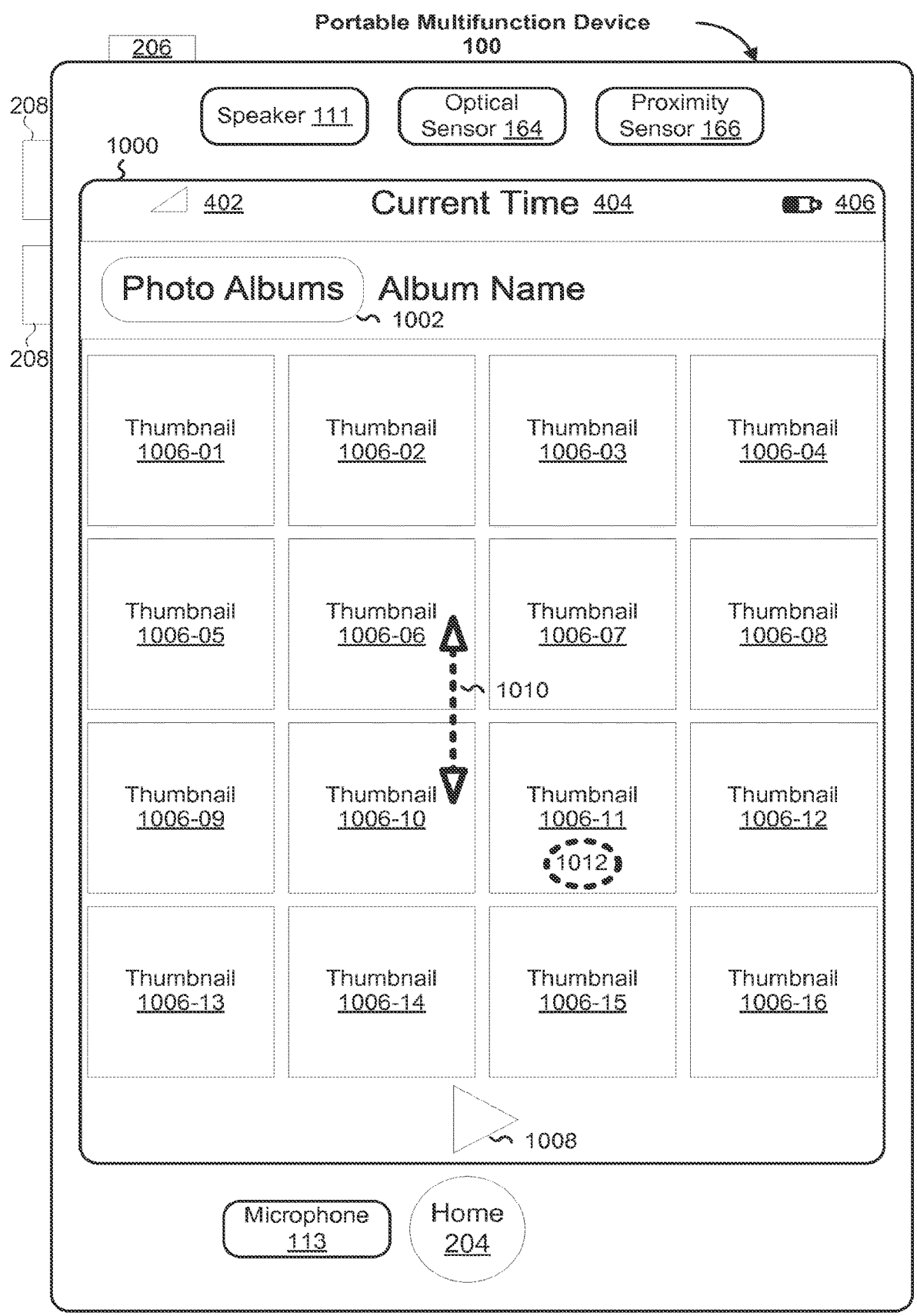
FIG. 10 illustrates an exemplary user interface for viewing an album in accordance with some embodiments.

FIG. 10 illustrates an exemplary user interface for viewing an album in accordance with some embodiments. In some embodiments, user interface 1000 includes the following elements, or a subset or superset thereof:

402, 404, and 406, as described above;

Photo albums icon 1002 that when activated (e.g., by a finger gesture on the icon) initiates transfer to the photo albums UI (e.g., UI 800);

Thumbnail images 1006 of images in the corresponding album;

Play icon 1008 that when activated (e.g., by a finger gesture on the icon) initiates a slide show of the images in the album;

The user interface 1000 is similar to the user interface 600 associated with the camera roll icon 504. Both user interfaces perform similar operations upon detecting a user contact with the thumbnail images. For example, the user may scroll through the thumbnails 1006 using vertically upward/downward gestures 1010 on the touch screen. In some embodiments, a stationary gesture on a particular thumbnail (e.g., a finger tap 1012 on thumbnail 1006-11) initiates transfer to an enlarged display of the corresponding image (e.g., UI 1100).

In some embodiments, there are differences between the two user interfaces. For example, the user interface 1000 has a play icon 1008 while the user interface 600 has a camera icon 604. A user selection of the play icon 1008 triggers the portable electronic device to begin a slide show of the images in the user-selected album. In contrast, the portable electronic device returns to the camera mode (e.g., for taking pictures) when there is a user finger gesture on the camera icon 604.

Figure 11:
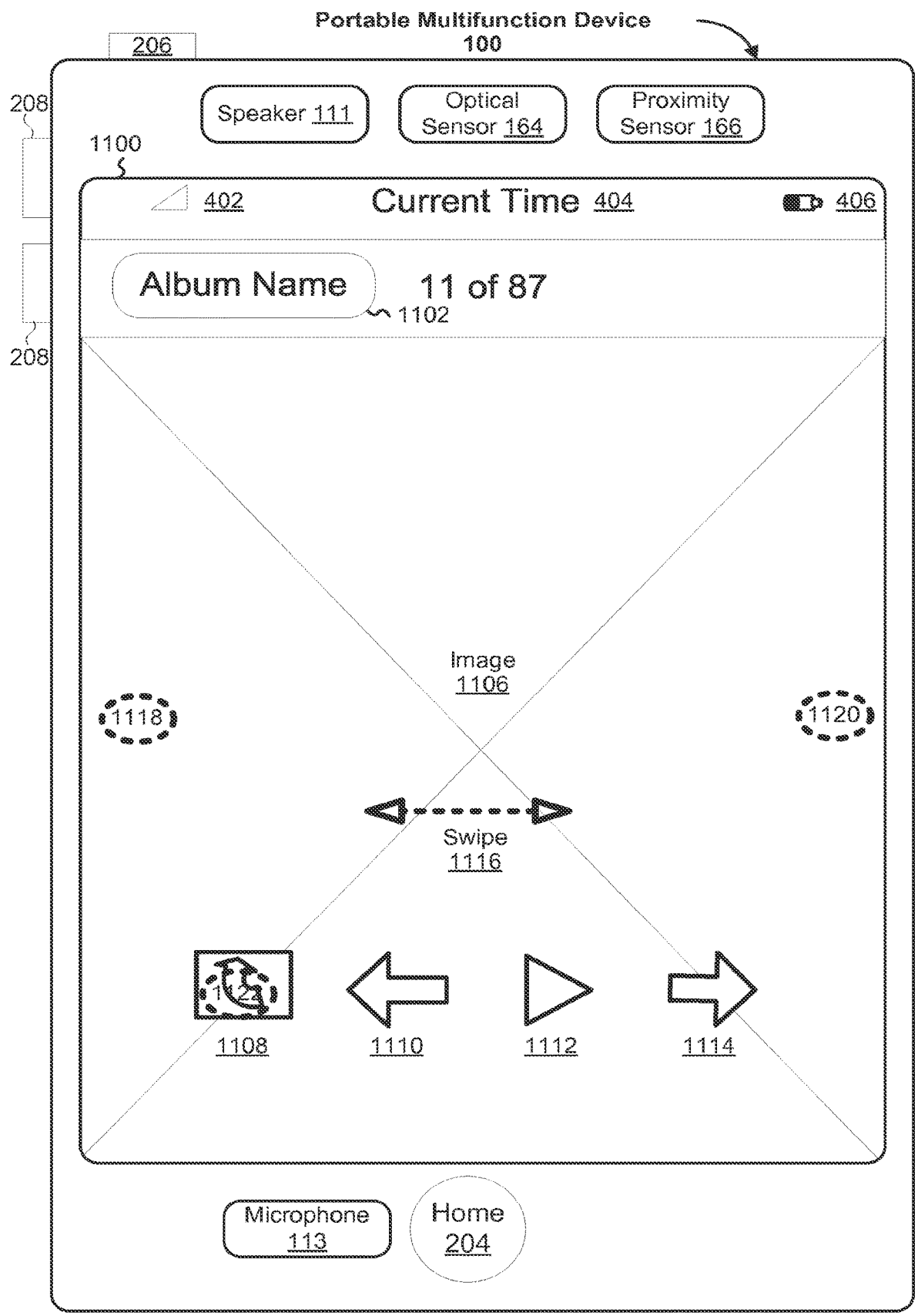
FIG. 11 illustrates an exemplary user interface for viewing images in an album in accordance with some embodiments.

Upon user selection of a particular image, the portable electronic device renders a new user interface displaying the user-selected image. FIG. 11 illustrates such an exemplary user interface for viewing images in an album in accordance with some embodiments. In some embodiments, user interface 1100 includes the following elements, or a subset or superset thereof:

402, 404, and 406, as described above;

Album name icon 1102 that when activated (e.g., by a finger gesture on the icon) initiates transfer to the corresponding album UI (e.g., UI 1000);

Image 1106;

Additional options icon 1108 that when activated (e.g., by a finger gesture on the icon) initiates transfer to a UI with additional options for use of image 1106 (e.g., UI 1200, FIG. 12));

Previous image icon 1110 that when activated (e.g., by a finger gesture on the icon) initiates display of the previous image in the album (e.g., 1006-10);

Play icon 1112 that when activated (e.g., by a finger gesture on the icon) initiates a slide show of the images in the album; and Next image icon 1114 that when activated (e.g., by a finger gesture on the icon) initiates display of the next image in the album.

Clearly, the user interface 1100 is very similar to the user interface 700A. Various image browsing functions described above with respect to FIG. 7A are also available at the user interface 1100. For example, the user can initiate viewing of the previous image by making a tap gesture 1118 on the left side of the image or making a swipe gesture 1116 from left to right on the image. Similarly, the user can initiate viewing of the next image by making a tap gesture 1120 on the right side of the image or making a swipe gesture 1116 from right to left on the image.

In some embodiments, image 1106 moves off screen to the left as the next image moves on screen from the right. In some embodiments, image 1106 moves off screen to the right as the previous image moves on screen from the left.

With multiple ways to perform the same task, the portable electronic device enables a user to choose whichever methodology or gesture the user prefers, thereby making the photo management simpler and more intuitive.

A detailed description of the portable electronic device's operations in response to user selections of the previous image icon 1110, the play icon 1112, and the next image icon 1114 have been provided above in connection with FIGS. 7A and 17. In response to a user contact with the additional options icon 706 (FIG. 7A) or 1108 (FIG. 11), the portable electronic device renders a new interface with additional options for the user to choose in connection with the image being displayed.

Figure 12:
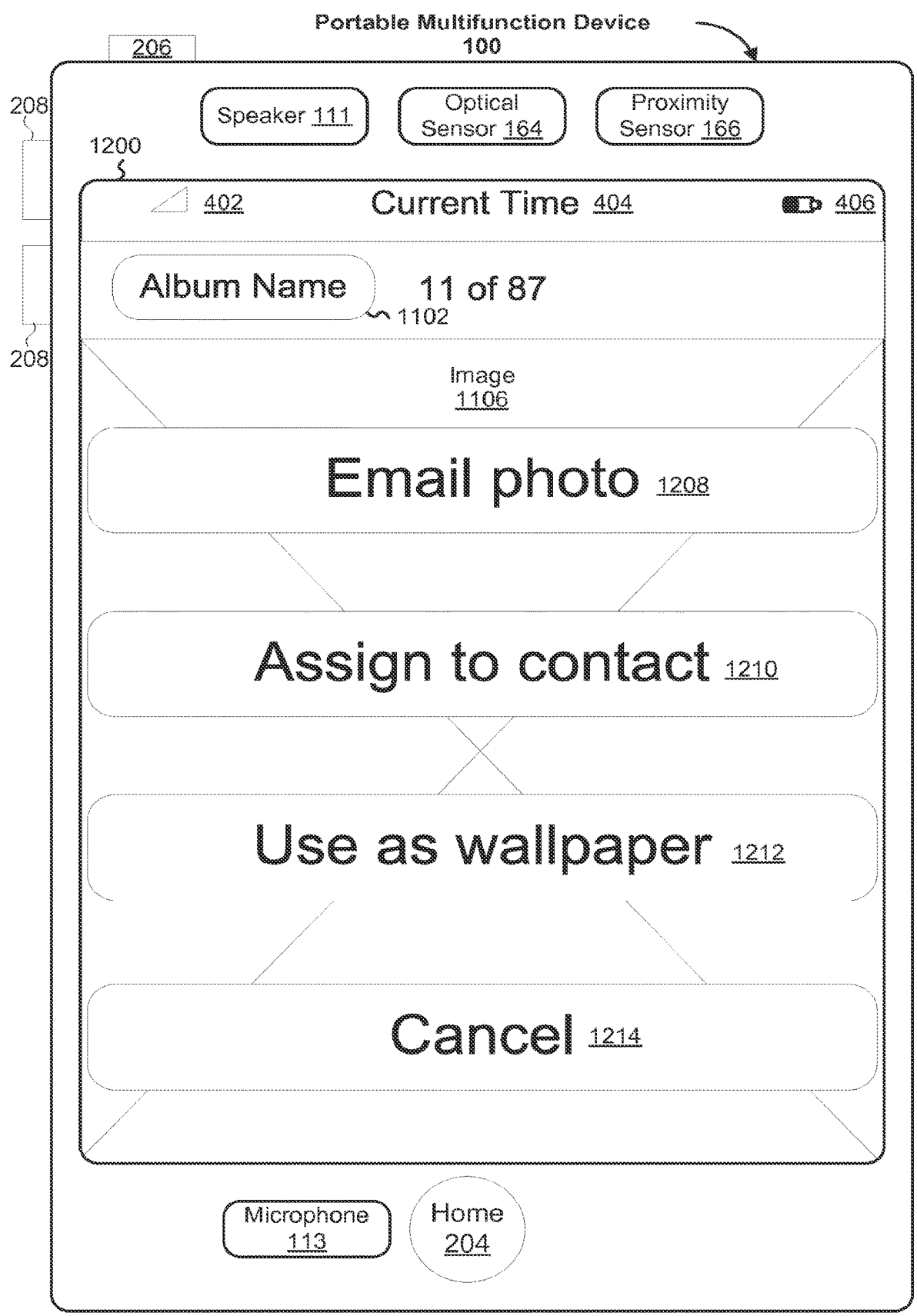
FIG. 12 illustrates an exemplary user interface for selecting a use for an image in an album in accordance with some embodiments.
Figure 14A:
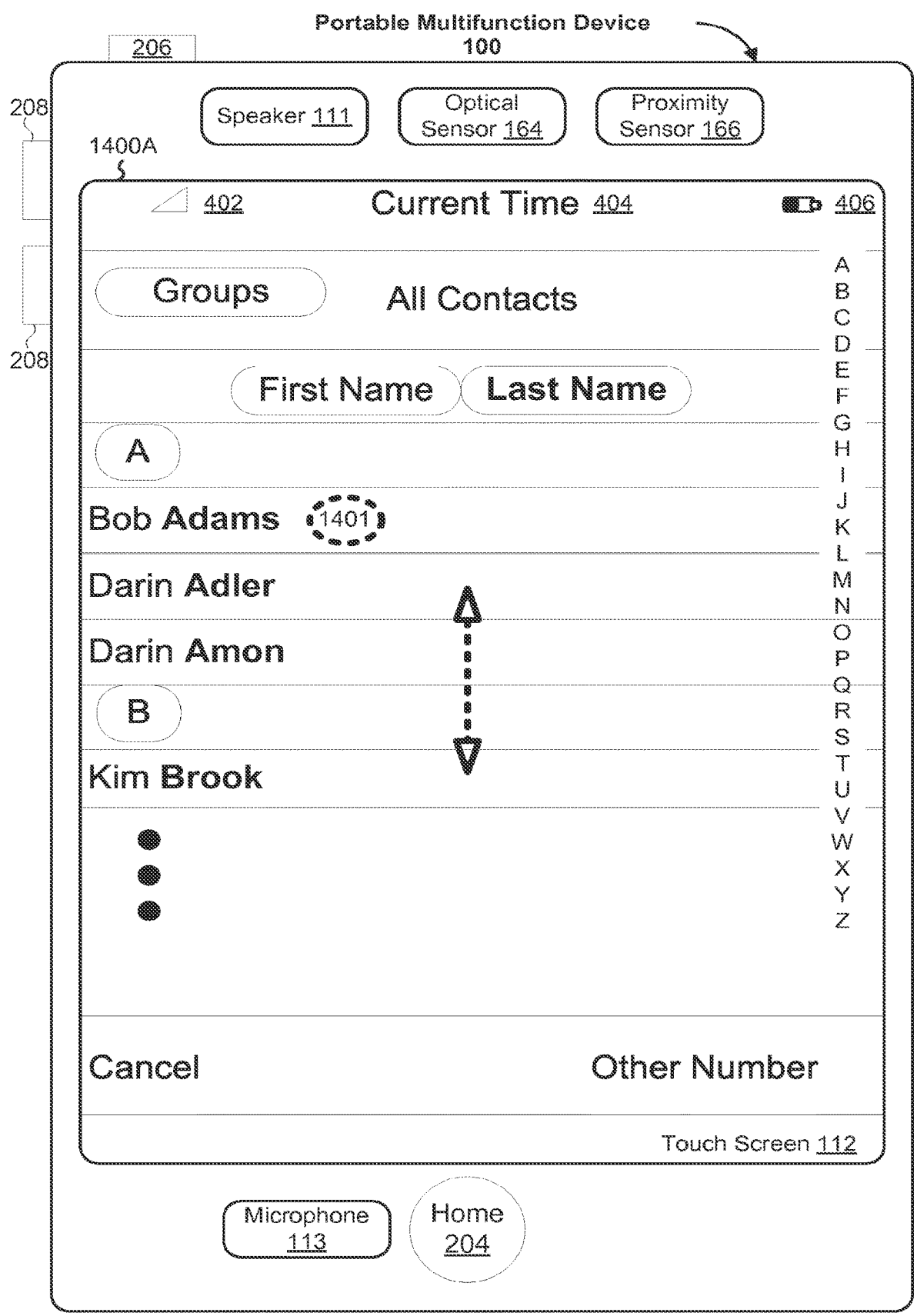
FIGS. 14A and 14B illustrate an exemplary user interface for assigning an image to a contact in the user's contact list in accordance with some embodiments.
Figure 14B:
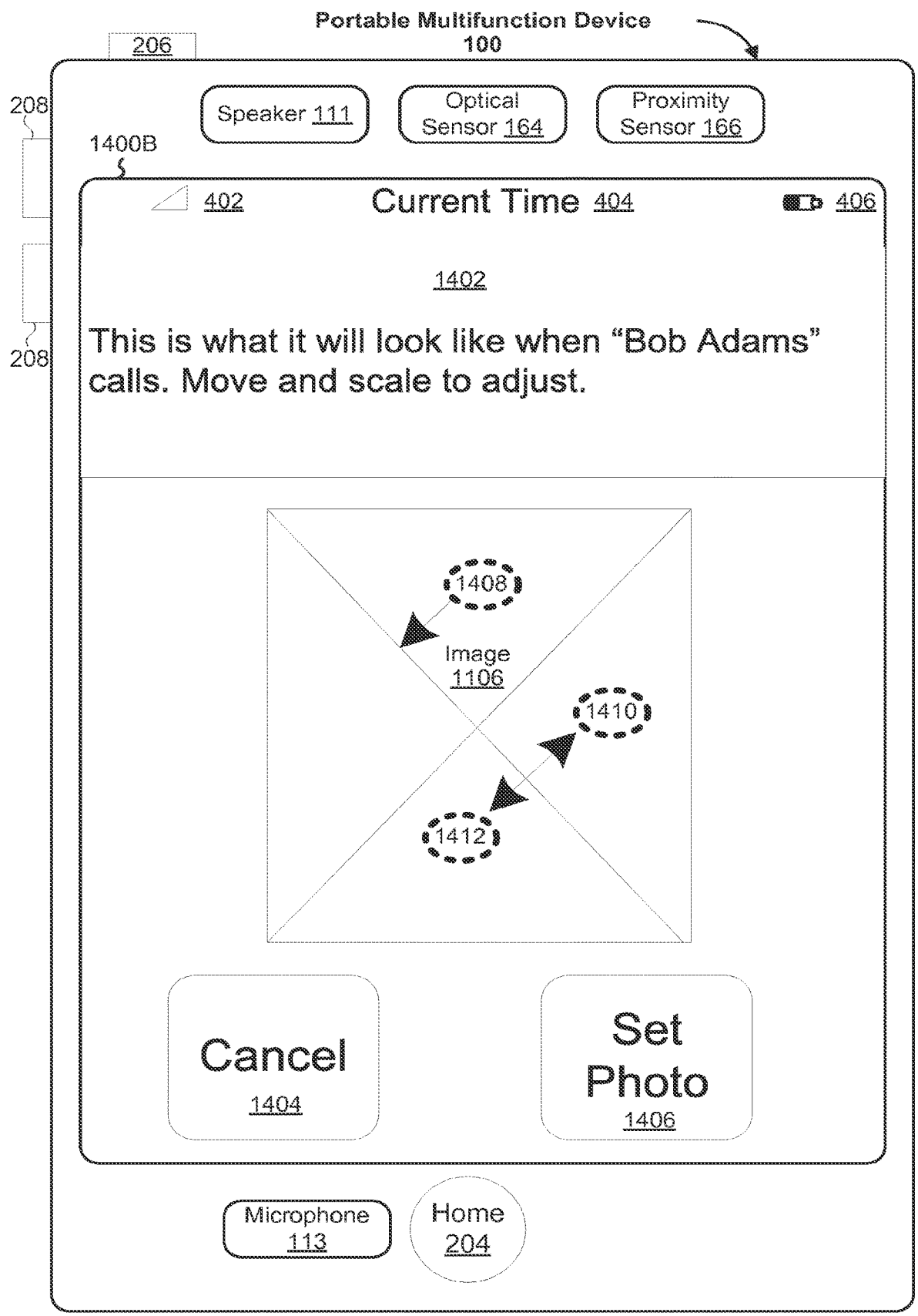
Figure 15:
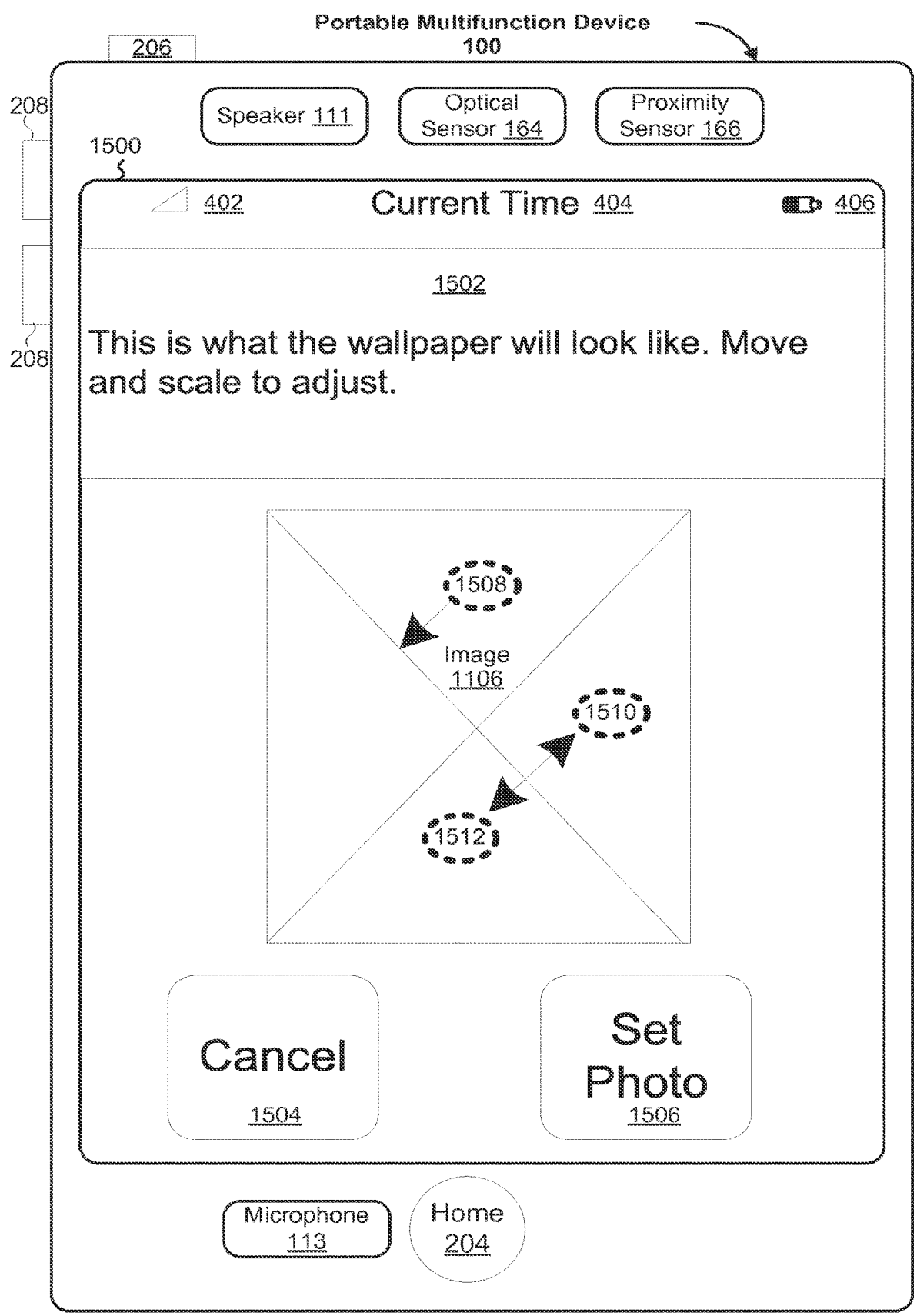
FIG. 15 illustrates an exemplary user interface for incorporating an image in the user's wallpaper in accordance with some embodiments.

FIG. 12 illustrates such an exemplary user interface for selecting a use for an image in an album in accordance with some embodiments. In some embodiments, user interface 1200 includes the following elements, or a subset or superset thereof:

402, 404, 406, 1602, and 1106 as described above;

Email photo icon 1208 that when activated (e.g., by a finger gesture on the icon) initiates a process for incorporating the image 1106 in an email (e.g., as illustrated in FIGS. 13A-13G);

Assign to contact icon 1210 that when activated (e.g., by a finger gesture on the icon) initiates a process for associating the image 1106 with a contact in the user's contact list (e.g., as illustrated in FIGS. 14A-14B);

Use as wallpaper icon 1212 that when activated (e.g., by a finger gesture on the icon) initiates a process for incorporating the image 1106 in the user's wallpaper (e.g., as illustrated in FIG. 15); and Cancel icon 1214 that when activated (e.g., by a finger gesture on the icon) initiates transfer back to the previous UI (e.g., UI 1100).

In some embodiments, as shown in FIG. 12, the image 1106 is displayed in the background and one or more the function icons 1208, 1210, 1212, 1214, are superimposed over the displayed image 1106.

Figure 20:
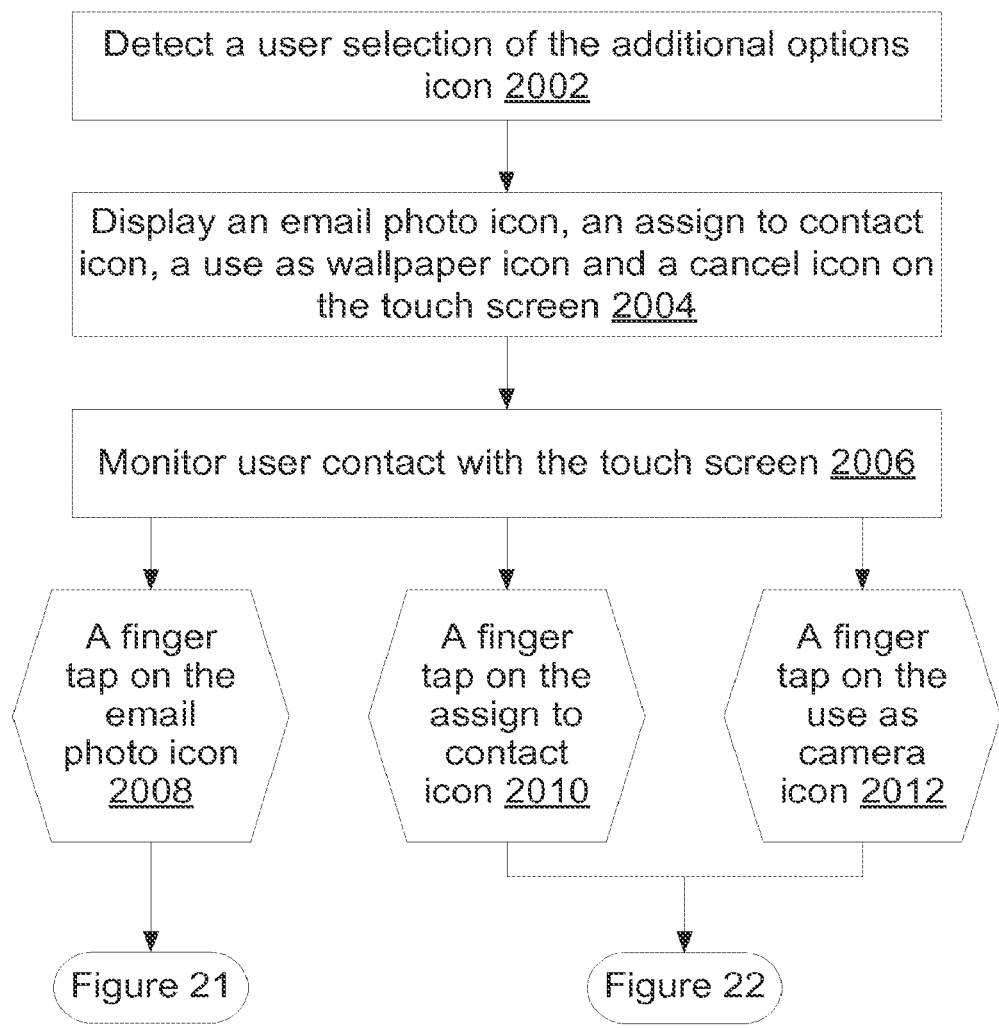
FIG. 20 is a flowchart illustrating a process for performing additional operations upon a user selection of an additional options icon in accordance with some embodiments.

FIG. 20 is a flowchart illustrating a process for performing additional operations upon a user selection of an additional options icon (e.g., icon 1108 in UI 1100, FIG. 11) in accordance with some embodiments. Upon detecting a finger gesture 1122 on the additional options icon (2002), the portable electronic device displays a list of option icons on the touch screen (2004). Each option icon corresponds to a specific operation on the image being displayed. As shown in FIG. 12, the list includes Email photo icon 1208, Assign to contact icon 1210, Use as wallpaper icon 1212, and Cancel icon 1214. In some other embodiments, the user interface 1200 may include a subset of these icons, and may also include additional image usage icons for invoking other image usage functions.

If the user selects the email photo icon 1208 by a finger gesture (2008), the portable electronic device renders an email service interface that allows the user to send the image 1106 to somebody through email. If the user selects the assign to contact icon 1210 (2010), the portable electronic device displays a user interface (having a list of contacts) for the user to select a contact to be associated with the image 1106. Similarly, if the user selects the use as wallpaper icon 1212 (2012), the portable electronic device displays a user interface for the user to edit the image 1106 and set it as the portable electronic device's wallpaper.

Figure 21:
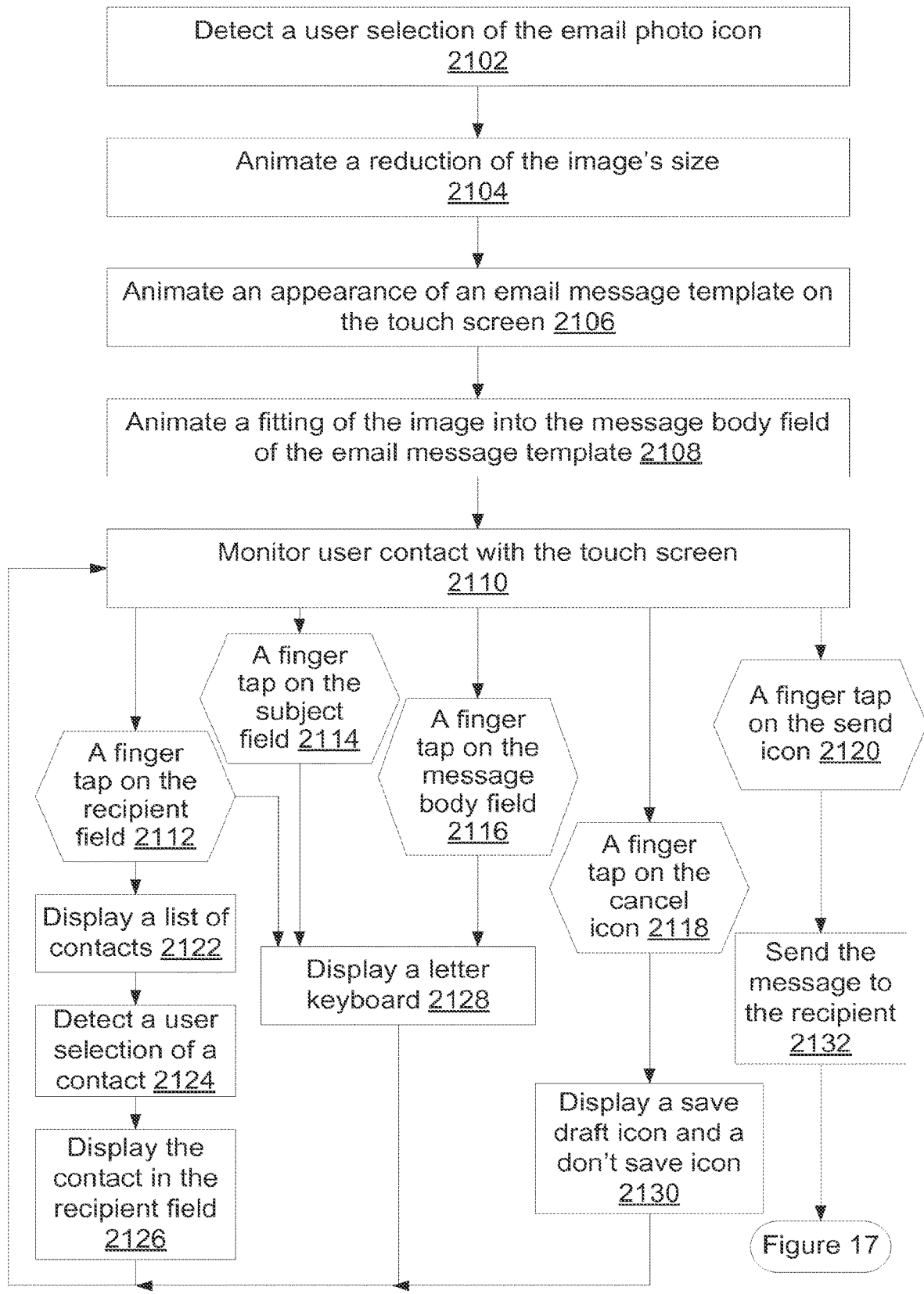
FIG. 21 is a flowchart illustrating an animated process for rendering an email service interface that includes a user selected image in accordance with some embodiments.

FIG. 21 is a flowchart illustrating an animated process for rendering an email service interface that includes a user selected image in accordance with some embodiments. After detecting the user selection of Email photo icon 1208 (2102), the portable electronic device animates a process of introducing an email message template onto the touch screen and placing the image into a predefined region of the email message template. In some embodiments, the animation includes initially reducing the image's size (FIG. 13A) (2104); sliding or otherwise rendering an email message template behind the image 1106 (FIG. 13B) (2106); and fitting the image into the message body field (FIG. 13C) of an email composition user interface 1300C (2108).

Figure 13A:
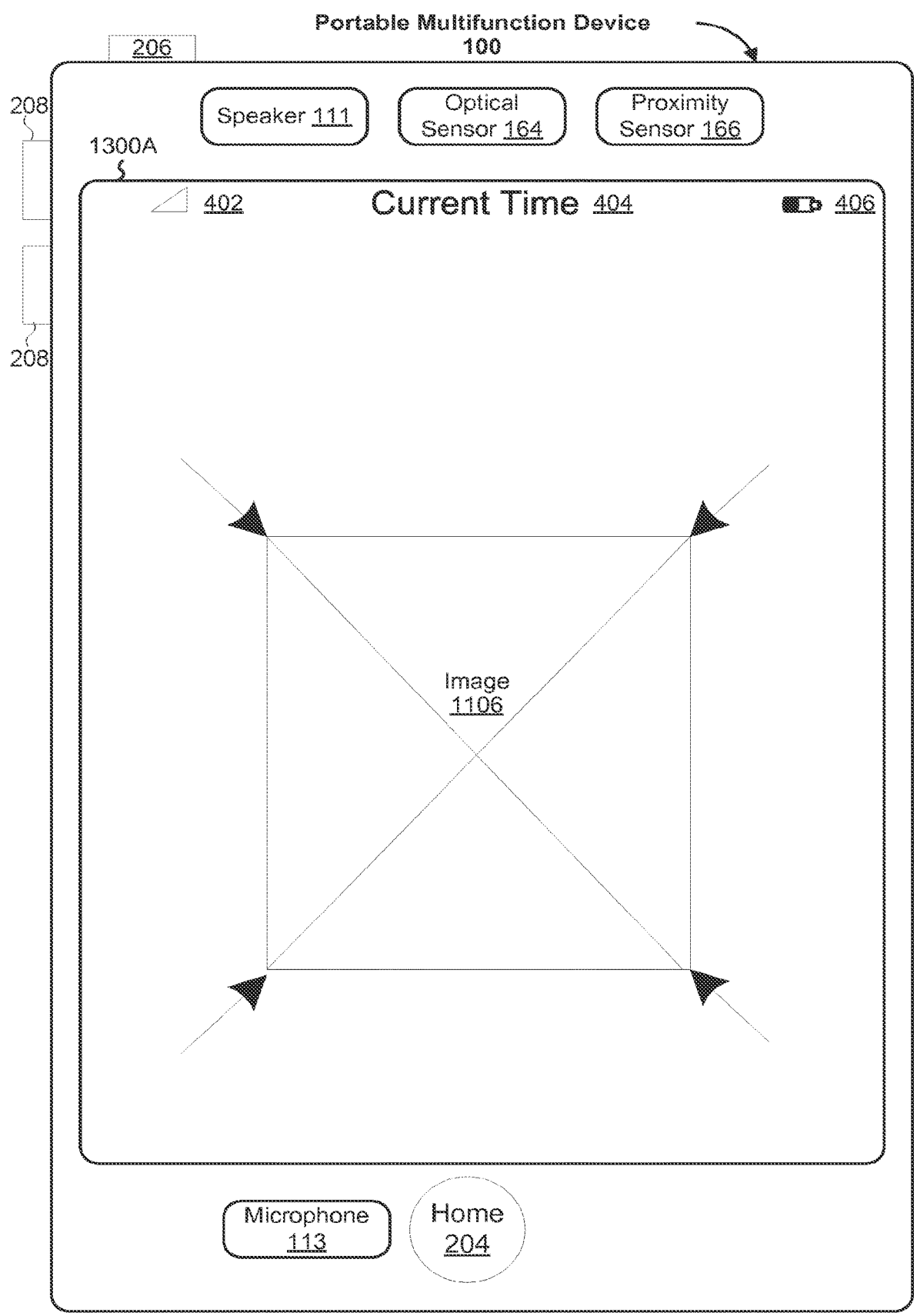
FIGS. 13A through 13G illustrate an exemplary user interface for incorporating an image in an email message template in accordance with some embodiments.
Figure 13B:
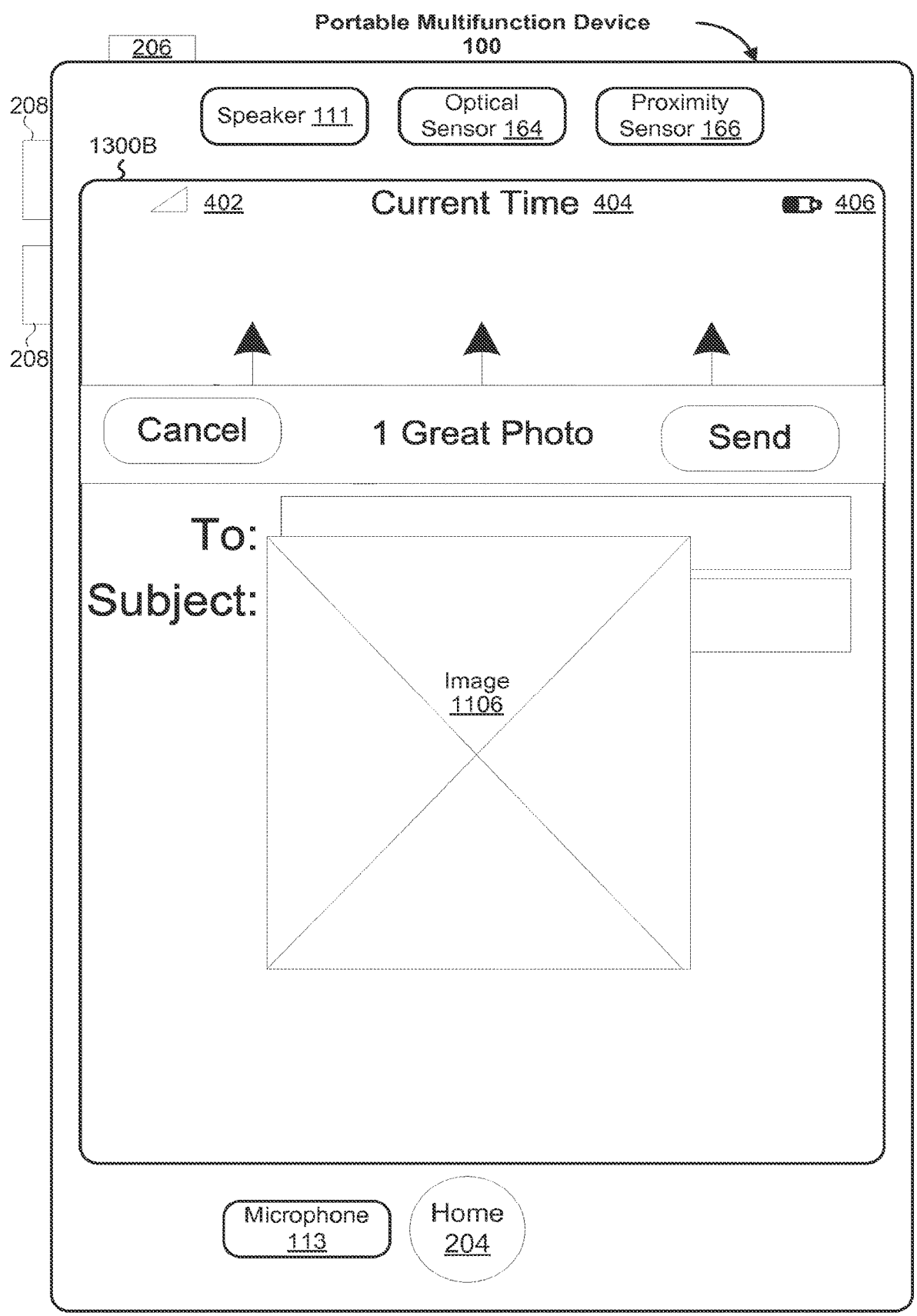
Figure 13C:
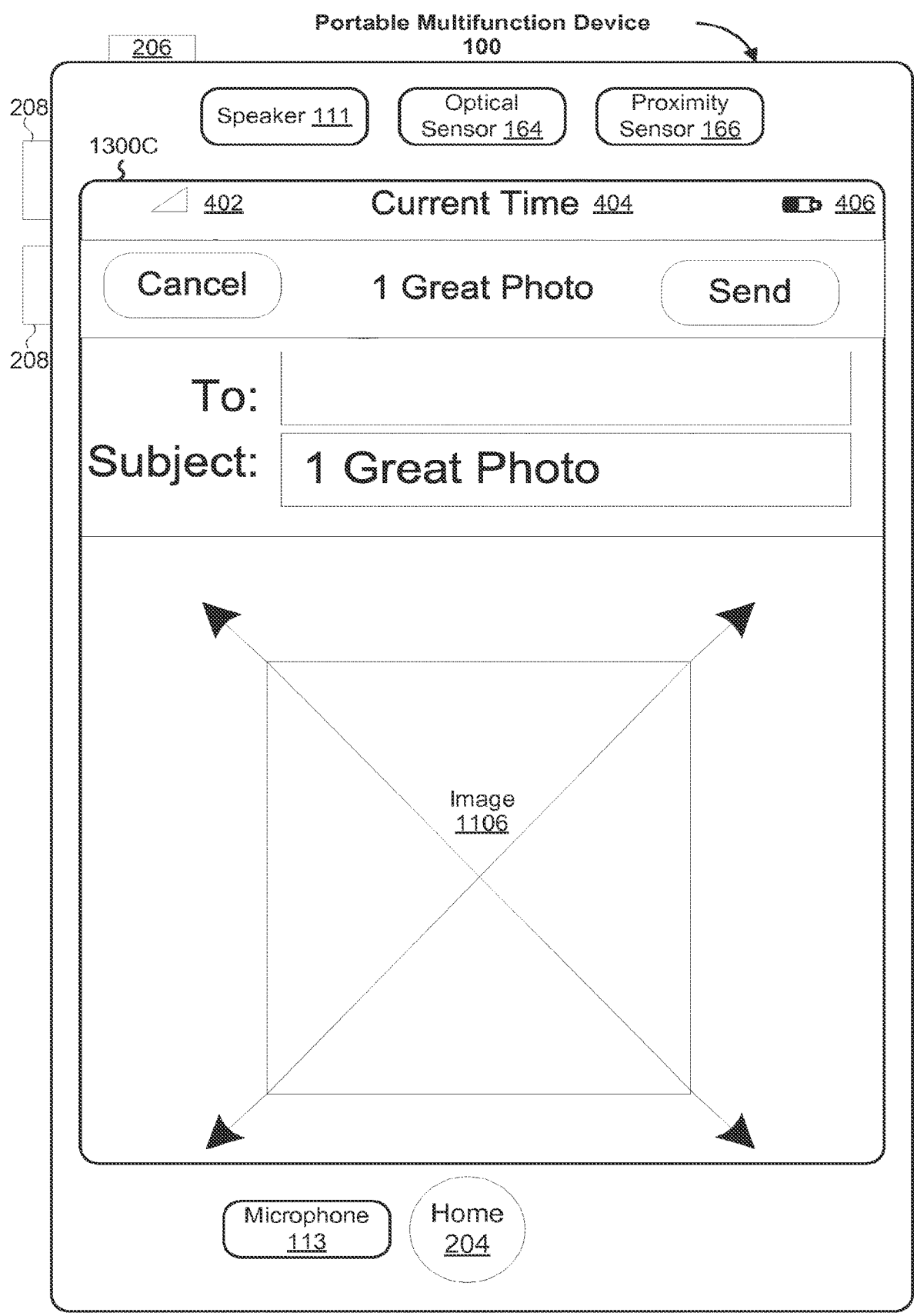
Figure 13D:
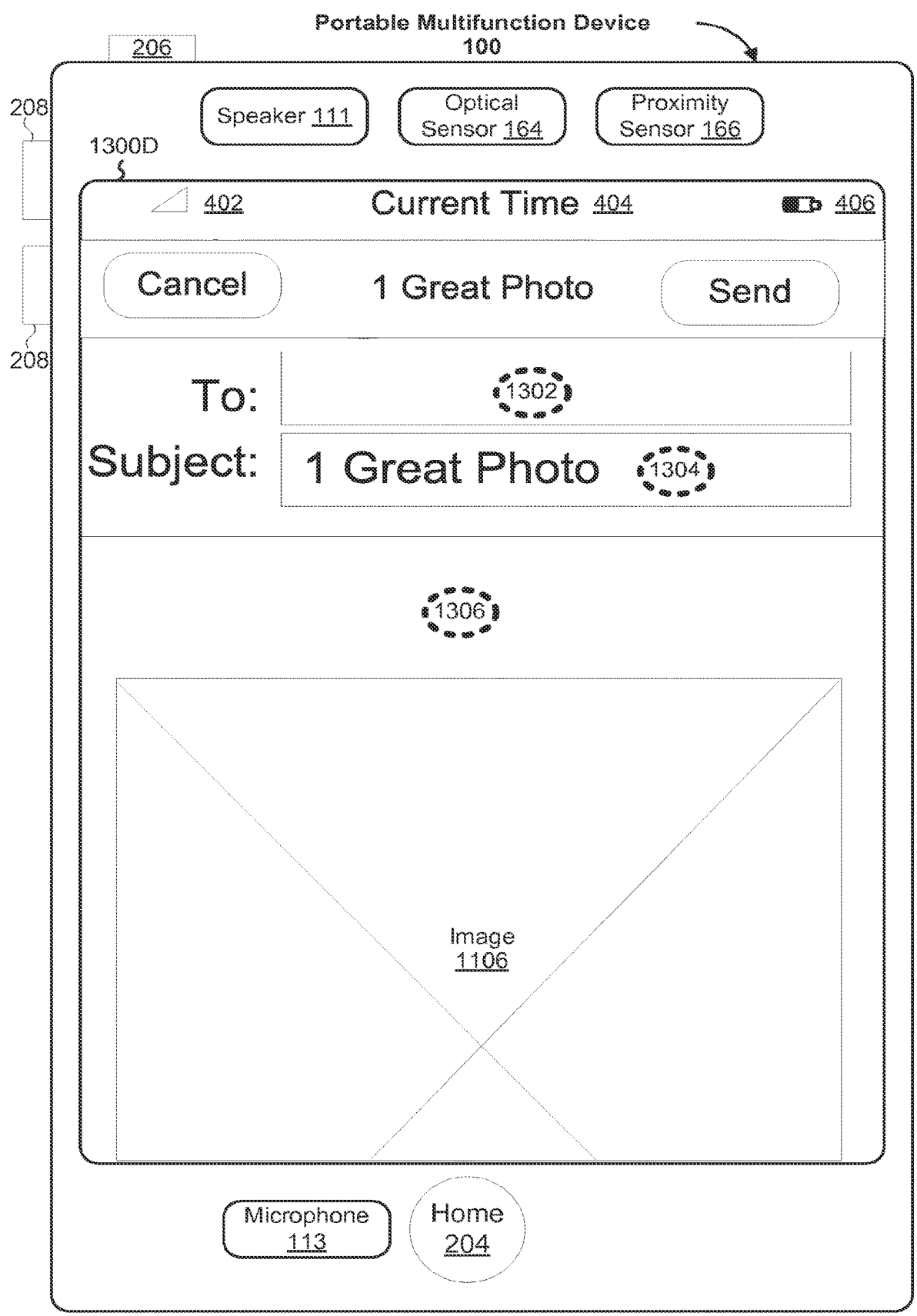
Figure 13E:
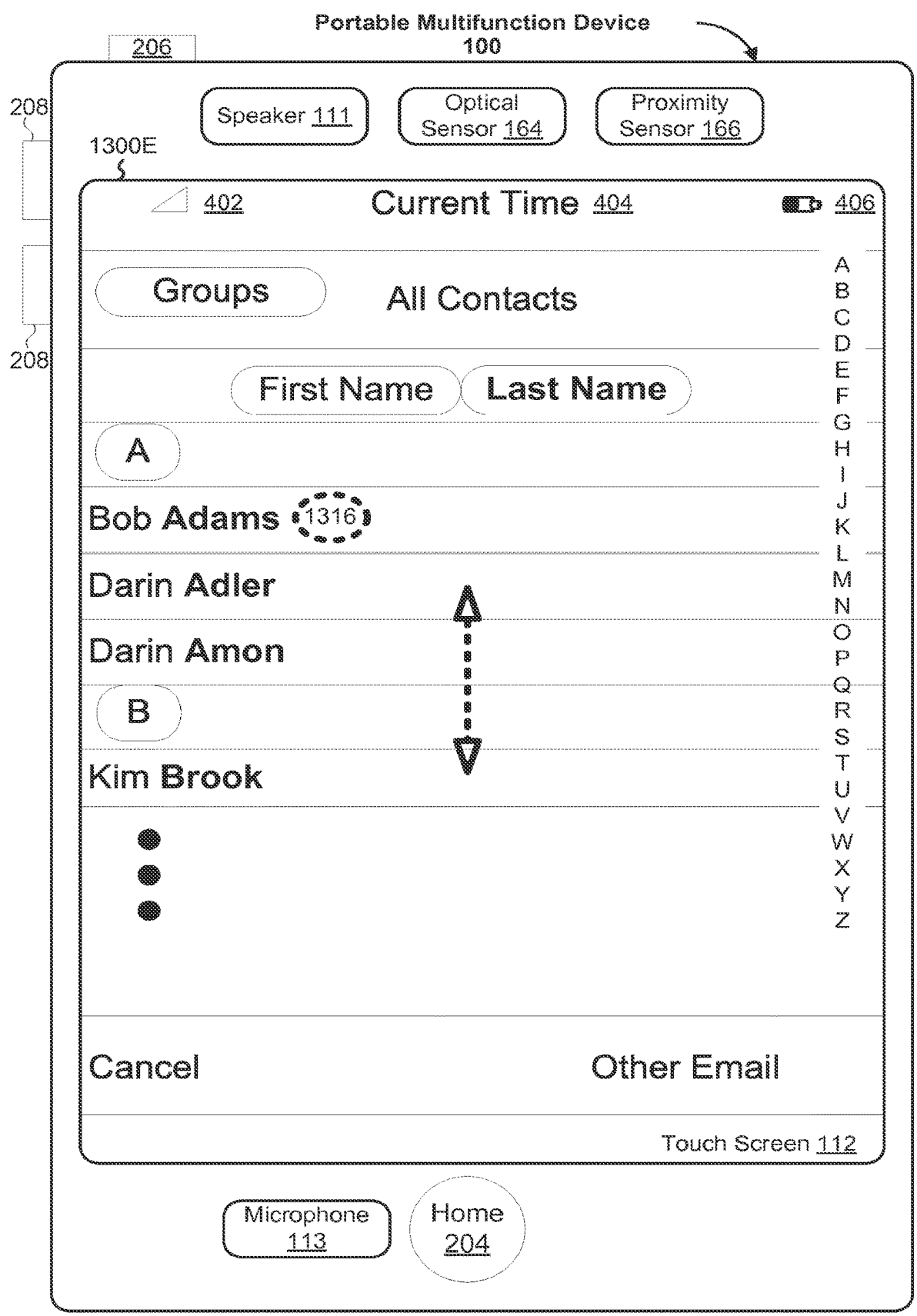

In some embodiments, following the animation, the device monitors the touch screen for user contact (2110). When the user taps on or makes other predefined gestures 1302 (FIG. 13D) on the To: field of the email recipient field to enter an email address (2112). The portable electronic device then displays the user's contact list (2122) (FIG. 13E). After detecting a user finger gesture or other predefined gesture on a recipient/contact (2124) (e.g., a finger tap 1316 on Bob Adams in FIG. 13E), the portable electronic device associates the recipient's email address with the email message and displays the contact's name in the To: field (2126) (e.g., "Bob Adams" in FIG. 13F).

Figure 13F:
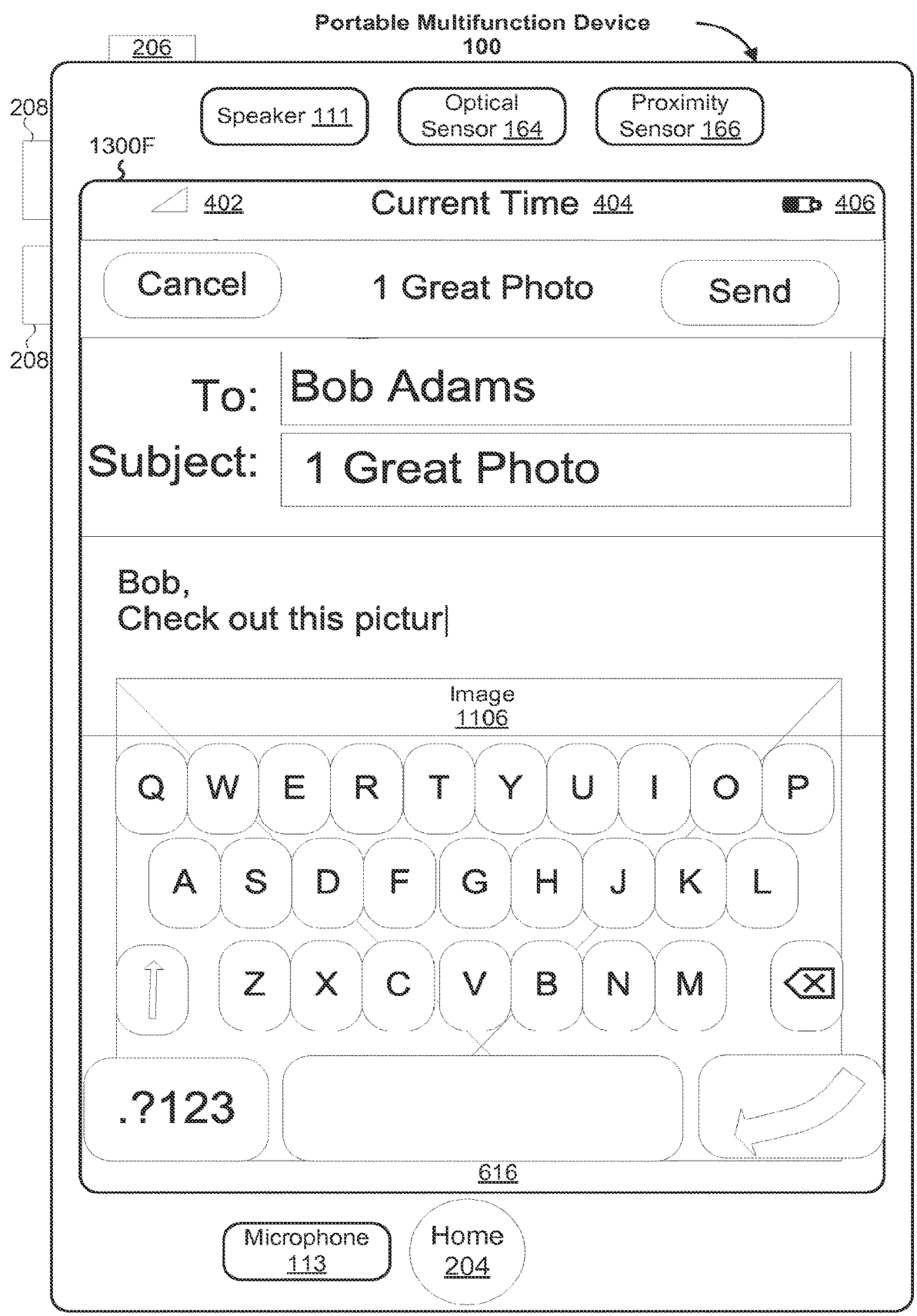

In some embodiments, in response to a user finger tap or other predefined gestures on predefined fields within the email message template (2114, 2116) (e.g., finger taps 1304, 1306 in FIG. 13D, or "Other Email" in FIG. 13E), the portable electronic device displays a letter keyboard 616 (2128) on the touch screen. The user may enter text into the respective fields through the letter keyboard 616 (FIG. 13F). In some embodiments, the user may also enter an email address by tapping on character icons in the letter keyboard or other character keyboards.

Figure 13G:
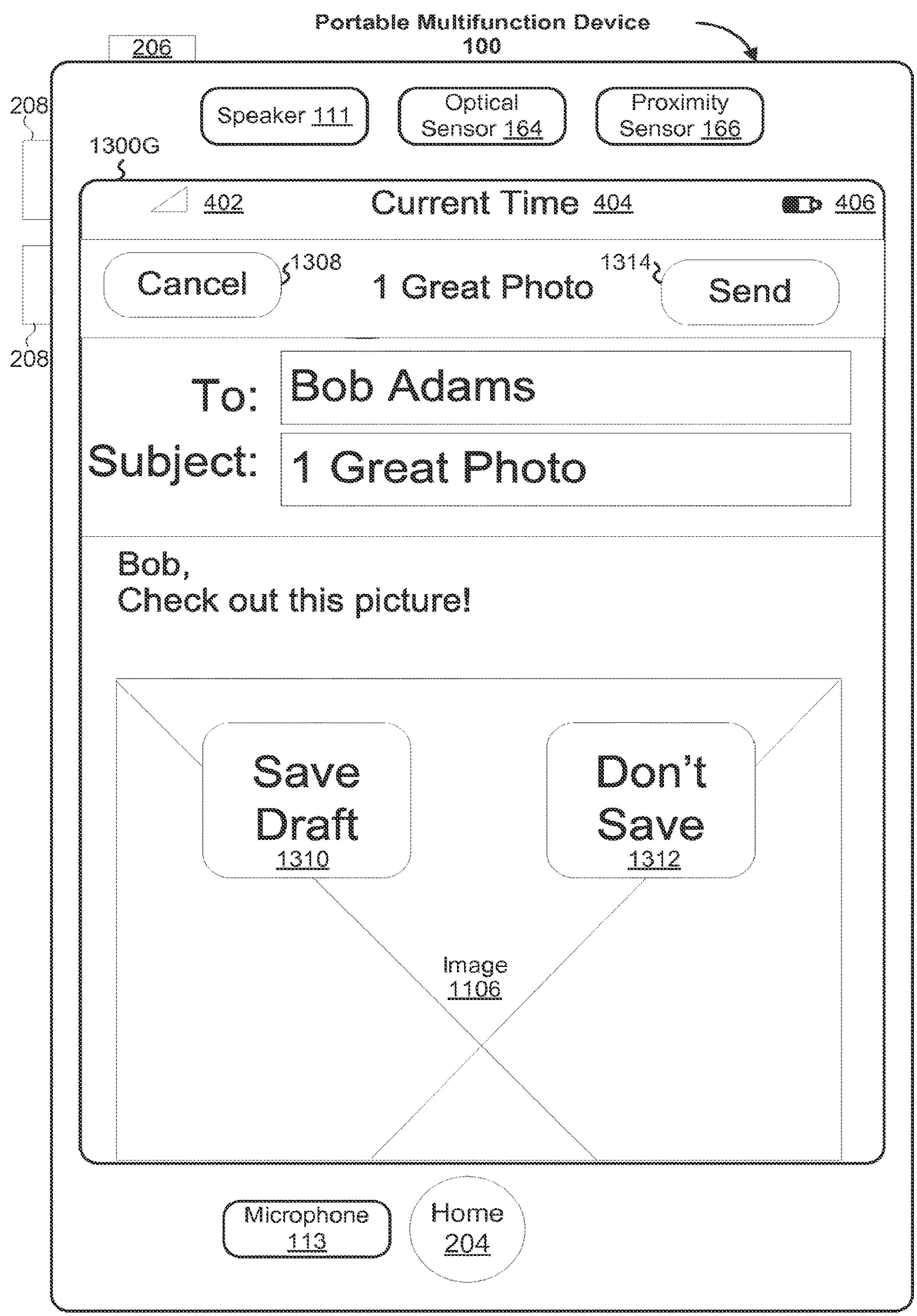

As shown in FIG. 13G, after detecting a finger gesture on the send icon 1314 (2120), the portable electronic device sends the email message to its recipient(s) (2132) and returns to the user interface 1000 or 1100. But if the user selects the cancel icon 1308 (2118), the portable electronic device may display the save draft icon 1310 and the don't save icon 1312 (2130). The device saves the draft in a draft folder associated with the e-mail client module 140 if the user chooses the save draft icon 1310 or deletes the draft if the user chooses the don't save icon 1312.

Figure 22:
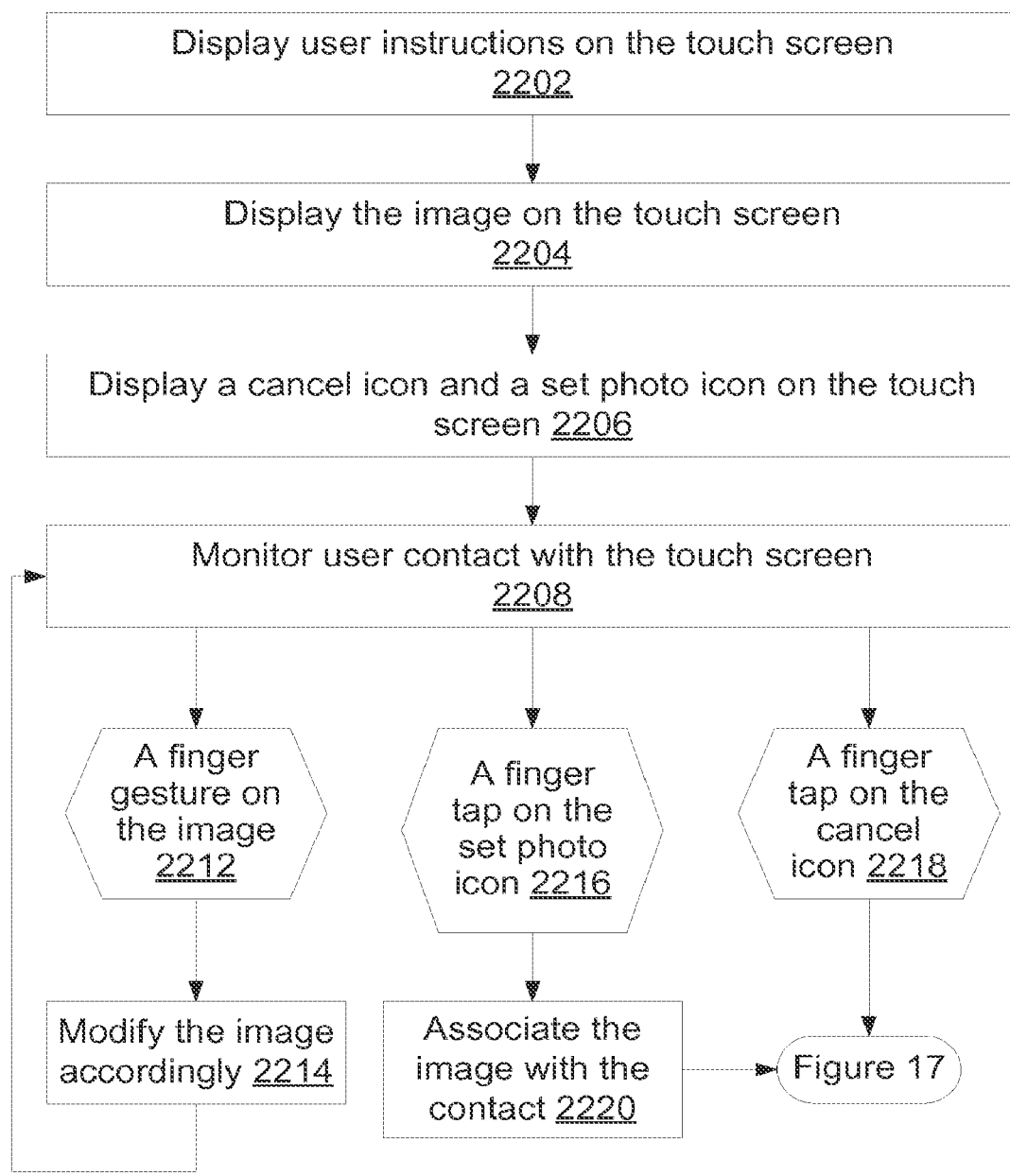
FIG. 22 is a flowchart illustrating a process for assigning an image to a user selected contact in the user's contact list in accordance with some embodiments.

Assuming that the user taps or makes other predefined gestures on the assign to contact icon 1210 shown in FIG. 12, FIG. 22 is a flowchart illustrating a process for assigning an image to a user selected contact in the user's contact list in accordance with some embodiments.

Upon a user selection of the assign to contact icon 1210, the portable electronic device displays the user's contact list (FIG. 14A). After the user selects a contact in the contact list (e.g., a finger tap 1401 on Bob Adams in FIG. 14A), the portable electronic device produces a new user interface 1400B as shown in FIG. 14B and monitors next user contact with the touch screen (2208). In some embodiments, the user interface 1400B includes the user instructions 1402 (2202), the user-selected image 1106 (2204), the cancel icon 1404 and the set photo icon 1406 (2206).

The portable electronic device modifies the image (2214) in response to a user finger gesture on the image 1106 (2212). For example, the user may crop, scale, and otherwise adjust the image 1106 using different types of finger gestures. In some embodiments, the portable electronic device moves the image on the touch screen in response to a movement of one-finger contact gesture 1408; enlarges the image in response to a de-pinching gesture including at least two simultaneous and continuous contacts 1410 and 1412; reduces the image in response to a pinching gesture including at least two simultaneous and continuous contacts 1410 and 1412; and/or rotates the image in response to a twisting gesture including two or more simultaneous and continuous contacts 1410 and 1412.

In some embodiments, the user assigns the modified image to the user-selected contact by tapping on the set photo icon 1406 (2216). This triggers the portable electronic device to associate the modified image with the contact. If the user selects the cancel icon 1404 (2218), the portable electronic device terminates the image assignment and brings back the user interface 1100.

If the user taps or makes other predefined gestures on the use as wallpaper icon 1212 in FIG. 12, the portable electronic device displays a user interface for incorporating an image in the user's wallpaper. FIG. 15 illustrates such an exemplary user interface 1500 in accordance with some embodiments.

In some embodiments, this wallpaper setting process is similar to the assign to contact process. For example, the user may move the image with a one-finger gesture 1508; enlarge the image with a de-pinching gesture using multiple contacts 1510 and 1512; reduce the image with a pinching gesture using multiple contacts 1510 and 1512; and/or rotate the image with a twisting gesture using multiple contacts 1510 and 1512.

The wallpaper setting process is completed after the user selects the set photo icon 1506. If the user selects the cancel icon 1504, the portable electronic device stops the assignment process and brings back the UI 1100 in FIG. 11. In some embodiments, the interface 1500 also includes user instruction information 1502.

FIGS. 23A-23H illustrate an exemplary user interface for viewing digital objects in a set of digital objects in accordance with some embodiments.

Figure 23A:
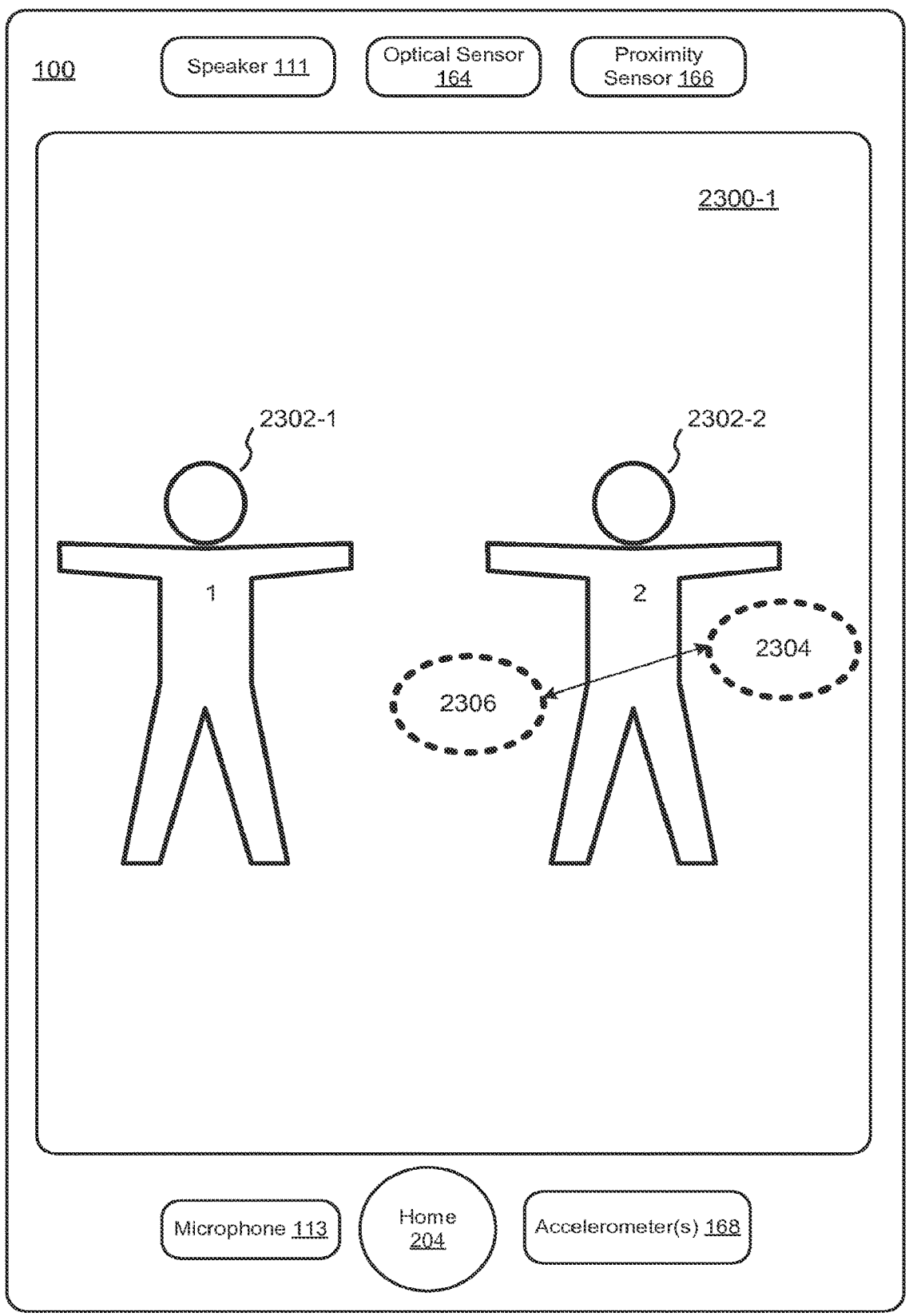
FIGS. 23A-23H illustrate an exemplary user interface for viewing digital objects in a set of digital objects in accordance with some embodiments.
Figure 23B:
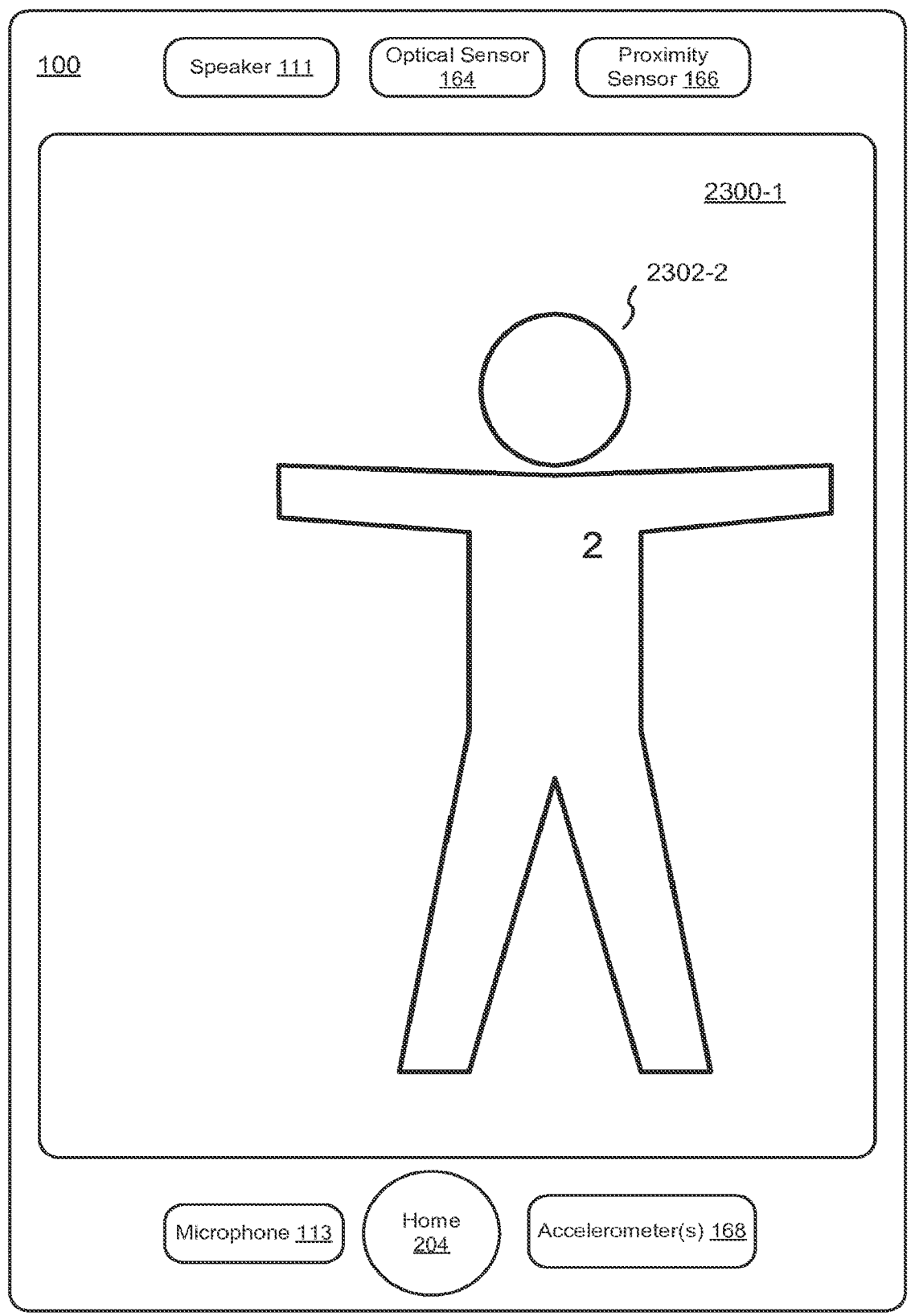

In FIG. 23A, the displayed digital object is a digital image 2300-1. In this example, the entire image 2300-1 is displayed in FIG. 23A. This exemplary image includes a first person 2302-1 and a second person 2302-2. In response to detecting a de-pinching gesture 2304 and 2306 on or about the second person 2302-2, a command to zoom in on a portion of the image 2300-1 that includes the second person 2302-2 is executed. Upon execution of the command to zoom in, a reduced portion of the image 2300-1 is displayed at a higher magnification than in FIG. 23A. For example, in FIG. 23B the second person 2302-2 is shown at a higher magnification than in FIG. 23A and the first person 2302-1 is no longer shown.

Figure 23C:
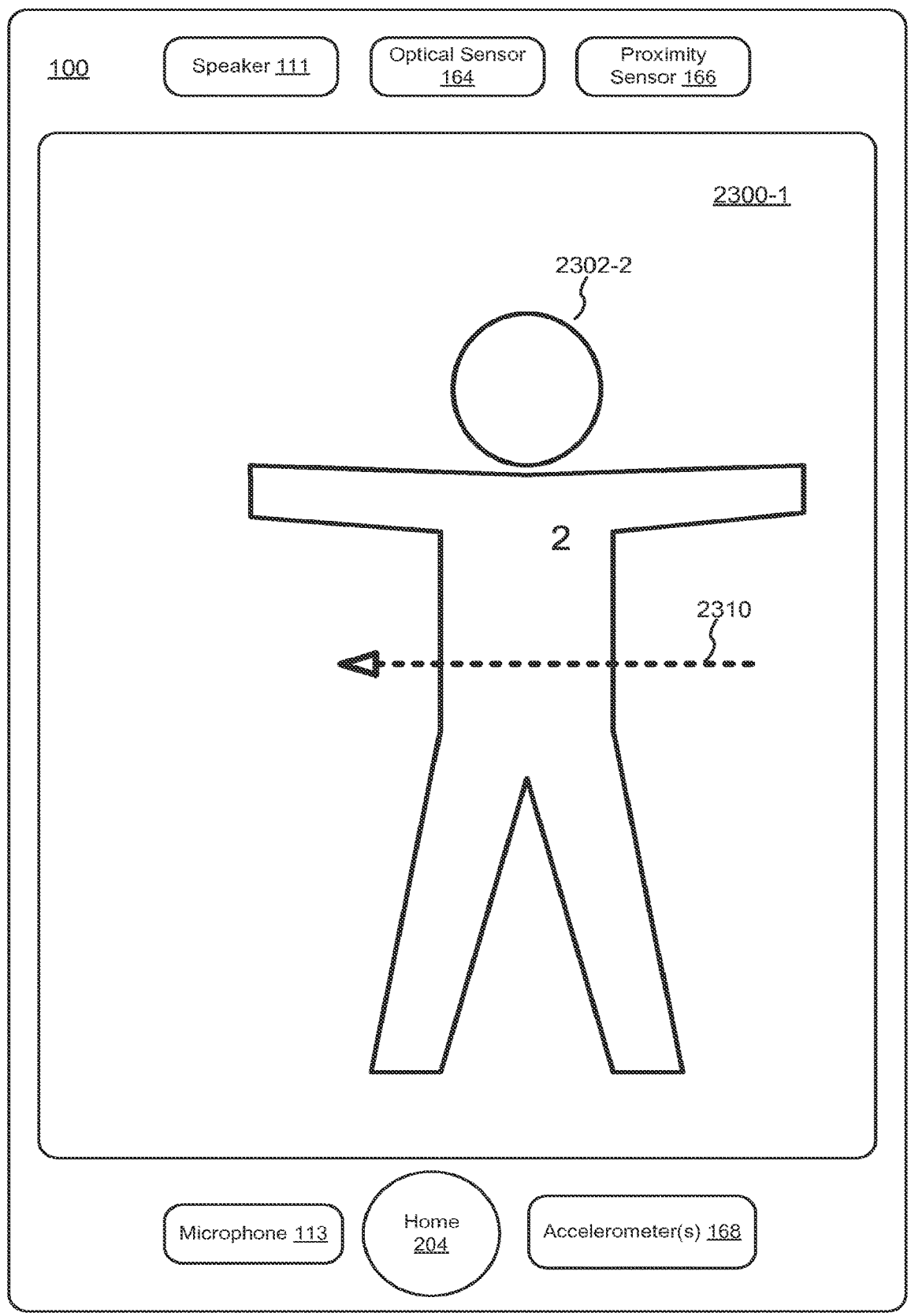
Figure 23D:
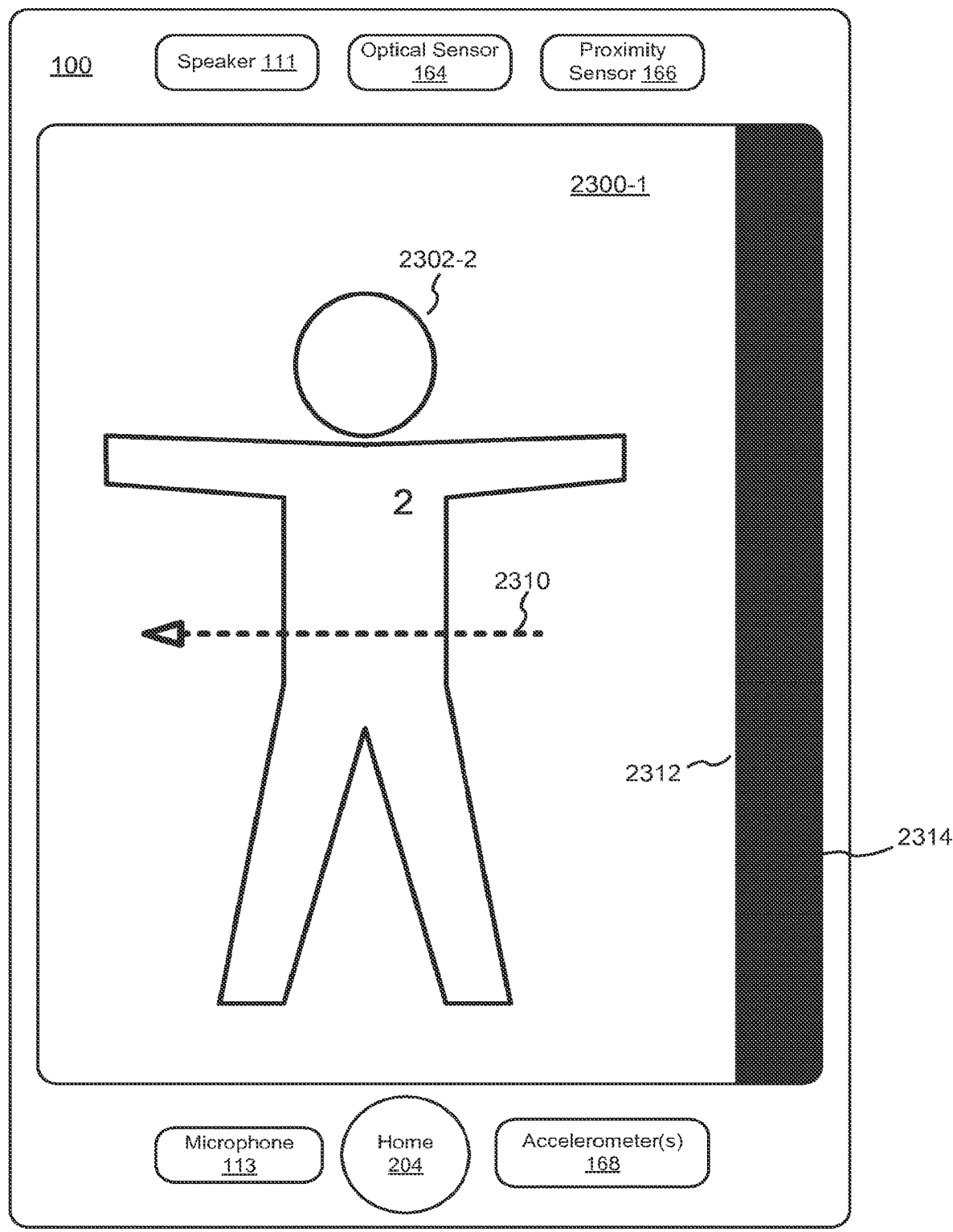
Figure 23E:
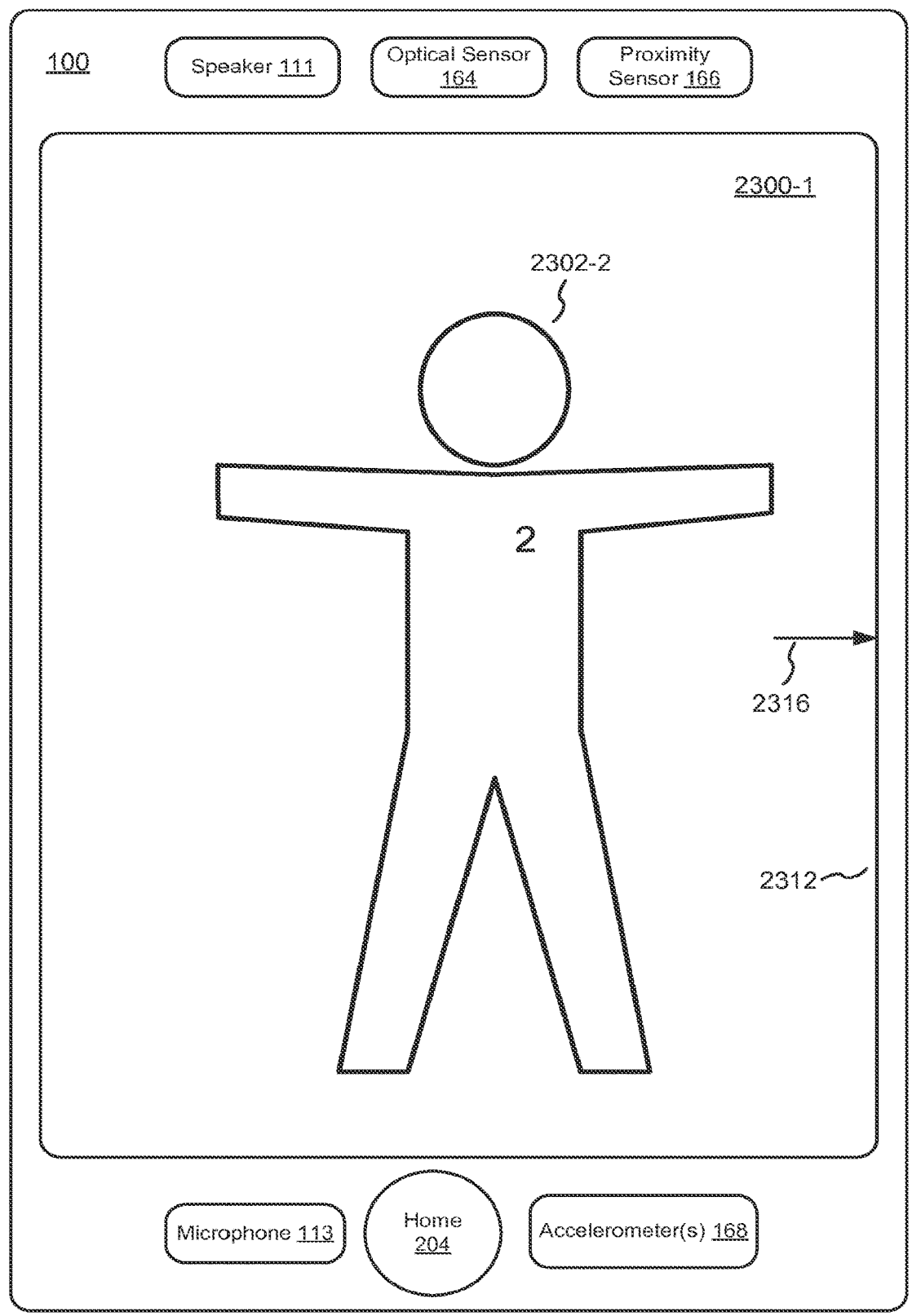
Figure 23F:
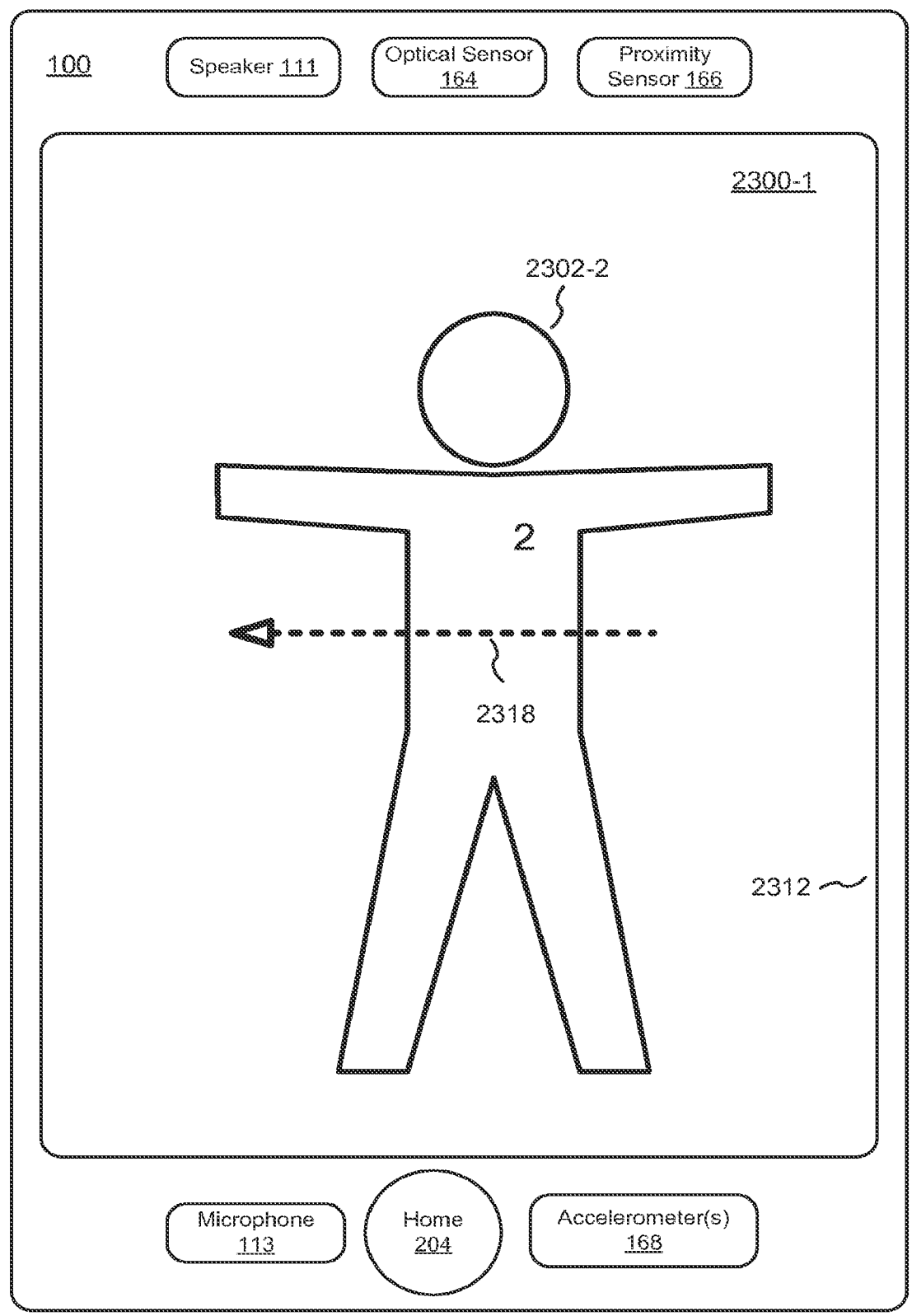

In FIG. 23C, a swipe gesture 2310 is detected on or near the touch screen display. In response, the displayed portion of the image 2300-1, including the second person 2302-2, is translated in a direction corresponding to the direction of the swipe gesture 2310, as shown in FIGS. 23C-23D, where the image is translated horizontally from right to left. An edge 2312 of the (enlarged) image 2300-1 is displayed in FIG. 23D. In response to continued detection of the swipe gesture 2310 (FIG. 23D), an area 2314 beyond the edge 2312 is displayed (e.g., a black area or other area visually distinct from the digital object). After the swipe gesture 2310 is no longer detected, as shown in FIG. 23E, the image 2300-1, including the image of the second person 2302-2, is translated in a second direction 2316 until the area 2314 is no longer displayed (e.g., horizontally from left to right).

Figure 23G:
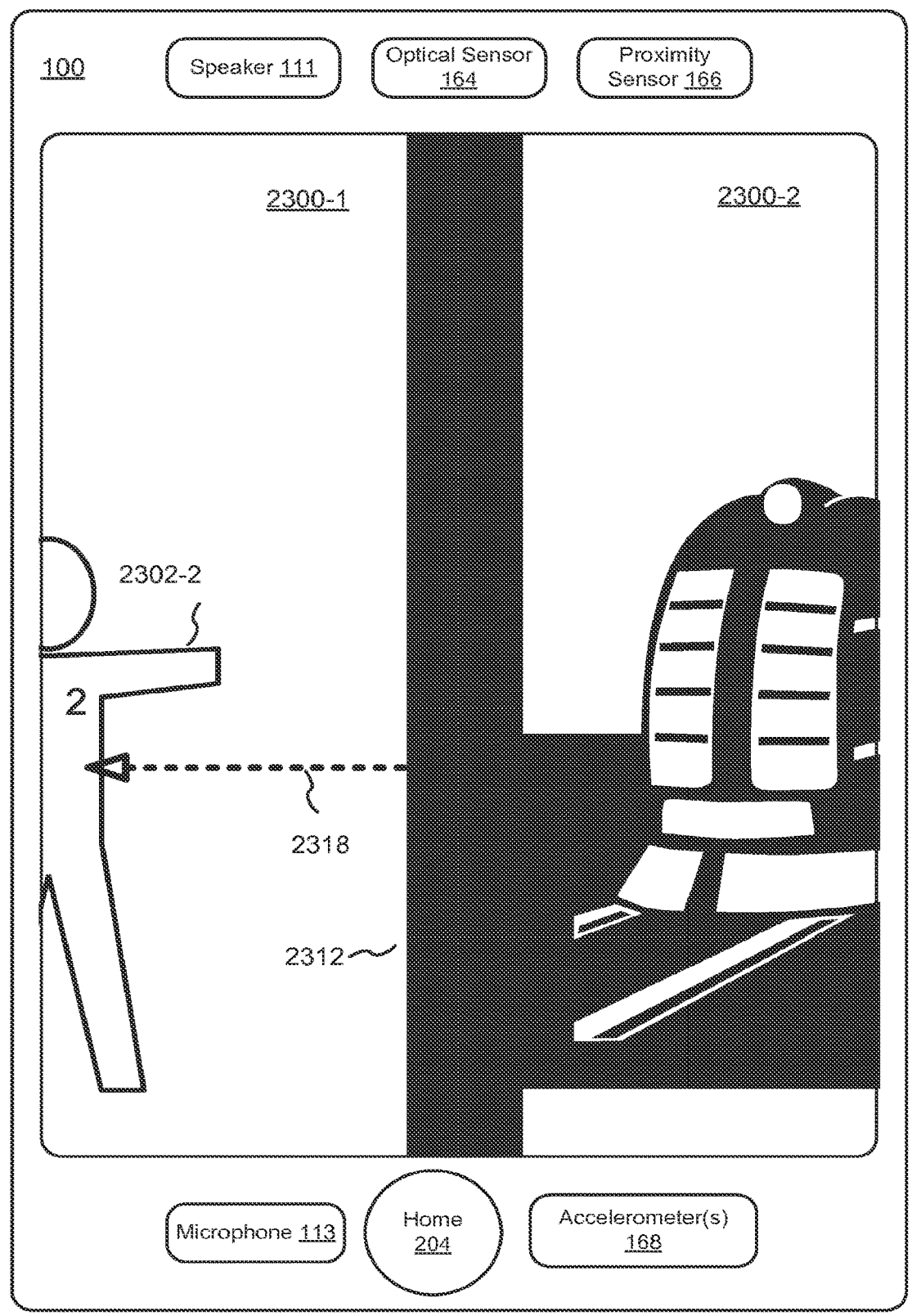
Figure 23H:
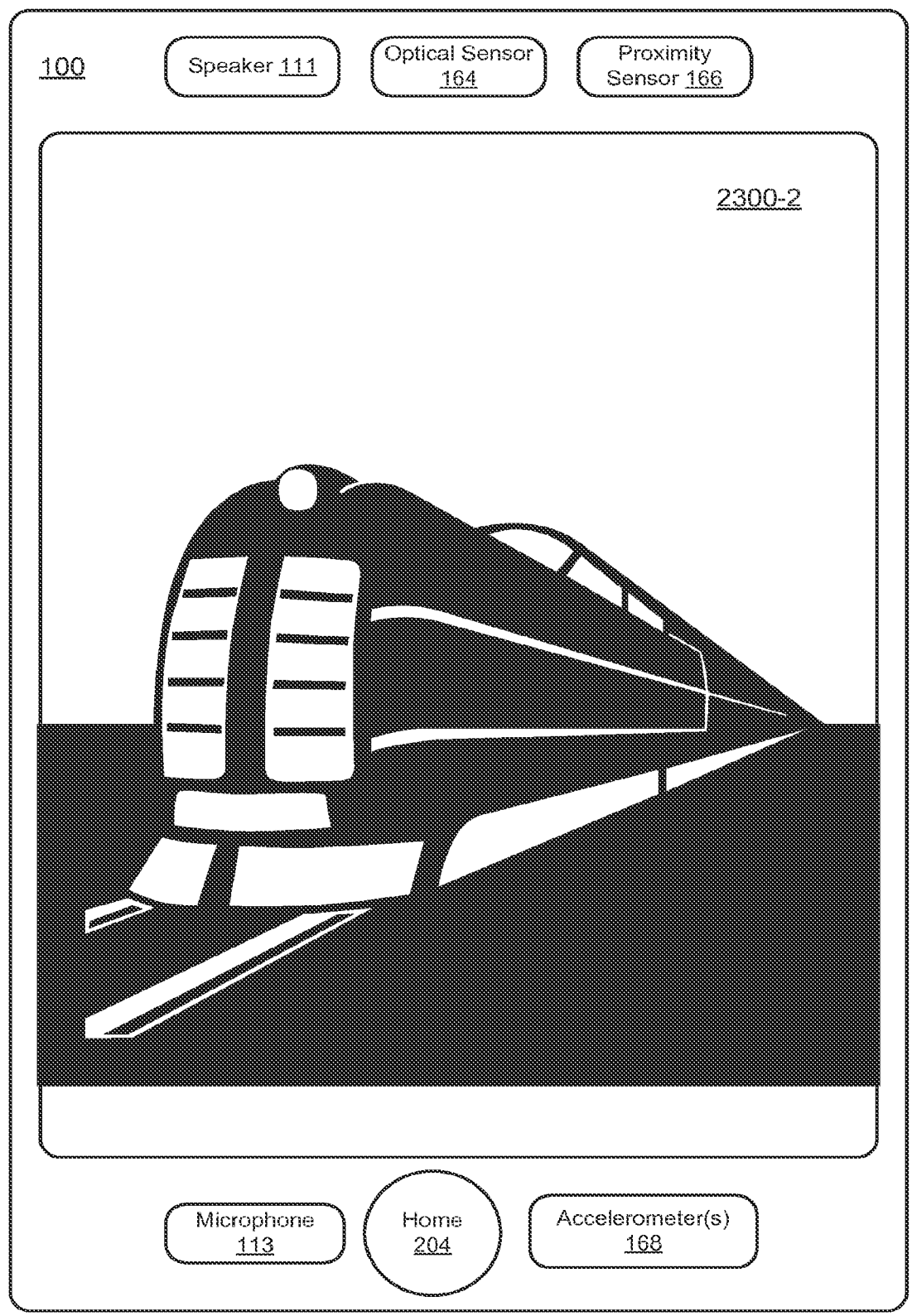

In response to detection of a second swipe gesture 2318, the displayed portion of the image 2300-1 is translated in a direction corresponding to the direction of the second swipe gesture 2318, as shown in FIG. 23G, and a second digital image 2300-2 is displayed. In some embodiments, as shown in FIGS. 23G and 23H, the second digital image 2300-2 (or, more generally, digital object) slides on to the touch screen as the first digital image 2300-1 slides off of the touch screen.

In this example, the display of area 2314 lets the user know that the edge of the (enlarged) digital object has been reached during the first gesture 2310. Upon detecting the second gesture 2318 in the same or substantially the same direction as the first gesture, the device transitions to the display of another image in a set of images, rather than just repeating the visual indication that the edge of the digital object has been reached.

FIG. 24 is a flowchart illustrating a process 2400 for viewing digital objects in a set of digital objects in accordance with some embodiments.

In some embodiments, a device with a touch screen display (e.g., device 100, a tablet computer, or a desktop computer with a touch screen display) detects (2402) a first movement of a physical object on or near the touch screen display. In some embodiments, the device is a portable electronic device. In some embodiments, the physical object is a finger. In some embodiments, the physical object is a stylus. In some embodiments, the first movement is a horizontal swipe gesture (e.g., 2310, FIG. 23C).

While detecting the first movement, the device translates (2404) a first digital object (e.g., a digital image 2300-1) displayed on the touch screen display in a first direction. In some embodiments, prior to the translating, at least one edge of the first digital object extends beyond the touch screen display in the first direction.

The first digital object is associated with a set of digital objects. In some embodiments, the set of digital objects is a set of digital images (e.g., 2300-1, 2300-2, etc., which may be part of an album or part of a set of images taken with a camera in the device). In some embodiments, the set of digital objects is a set of web pages (e.g., a set of web pages selected by a user for display in a browser). In some embodiments, the set of digital objects is a set of electronic documents.

In response to display of a previously hidden edge (e.g., edge 2312, FIG. 23D) of the first digital object and continued detection of the first movement (e.g., swipe gesture 2310, FIG. 23D), the device displays (2406) an area beyond the edge of the first digital object (e.g., area 2314).

After the first movement is no longer detected, the device translates (2408) the first digital object in a second direction until the area beyond the edge of the first digital object is no longer displayed. For example, in FIG. 23E the digital image 2300-1 is translated in a direction 2316 (e.g., horizontally from left to right) until the area 2314 is no longer displayed. In some embodiments, the second direction is opposite the first direction. In some embodiments, the first digital object is translated in the second direction using a damped motion. In some embodiments, the change from translating the first digital object in the first direction to translating the first digital object in the second direction until the area beyond the edge of the first digital object is no longer displayed makes the edge of the first digital object appear to be elastically attached to an edge of the touch screen display or to an edge displayed on the touch screen display.

The device detects (2410) a second movement (e.g., a second swipe gesture 2318 from right to left, FIG. 23F) of the physical object on or near the touch screen display.

In response to detecting the second movement while the previously hidden edge of the first digital object is displayed (e.g., edge 2312, FIG. 23F), the device translates (2412) the first digital object in the first direction and displays a second digital object (e.g., a digital image 2300-2, FIGS. 23G and 23H) in the set of digital objects.

Thus, depending on the context, similar movements (e.g., 2310 and 2318 are both right to left swipe gestures) allow a user to either (1) translate a displayed first digital object or (2) transition from displaying the first digital object to displaying a second digital object in a set of digital objects.

In some embodiments, the time between the first and second movements must be less than a predetermined value (e.g., 0.5 seconds). Otherwise, the device will not transition to displaying the second digital object. Rather, the device may just translate the first digital object and show the area beyond the edge of the object (to show the user again that the edge of the first digital object has been reached).

In some embodiments, if the entire first digital object is displayed (e.g., FIG. 23A), then the first movement (e.g., a horizontal swipe gesture) will transition the device to display another digital object in the set of digital objects.

Process 2400 permits a touch screen user to easily navigate within a displayed digital object and between digital objects in a set of digital objects.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
 a touch screen display;
 a camera;
 one or more processors; and
 memory storing one or more programs configured to be executed by the one or more processors,
 the one or more programs including instructions for:
  displaying, via the touch screen display, a user interface including:
   a digital viewfinder that displays a representation of data received from the camera;
   a shutter icon; and
   a record icon;
  while displaying the user interface that includes the digital viewfinder that displays the representation of data received from the camera, receiving a first user input;
  in response to receiving the first user input:
   in accordance with the first user input corresponding to the shutter icon, taking a still image corresponding to the data displayed in the digital viewfinder and displaying an animation when the still image is obtained; and
   in accordance with the first user input corresponding to the record icon, stopping a video recording corresponding to the data displayed in the digital viewfinder.

2. The electronic device of claim 1, the one or more programs further including instructions for:
 while displaying the digital viewfinder:
  displaying, on the touch screen display, a camera roll icon, wherein the camera roll icon includes a thumbnail image corresponding to one of the still image and the video recording; and
  receiving a second user input corresponding to the camera roll icon; and
 in response to receiving the second user input, displaying a camera roll interface that includes an array of thumbnail images including at least a thumbnail image corresponding to the still image and a thumbnail image corresponding to the video recording.

3. The electronic device of claim 2, the one or more programs further including instructions for:
 in response to receiving the second user input, ceasing to display the digital viewfinder.

4. The electronic device of claim 2, the one or more programs further including instructions for:
 while displaying the camera roll interface, detecting a third user input on an icon that when activated initiates transfer to a camera user interface; and
 in response to detecting the third user input, displaying the camera user interface.

5. A non-transitory computer-readable storage medium storing one or more programs configured to be executed by one or more processors of an electronic device with a touch screen display and a camera, the one or more programs including instructions for:
 displaying, via the touch screen display, a user interface including:
  a digital viewfinder that displays a representation of data received from the camera;
  a shutter icon; and
  a record icon;
 while displaying the user interface that includes the digital viewfinder that displays the representation of data received from the camera, receiving a first user input;
 in response to receiving the first user input:
  in accordance with the first user input corresponding to the shutter icon, taking a still image corresponding to the data displayed in the digital viewfinder and displaying an animation when the still image is obtained; and
  in accordance with the first user input corresponding to the record icon, stopping a video recording corresponding to the data displayed in the digital viewfinder.

6. The non-transitory computer-readable storage medium of claim 5, the one or more programs further including instructions for:
 while displaying the digital viewfinder:
  displaying, on the touch screen display, a camera roll icon, wherein the camera roll icon includes a thumbnail image corresponding to one of the still image and the video recording; and
  receiving a second user input corresponding to the camera roll icon; and
 in response to receiving the second user input, displaying a camera roll interface that includes an array of thumbnail images including at least a thumbnail image corresponding to the still image and a thumbnail image corresponding to the video recording.

7. The non-transitory computer-readable storage medium of claim 6, the one or more programs further including instructions for:
 in response to receiving the second user input, ceasing to display the digital viewfinder.

8. The non-transitory computer-readable storage medium of claim 6, the one or more programs further including instructions for:
 while displaying the camera roll interface, detecting a third user input on an icon that when activated initiates transfer to a camera user interface; and
 in response to detecting the third user input, displaying the camera user interface.

9. A computer-implemented method, comprising:
 at a portable electronic device with a touch screen display and a camera:
  displaying, via the touch screen display, a user interface including:
   a digital viewfinder that displays a representation of data received from the camera;
   a shutter icon; and
   a record icon;
  while displaying the user interface that includes the digital viewfinder that displays the representation of data received from the camera, receiving a first user input;
  in response to receiving the first user input:
   in accordance with the first user input corresponding to the shutter icon, taking a still image corresponding to the data displayed in the digital viewfinder and displaying an animation when the still image is obtained; and
   in accordance with the first user input corresponding to the record icon, stopping a video recording corresponding to the data displayed in the digital viewfinder.

10. The method of claim 9, further comprising:
 while displaying the digital viewfinder:
  displaying, on the touch screen display, a camera roll icon, wherein the camera roll icon includes a thumbnail image corresponding to one of the still image and the video recording; and receiving a second user input corresponding to the camera roll icon; and in response to receiving the second user input, displaying a camera roll interface that includes an array of thumbnail images including at least a thumbnail image corresponding to the still image and a thumbnail image corresponding to the video recording.

11. The method of claim 10, further comprising:

in response to receiving the second user input, ceasing to display the digital viewfinder.

12. The method of claim 10, further comprising:

while displaying the camera roll interface, detecting a third user input on an icon that when activated initiates transfer to a camera user interface; and in response to detecting the third user input, displaying the camera user interface.

\* \* \* \* \*